US011287167B2

United States Patent
Tang et al.

(10) Patent No.: US 11,287,167 B2
(45) Date of Patent: Mar. 29, 2022

(54) ELECTRONIC EXPANSION VALVE AND ASSEMBLY METHOD THEREFOR

(71) Applicant: Zhejiang Sanhua Climate and Appliance Controls Group Co., Ltd., Zhejiang (CN)

(72) Inventors: Sijie Tang, Zhejiang (CN); Guohua Xu, Zhejiang (CN)

(73) Assignee: Zhejiang Sanhua Climate and Appliance Controls Group Co., Ltd, Shaoxing (CN)

( * ) Notice: Subject to any disclaimer, the term of this patent is extended or adjusted under 35 U.S.C. 154(b) by 175 days.

(21) Appl. No.: 16/478,118

(22) PCT Filed: Jan. 4, 2018

(86) PCT No.: PCT/CN2018/071356
§ 371 (c)(1),
(2) Date: Jul. 15, 2019

(87) PCT Pub. No.: WO2018/133673
PCT Pub. Date: Jul. 26, 2018

(65) Prior Publication Data
US 2019/0368792 A1 Dec. 5, 2019

(30) Foreign Application Priority Data
Jan. 18, 2017 (CN) .......................... 201710037808.0

(51) Int. Cl.
*F25B 41/06* (2006.01)
*F25B 41/31* (2021.01)
(Continued)

(52) U.S. Cl.
CPC .............. *F25B 41/31* (2021.01); *F25B 41/20* (2021.01); *F25B 41/30* (2021.01); *F25B 41/315* (2021.01);
(Continued)

(58) Field of Classification Search
CPC .......... F25B 41/31; F25B 41/34; F25B 41/33; F25B 41/315; F25B 2600/2513;
(Continued)

(56) References Cited

FOREIGN PATENT DOCUMENTS

| CN | 101080601 A | * 11/2007 | ........... F16K 31/047 |
|---|---|---|---|
| CN | 101080601 A | 11/2007 | |

(Continued)

OTHER PUBLICATIONS

Nakagawa, Electrically operated control valve, 2005, Full Document (Year: 2005).*

(Continued)

*Primary Examiner* — Elizabeth J Martin
*Assistant Examiner* — Nael N Babaa
(74) *Attorney, Agent, or Firm* — Wolf, Greenfield & Sacks, P.C.

(57) ABSTRACT

An electronic expansion valve and an assembly method therefor. The electronic expansion valve includes a screw rod component, a movable connection component, a valve pin component and an elastic element. One end of the elastic element abuts the movable connection component, and the other end thereof abuts the valve pin component. In the period from the valve pin component closing the valve port part to the screw rod component moving a pre-set displacement amount in the valve closing direction, the elastic element does not generate an elastic force pushing the valve pin component towards the valve port part; and in the period from the valve pin component closing the valve port part to in a case that the screw rod component moving more than the pre-set displacement amount in the valve closing direction, the elastic element generates an elastic force pushing the valve pin component towards the valve port part.

25 Claims, 20 Drawing Sheets

(51) Int. Cl.
    *F25B 41/34*    (2021.01)
    *F25B 41/30*    (2021.01)
    *F25B 41/315*   (2021.01)
    *F25B 41/20*    (2021.01)
    *F25B 41/36*    (2021.01)
    *F25B 41/32*    (2021.01)
    *F25B 41/375*   (2021.01)
    *F25B 41/325*   (2021.01)
    *F25B 41/33*    (2021.01)

(52) U.S. Cl.
    CPC ............. *F25B 41/32* (2021.01); *F25B 41/325* (2021.01); *F25B 41/33* (2021.01); *F25B 41/34* (2021.01); *F25B 41/36* (2021.01); *F25B 41/375* (2021.01); *F25B 2313/005* (2013.01); *F25B 2341/06* (2013.01); *F25B 2600/2513* (2013.01)

(58) Field of Classification Search
    CPC .... F25B 41/06; F25B 2313/005; F25B 41/20; F25B 41/30; F25B 41/375; F25B 41/36
    USPC .......................................................... 62/528
    See application file for complete search history.

(56)             References Cited

FOREIGN PATENT DOCUMENTS

| CN | 103672131 A   | 3/2014  |
|----|---------------|---------|
| CN | 103851209 A   | 6/2014  |
| CN | 104482274 A   | 4/2015  |
| CN | 204328138 U   | 5/2015  |
| CN | 105202199 A   | 12/2015 |
| CN | 105546186 A   | 5/2016  |
| CN | 105626876 A   | 6/2016  |
| CN | 107304843 A   | 10/2017 |
| JP | 2008-175240 A | 7/2008  |
| JP | 2008-175289 A | 7/2008  |
| JP | 2013-164211 A | 8/2013  |
| JP | 2016-156447 A | 9/2016  |
| WO | 2006/064865 A1| 6/2006  |

OTHER PUBLICATIONS

First Office Action for Chinese Application No. 201710037808.0, dated Nov. 5, 2019.
First Office Action for Chinese Application No. 201880007158.8, dated Aug. 5, 2020.
Office Action for Japanese Application No. 2019-538515, dated Sep. 1, 2020.
PCT/CN2018/071356, Mar. 28, 2018, International Search Report and Written Opinion, Y—Partial.
International Search Report and Written Opinion for International Application No. PCT/CN2018/071356 dated Mar. 28, 2018.

* cited by examiner

ELECTRONIC EXPANSION VALVE AND ASSEMBLY METHOD THEREFOR

This application is a national stage filing under 35 U.S.C. § 371 of International Application No. PCT/CN2018/071356, filed Jan. 4, 2018, which claims priority to Chinese Patent Application No. 201710037808.0, titled "ELECTRONIC EXPANSION VALVE", filed with the China National Intellectual Property Administration on Jan. 18, 2017. The entire contents of these applications are incorporated herein by reference in their entireties.

FIELD

The present application relates to the technical field of fluid control, and in particular to an electronic expansion valve and an assembly method for the electronic expansion valve.

BACKGROUND

Electronic expansion valves which serve as important components for constituting a refrigeration system are widely used in large refrigeration units, large refrigeration houses, and supermarket freezers and so on.

An electronic expansion valve according to the conventional technology generally includes a valve body component, a rotor component, a screw rod component, and a valve needle component. Driven by the rotation of the rotor component, the screw rod component acts on the valve needle component, to allow the valve needle component to move away from or approach a valve port portion, thereby achieving the flow regulation function of the electronic expansion valve. As for the electronic expansion valve, during the process that valve needle is pushed from being located at the valve port portion to a position where the valve needle is completely pushed to block the valve port portion, the valve needle is always rotated with respect to the valve port portion at a contact position, causing abrasion between the valve needle and the valve port portion. Besides, the valve needle and the valve port portion rub each other due to the relative rotation at the very moment that the valve needle is separated from the valve port portion. Especially in a case where the valve needle actions repeatedly, the abrasion of the contact surface between the valve needle and the valve port portion will be aggravated, which may cause the valve port portion to leak in a valve closed state, resulting in poor valve performance.

Therefore, a technical issue to be addressed by the applicant of the present application is to reduce the abrasion of contact portions between the valve needle component and the valve port portion, so as to reduce an internal leakage rate of the electronic expansion valve.

SUMMARY

An object of the present application is to provide an electronic expansion valve, to reduce abrasion of a contact surface between a valve needle and a valve port portion, thereby reducing internal leakage of the electronic expansion valve when the valve port portion is in a valve closed state.

Another object of the present application is to provide an assembly method for the electronic expansion valve having the above functions.

An electronic expansion valve according to the present application includes:

a valve body component having a valve chamber;

a rotor component arranged in the valve chamber;

a screw rod component configured to be driven by the rotor component to move in an axial direction of the valve body component, wherein the screw rod component includes a first support portion;

a movable connecting component including a second support portion and a first suspension portion;

a valve needle component configured to adjust an opening degree of the electronic expansion valve by moving away from or toward a valve port portion, wherein the valve needle component includes a second suspension portion; and an elastic member arranged outside the movable connecting component, wherein one end of the elastic member abuts against the movable connecting component, and the other end of the elastic member abuts against the valve needle component; and wherein the first support portion is able to suspendingly support the first suspension portion, and the second support portion is able to suspendingly support the second suspension portion;

during a time period from when the valve needle component closes the valve port portion to when the screw rod component moves in a valve closing direction by a predetermined displacement amount, the elastic member does not generate an elastic force for pushing the valve needle component toward the valve port portion; and in a case that a displacement amount of the screw rod component moving in the valve closing direction from a state that the valve needle component closes the valve port portion is greater than the predetermined displacement amount, the elastic member generates the elastic force for pushing the valve needle component toward the valve port portion.

According to the electronic expansion valve in the present application, during the time period from when the valve needle component closes the valve port portion to when the screw rod component moves in the valve closing direction by a displacement amount no greater than the predetermined displacement amount, the elastic member does not generate the elastic force for pushing the valve needle component toward the valve port portion; and only in a case that the valve needle component closes the valve port portion and the screw rod component moves in the valve closing direction by a displacement amount greater than the predetermined displacement amount, the elastic member applies the elastic force to push the valve needle component toward the valve port portion. Thus, during the time period from when the valve needle component closes the valve port portion to when the screw rod component moves in the valve closing direction by a displacement amount no greater than the predetermined displacement amount, a frictional force generated between the valve needle component and the valve port portion is caused by gravities of the valve needle component and the movable connecting component or only the gravity of the valve needle component itself, and an abrasion loss of a contact surface between the valve needle component and the valve port portion is small, thereby reducing the internal leakage of the electronic expansion valve, which can also avoid leakage of the valve port portion in the valve closed state even if the electronic expansion valve actions repeatedly, and thereby ensuring the shut-off performance of the valve.

The electronic expansion valve having the above structure further includes a valve core sleeve, the valve core sleeve is at least partially arranged in the valve chamber and fixedly connected to the valve body component; both the valve needle component and the movable connecting component are at least partially arranged in the valve core sleeve, and an inner wall of the valve core sleeve forms a guide portion for guiding the movable connecting component and/or the valve needle component.

According to the electronic expansion valve having the above structure, the movable connecting component has a first connecting chamber, the screw rod component includes a screw rod component connecting portion extending into the first connecting chamber, and the screw rod component connecting portion is provided with the first support portion; and the movable connecting component further includes a stop portion arranged below the first support portion, and as the screw rod component moves in the valve closing direction until the first support portion abuts against the stop portion, the screw rod component can push the movable connecting component to move in the valve closing direction, so that the elastic member generates the elastic force for pushing the valve needle component toward the valve port portion.

According to the electronic expansion valve having the above structure, the movable connecting component includes a connecting body having an upper opening portion and a lower opening portion in communication with each other, an upper member fixed to the upper opening portion, and a lower member fixed to the lower opening portion; and the first connecting chamber is defined by the connecting body, the upper member and the lower member;

the upper member is provided with the first suspension portion, and the lower member is provided with the second support portion; and one end of the elastic member abuts against the lower member.

According to the electronic expansion valve having the above structure, an inner wall of the connecting body extends radially to form a first annular boss, and the first annular boss forms the stop portion;

the upper member includes a first annular member having a through hole, the first annular member is arranged on a periphery of the screw rod component, and the first annular member is provided with the first suspension portion; and the lower member includes a base member having a through hole, the base member is arranged on a periphery of the valve needle component, an inner wall of the base member extends radially to form a second annular boss, and the second annular boss forms the second support portion.

According to the electronic expansion valve having the above structure, the valve needle component includes a valve needle, the valve needle includes a main body portion, a flow regulating portion and a rod portion, and a first stepped portion is formed between the main body portion and the rod portion, and the end of the elastic member for abutting against the valve needle component abuts against the first stepped portion; the valve needle component further includes a second clamping member, the second clamping member is arranged on a periphery of the rod portion, and the second clamping member is provided with the second suspension portion.

According to the electronic expansion valve having the above structure, the movable connecting component includes a connecting body having an upper opening portion, an upper member fixed to the upper opening portion, and a lower member fixed to the connecting body;

the first connecting chamber is defined by the connecting body and the upper member, the upper member is provided with the first suspension portion, and the lower member is provided with the second support portion; and the elastic member is arranged on a periphery portion of the connecting body, and the end of the elastic member for abutting against the movable connecting component abuts against the connecting body.

According to the electronic expansion valve having the above structure, the connecting body includes a large-diameter section and a small-diameter section, the large-diameter section is provided with a stepped hole having a stepped surface facing upward, a hole wall of the stepped hole is provided with a first stepped portion, and the first stepped portion forms the stop portion;

the large-diameter section and the small-diameter section together form a second stepped portion with a stepped surface facing downward, and the end of the elastic member for abutting against the connecting body abuts against the second stepped portion;

the upper member includes a first annular member having a through hole, the first annular member is arranged on a periphery of the screw rod component, and the first annular member is provided with the first suspension portion; and the lower member includes a second annular member having a through hole, the second annular member is fixedly connected to the connecting body, and the second annular member is provided with the second support portion.

According to the electronic expansion valve having the above structure, the valve needle component includes a valve needle and a second clamping member;

the valve needle includes a main body portion having an open cavity, and a flow regulating portion;

the second clamping member is provided with a second suspension portion, and the end of the elastic member for abutting against the valve needle component abuts against the second suspension portion; and the second clamping member is fixedly connected to the main body portion to form a second connecting chamber, and the second support portion is arranged in the second connecting chamber.

According to the electronic expansion valve having the above structure, the second clamping member includes a bottom plate portion and a cylinder portion, the bottom plate portion has a through hole fitting with the small-diameter section of the connecting body, the bottom plate portion forms the second suspension portion, an accommodating chamber is defined by the bottom plate portion and the cylinder portion, and the end of the elastic member for abutting against the second suspension portion is arranged in the accommodating chamber and abuts against the bottom plate portion.

According to the electronic expansion valve having the above structure, the screw rod component includes a screw rod and a first clamping member fixedly connected to the screw rod, and the screw rod component connecting portion includes the first clamping member and a portion of the screw rod located in the first connecting chamber; and the first clamping member includes a large-diameter ring located between the upper member and the stop portion, and the large-diameter ring forms the first support portion.

An assembly method for an electronic expansion valve having the above technical effects is provided according to the present application, and the electronic expansion valve includes:

a valve body component including an upper valve body and a lower valve body, wherein the valve body component is provided with a valve chamber;

a valve core sleeve at least partially arranged in the valve chamber;

a rotor component arranged in the valve chamber;

a screw rod component including a first support portion;

a nut component, which is sleeved on a periphery of the screw rod component and threadedly connected to the screw rod component;

a valve needle component which can adjust an opening degree of the electronic expansion valve by moving away from or toward a valve port portion, wherein the valve needle component includes a second suspension portion; and an elastic member and a movable connecting component, wherein the movable connecting component includes a first suspension portion and a second support portion.

The assembly method includes the following steps:

S1, assembling the elastic member, the screw rod component, the movable connecting component and the valve needle component to form a first assembly, wherein in the first assembly, the screw rod component suspendingly supports the movable connecting component, the movable connecting component suspendingly supports the valve needle component, the elastic member is arranged outside the movable connecting component, one end of the elastic member abuts against the movable connecting component, and the other end of the elastic member abuts against the valve needle component;

S2, fixedly connecting the lower valve body with the valve core sleeve to form a second assembly;

S3, extending a lower end of the first assembly into the valve core sleeve, sleeving the nut component on the periphery of the screw rod component to form a threaded connection between the nut component and the screw rod component, and then fixedly connecting the nut component with the lower valve body;

S4, fixedly connecting the screw rod component with the rotor component; and

S5, fixedly connecting the upper valve body with the lower valve body.

According to the assembly method for the electronic expansion valve, the movable connecting component includes a connecting body having an upper opening portion and a lower opening portion in communication with each other, and an upper member and a lower member; the connecting body has a stop portion capable of fitting with the screw rod component, the upper member is provided with the first suspension portion, and the lower member is provided with the second support portion;

the screw rod component includes a screw rod and a first clamping member, and the first clamping member is provided with the first support portion;

the valve needle component includes a valve needle and a second clamping member, and the second clamping member is provided with the second suspension portion;

In this case, the step S1 specifically includes:

SA11, arranging the elastic member, the lower member and the second clamping member at a periphery portion of the valve needle, allowing the end of the elastic member for abutting against the movable connecting component to abut against the lower member and the other end to abut against the valve needle;

SA12, fixedly connecting the screw rod with the first clamping member, and arranging the upper member at a periphery portion of the screw rod; and SA13, fixedly connecting the upper member and the lower member to the upper opening portion and the lower opening portion of the connecting body, respectively.

According to the assembly method for the electronic expansion valve, the movable connecting component includes a connecting body having an upper opening portion, an upper member and a lower member, the connecting body has a stop portion capable of fitting with the screw rod component, the upper member is provided with the first suspension portion, and the lower member is provided with the second support portion;

the screw rod component includes a screw rod and a first clamping member, and the first clamping member is provided with the first support portion;

the valve needle component includes a valve needle and a second clamping member, and the second clamping member is provided with the second suspension portion.

In this case, the step S1 specifically includes:

SB11, arranging the elastic member, the second clamping member, and the lower member at a periphery portion of the connecting body, then fixedly connecting the lower member with the connecting body, allowing the end of the elastic member for abutting against the movable connecting component to abut against the connecting body, and allowing the end of the elastic member for abutting against the valve needle component to abut against the second clamping member;

SB12, fixedly connecting the screw rod with the first clamping member, and arranging the upper member at a periphery portion of the screw rod; and SB13, fixedly connecting the upper member with the upper opening portion of the connecting body, and fixedly connecting the valve needle with the second clamping member.

A technical solution of another electronic expansion valve is provided according to the present application, including:

a valve body component having a valve chamber;

a rotor component arranged in the valve chamber;

a screw rod component configured to be driven by the rotor component to move in an axial direction of the valve body component, wherein the screw rod component includes a first support portion;

a movable connecting component including a second support portion and a first suspension portion;

a valve needle component which can adjust an opening degree of the electronic expansion valve by moving away from or toward the valve port portion, wherein the valve needle component includes a second suspension portion; and an elastic member arranged outside the movable connecting component, wherein one end of the elastic member abuts against the movable connecting component, and the other end of the elastic member abuts against the screw rod component; and wherein the first support portion can suspendingly support the first suspension portion, and the second support portion can suspendingly support the second suspension portion;

during a time period from when the valve needle component closes the valve port portion to when the screw rod component moves in a valve closing direction by a predetermined displacement amount, the elastic member does not generate an elastic force for pushing the valve needle component toward the valve port portion; and in a case that a displacement amount of the screw rod component moving in the valve closing direction from a state that the valve needle component closes the valve port portion is greater than the predetermined displacement amount, the elastic member generates the elastic force for pushing the valve needle component toward the valve port portion.

The electronic expansion valve of the technical solution also has the same technical effects.

The electronic expansion valve having the above structure further includes a valve core sleeve, the valve core sleeve is at least partially arranged inside the valve chamber and fixedly connected to the valve body component; both the valve needle component and the movable connecting component are at least partially arranged in the valve core sleeve, and an inner wall of the valve core sleeve forms a guide portion for guiding the movable connecting component and/or the valve needle component.

According to the electronic expansion valve having the above structure, the movable connecting component has a first connecting chamber, the screw rod component includes a screw rod component connecting portion extending into the first connecting chamber, and the screw rod component connecting portion is provided with the first support portion; and the valve needle component includes a stop portion located below the movable connecting component, and as the screw rod component moves in the valve closing direction until the movable connecting component abuts against the stop portion, the elastic member generates the elastic force for pushing the valve needle component toward the valve port portion.

According to the electronic expansion valve having the above structure, the movable connecting component includes a connecting body and a lower member;

the connecting body has an upper opening portion and a lower opening portion in communication with each other, the connecting body is provided with the first suspension portion, and the end of the elastic member for abutting against the movable connecting component abuts against the first suspension portion; and the lower member is fixedly connected to the connecting body to form the first connecting chamber, the first support portion and the second suspension portion are arranged in the first connecting chamber, and the lower member is provided with the second support portion.

According to the electronic expansion valve having the above structure, the connecting body includes a small-diameter cylinder portion arranged on a periphery of the screw rod component, and further includes a large-diameter cylinder portion configured for forming the first connecting chamber, the small-diameter cylinder portion and the large-diameter cylinder portion together form a first stepped portion, and the first stepped portion forms the first suspension portion.

According to the electronic expansion valve having the above structure, the valve needle component includes a valve needle, the valve needle includes a main body portion, a flow regulating portion and a rod portion, the main body portion and the rod portion together form a second stepped portion, and the second stepped portion forms the stop portion; and a portion of the rod portion extending into the first connecting chamber is provided with a first radially protruding portion extending in a radial direction, and the first radially protruding portion forms the second suspension portion.

According to the electronic expansion valve having the above structure, the screw rod component includes a screw rod and a first clamping member fixedly connected to the screw rod, and the screw rod component connecting portion includes the first clamping member and a portion of the screw rod located in the first connecting chamber;

the first clamping member is provided with the first support portion; and a portion of the screw rod located above the movable connecting component is provided with a spring support portion, and the end of the elastic member for abutting against the screw rod component abuts against the spring support portion.

According to the electronic expansion valve having the above structure, the spring support portion includes a second radially protruding portion formed by the screw rod extending in the radial direction, and the end of the elastic member for abutting against the screw rod component abuts against the second radially protruding portion.

According to the electronic expansion valve having the above structure, the valve needle component has a stop portion, and the movable connecting component has a pushing portion; as the screw rod component moves in the valve closing direction until the pushing portion abuts against the stop portion, the elastic member generates the elastic force for pushing the valve needle component toward the valve port portion.

According to the electronic expansion valve having the above structure, the movable connecting component includes a connecting body and a lower member, and the connecting body is provided with the first suspension portion; and the lower member includes a first member fixedly connected to the connecting body and a second member arranged between the first member and the elastic member, the first member is provided with the second support portion, the second member is provided with the pushing portion, and the end of the elastic member for abutting against the movable connecting component abuts against the pushing portion.

According to the electronic expansion valve having the above structure, the screw rod component includes a screw rod and a first clamping member fixedly connected to the screw rod, the first clamping member has an upper opening portion and a lower opening portion, the first clamping member is provided with the first support portion, the end of the elastic member for abutting against the screw rod component abuts against the first clamping member; and the screw rod is fixedly connected to the first clamping member to form a first connecting chamber, and the first suspension portion is arranged in the first connecting chamber.

According to the electronic expansion valve having the above structure, the connecting body includes a small-diameter section fitting with the second member, a large-diameter section fitting with the elastic member, and a suspension section extending into the first connecting chamber;

a first stepped portion is formed between the small-diameter section and the large-diameter section, and the second member abuts the first stepped portion; and the suspension section is provided with the first suspension portion, the first clamping member is provided with a first flange portion protruding inward, and the first flange portion forms the first support portion.

According to the electronic expansion valve having the above structure, the second member is arranged on a periphery of the small-diameter section, the second member includes a straight cylinder portion fitting with the small-diameter section and a first radially protruding portion extending radially from an outer wall of the straight cylinder portion, the first radially protruding portion forms the pushing portion, and the end of the elastic member for abutting against the movable connecting component abuts against the first radially protruding portion.

According to the electronic expansion valve having the above structure, the valve needle component includes a valve needle and a second clamping member fixedly connected to the valve needle, and the second clamping member is provided with the second suspension portion; the second suspension portion is arranged between the pushing portion and the second support portion, a second connecting chamber is defined by the valve needle and the second clamping member, and the second support portion is arranged in the second connecting chamber.

An assembly method for assembling an electronic expansion valve having the above structure is further provided according to the present application, and the electronic expansion valve includes:

a valve body component including an upper valve body and a lower valve body, wherein the valve body is provided with a valve chamber;

a valve core sleeve at least partially arranged in the valve chamber;

a rotor component arranged inside the valve chamber;

a screw rod component including a first support portion;

a nut component, which is sleeved on a periphery of the screw rod component and threadedly connected to the screw rod component;

a valve needle component capable of adjusting an opening degree of the electronic expansion valve by moving away from or toward a valve port portion, wherein the valve needle component includes a second suspension portion; and an elastic member and a movable connecting component, wherein the movable connecting component includes a first suspension portion and a second support portion;

the assembly method includes the following steps:

S1, assembling the elastic member, the screw rod component, the movable connecting component and the valve needle component to form a first assembly, wherein in the first assembly, the screw rod component suspendingly supports the movable connecting component, the movable connecting component suspendingly supports the valve needle component, the elastic member is arranged outside the movable connecting component, one end of the elastic member abuts against the movable connecting component, and the other end of the elastic member abuts against the screw rod component;

S2, fixedly connecting the lower valve body with the valve core sleeve to form a second assembly;

S3, extending a lower end of the first assembly into the valve core sleeve, sleeving the nut component to the periphery of the screw rod component to form a threaded connection between the nut component and the screw rod component, and then fixedly connecting the nut component with the lower valve body;

S4, fixedly connecting the screw rod component with the rotor component; and

S5, fixedly connecting the upper valve body with the lower valve body.

According to the assembly method for the electronic expansion valve, the movable connecting component includes a connecting body having an upper opening portion and a lower opening portion in communication with each other, and a lower member, the connecting body is provided with the first suspension portion, and the lower member is provided with the second support portion;

the screw rod component includes a screw rod and a first clamping member, the screw rod includes a spring support portion, and the first clamping member is provided with the first support portion;

the valve needle component includes a valve needle, the valve needle is provided with a stop portion fitting with the lower member, and the valve needle component is provided with the second suspension portion.

In this case, the step S1 specifically includes:

SC11, mounting the lower member to a periphery portion of the valve needle;

SC12, sleeving the elastic member on the periphery of the screw rod component, and allowing the elastic member to be located between the spring support portion and a lower end portion of the screw rod; allowing the lower end portion of the screw rod to pass through the upper opening portion of the connecting body to be fixedly connected with the first clamping member, allowing the end of the elastic member for abutting against the movable connecting component to abut against the connecting body, and allowing the end of the elastic member for abutting against the screw rod component to abut against the spring support portion; and SC13, fixedly connecting the lower member with the lower opening portion of the connecting body.

According to the assembly method for the electronic expansion valve, the movable connecting component includes a connecting body and a lower member, the connecting body is provided with the first suspension portion, and the lower member is provided with a pushing portion and the second support portion;

the screw rod component includes a screw rod and a first clamping member, and the first clamping member is provided with the first support portion;

the valve needle component includes a valve needle and a second clamping member, and the second clamping member is provided with a stop portion and the second suspension portion.

In this case, the step S1 specifically includes:

SD11, assembling the first clamping member, the elastic member, the lower member, the second clamping member and the connecting body to form a first sub-assembly; and SD12, fixedly connecting the first clamping member of the first sub-assembly with the screw rod, and fixedly connecting the second clamping member of the first sub-assembly with the valve needle, to form the first assembly.

According to the assembly method for the electronic expansion valve, the lower member includes a first member and a second member, and the step SD11 includes: sleeving the second member on a periphery portion of the connecting body, and sleeving the elastic member on the periphery of the connecting body and allowing the elastic member to be located between the first clamping member and the second member; sleeving the second clamping member on a periphery portion of the second member; and fixedly connecting the first member with the connecting body.

According to the assembly method for the electronic expansion valve, in the step S3, both the connecting body and the valve needle have a clearance fit with the valve core sleeve, and the valve core sleeve is configured to guide the movable connecting component and the valve needle component.

DETAILED DESCRIPTION OF EMBODIMENTS

Figure 1:
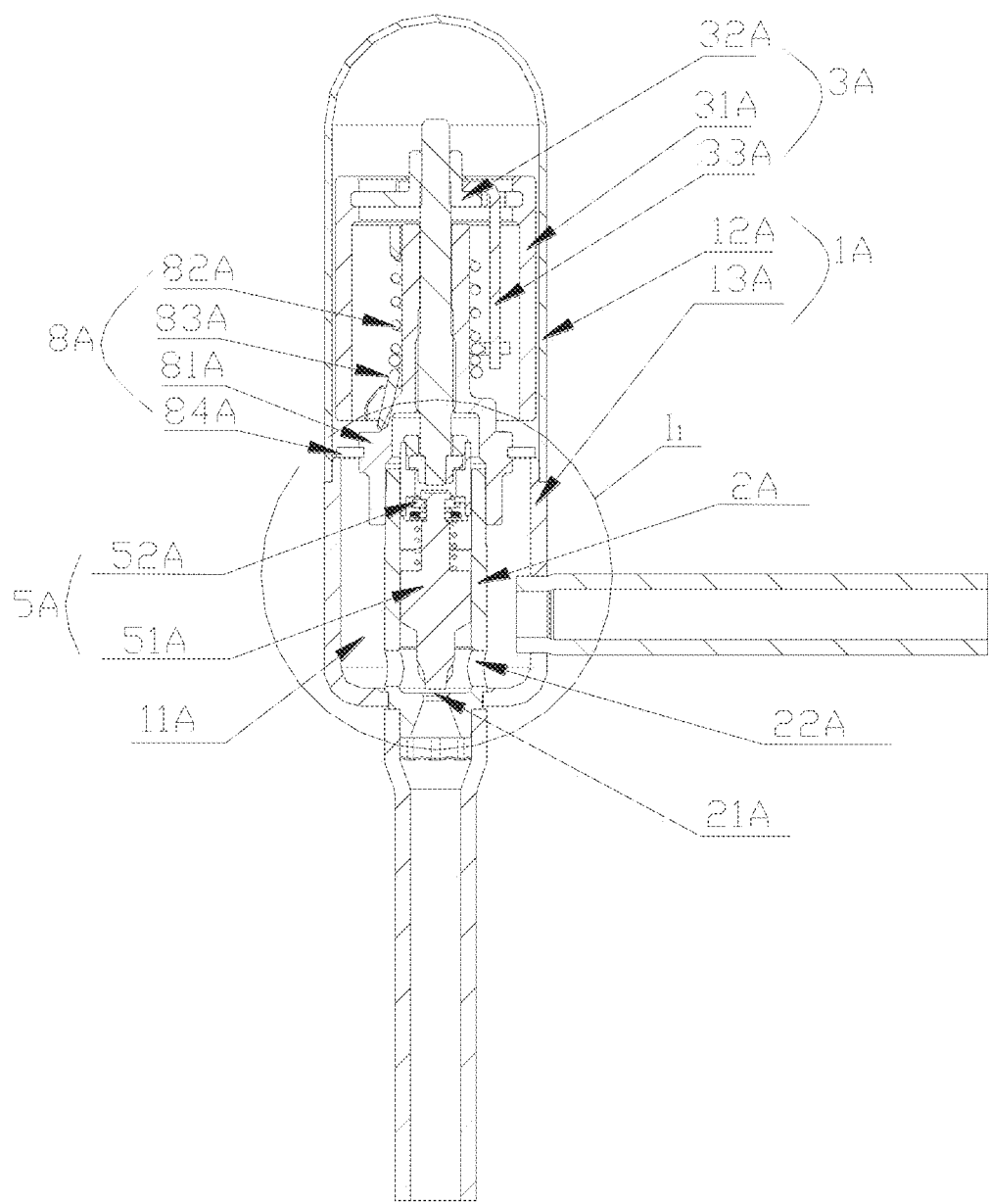
FIG. 1 is a schematic sectional view showing an electronic expansion valve according to a first embodiment of the present application, in which the valve is in a fully valve opened state.

It should be noted that, the orientation terms such as "upper" and "lower" in the application are defined with reference to positions illustrated in the drawings of the specification, and "axial direction" in the application refers to an axial direction of the electronic expansion valve. Specifically, an axial direction of a valve core sleeve of the electronic expansion valve means a vertical direction "from top to bottom" or "from bottom to top" of a paper surface where the drawings of the specification of the application are presented. The term "radial direction" in the application refers to a direction perpendicular to the aforementioned axial direction of the electronic expansion valve. "An elastic member generates an elastic force for pushing a valve needle component toward a valve port portion" means that the elastic member generates a force which causes the valve needle component to further press the valve port portion. "The valve needle component is able to get away from or approach the valve port portion" means that the valve needle component is able to move with respect to the valve port portion in the axial direction, which includes a case in which the valve needle component closes the valve port portion. The orientation terms herein are only used for clear and convenient description of the technical solution and should not be deemed as limit to the protection scope.

It should be further noted that, "suspendingly support" in the application means that one of two components supports the other but the two components are not fixedly connected with each other. More, when the electronic expansion valve is in some states, the two components may move together as an integral body, while when the electronic expansion valve is in some other states, there may be axial and/or radial displacement between the two components.

It should be further noted that, "closed" in the application means that the electronic expansion valve is in a first valve closed state shown in FIG. 3, or FIG. 10, or FIG. 16, or FIG. 21, that is, the state that the valve needle component just closes the valve port portion after the valve needle component moves in a valve closing direction from a valve opened state.

It should further be noted that, "fixedly connected" in the application includes direct fixed connection and as well as indirect fixed connection through other parts. Similarly, "drive" hereinafter includes direct drive, and as well as indirect drive that transmitting movements through other parts.

It should be further noted that, the comparison between an axial displacement amount of a screw rod component and a predetermined displacement amount described herein is based on the first valve closed state shown in FIG. 3, or FIG. 10, or FIG. 16, or FIG. 21, that is, the state that the electronic expansion valve is just closed.

For those skilled in the art to better understand the technical solution of the present application, the present application, especially key features of the present application, will be described further in detail hereinafter in conjunction with the drawings and embodiments.

First Embodiment

Figure 2:
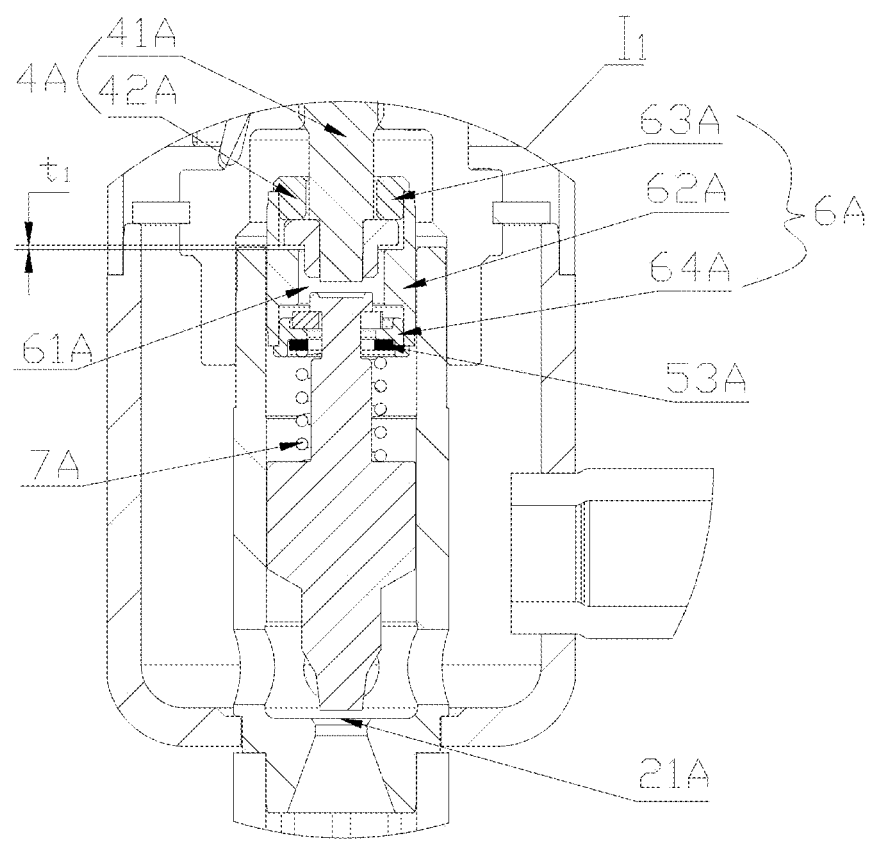
FIG. 2 is a partially enlarged view of a portion I₁ in FIG. 1.
Figure 3:
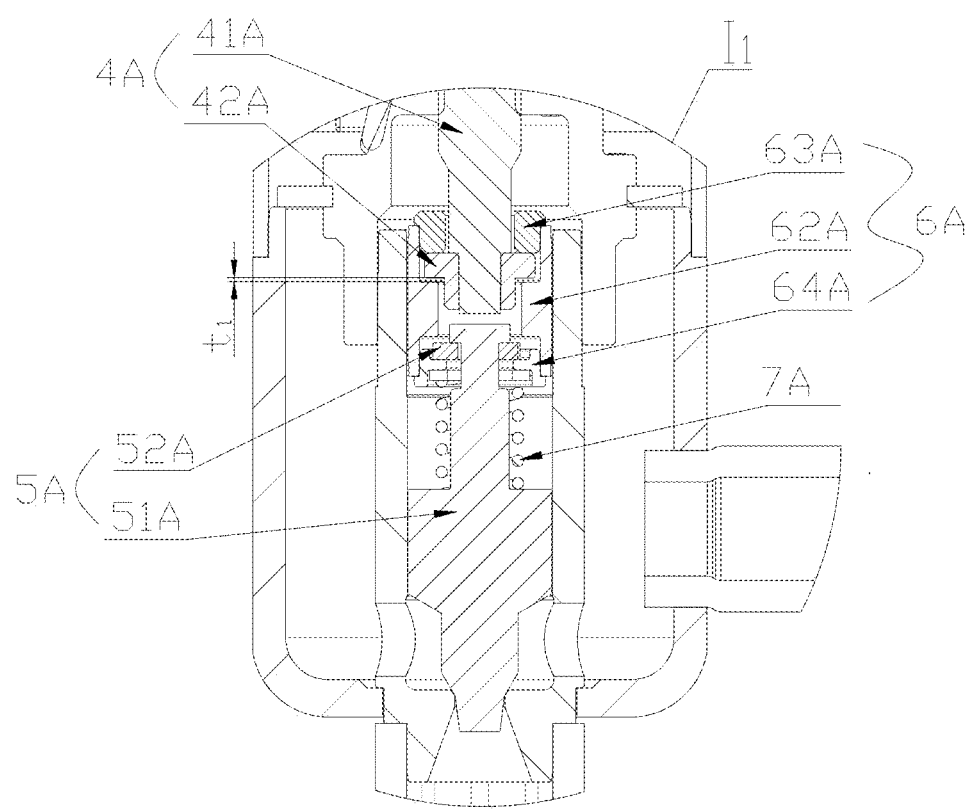
FIG. 3 is a partially enlarged view of the portion I₁ in a case that the electronic expansion valve in FIG. 1 is in a first valve closed state.
Figure 4:
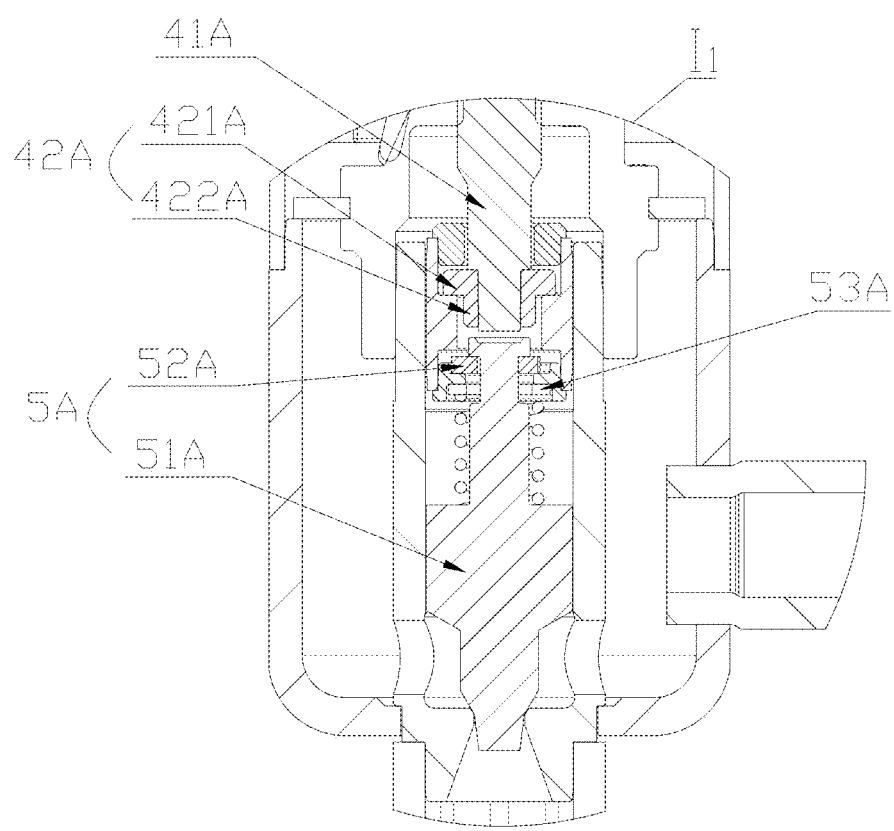
FIG. 4 is a partially enlarged view of the portion I₁ in a case that the electronic expansion valve in FIG. 1 is in a second valve closed state.
Figure 5:
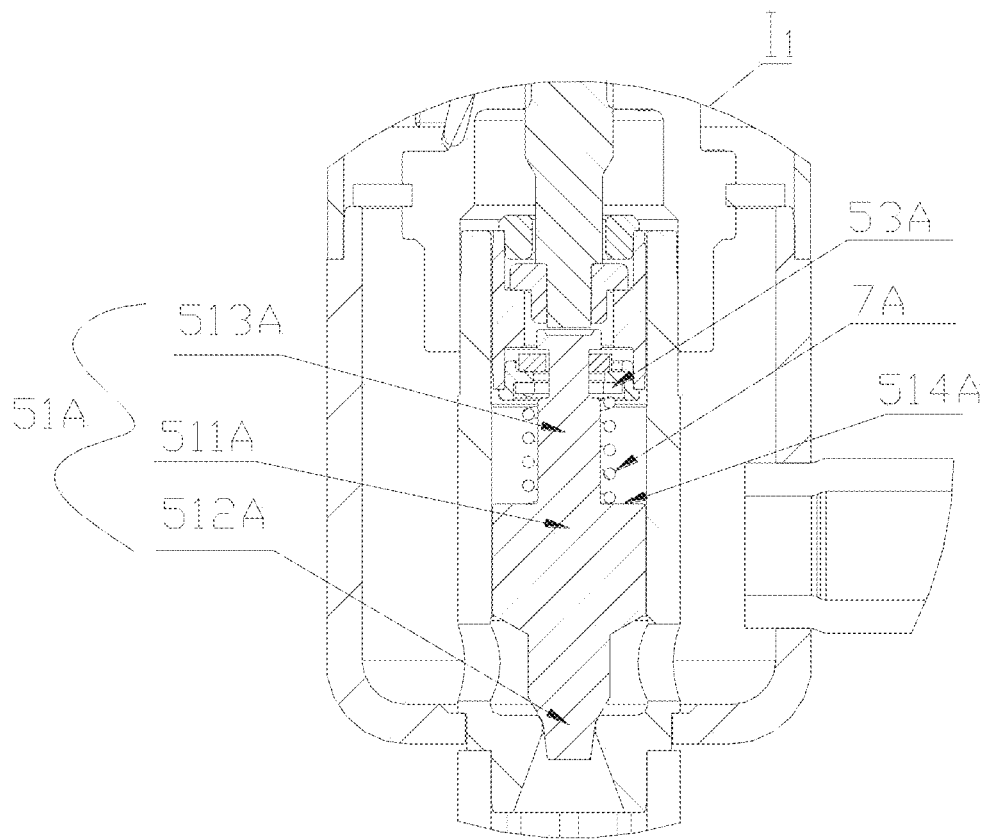
FIG. 5 is a partially enlarged view of the portion I₁ in a case that the electronic expansion valve in FIG. 1 is in a third valve closed state.
Figure 6:
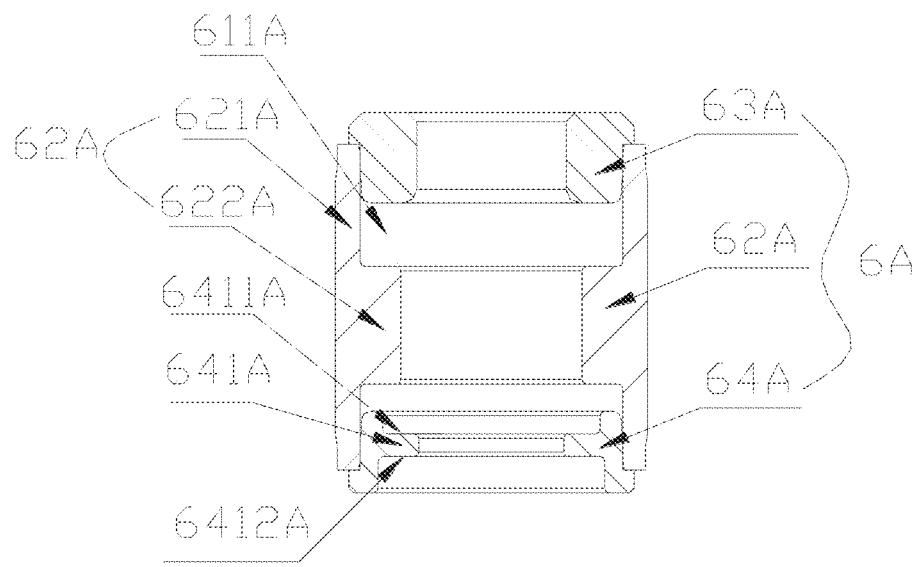
FIG. 6 is a sectional view showing a movable connecting component of the electronic expansion valve in FIG. 1.
Figure 24:
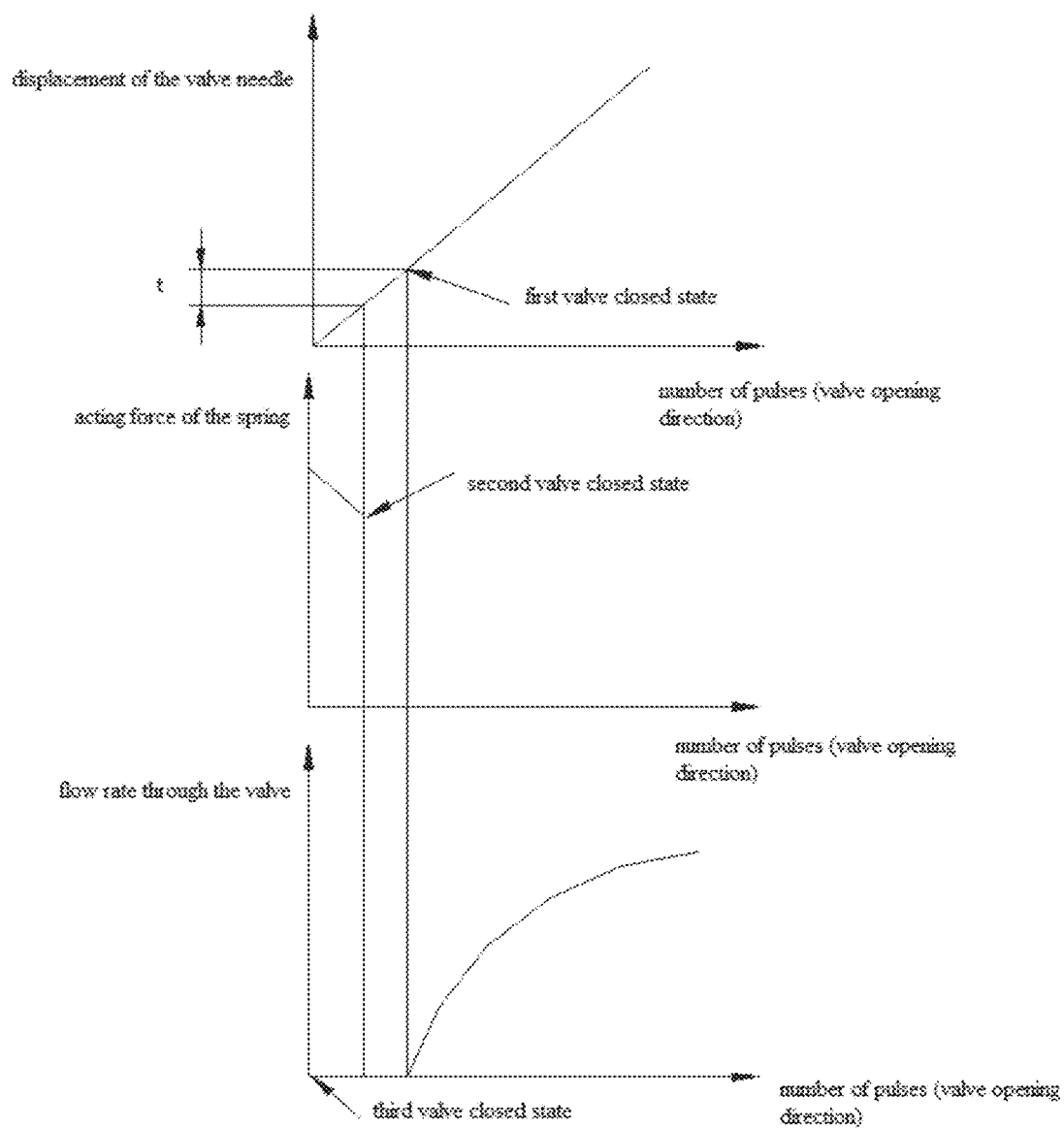
FIG. 24 is a schematic view showing operational characteristics of the electronic expansion valve according to the present application, wherein t represents $t_1$, $t_2$, $t_3$, and $t_4$ in the embodiments, respectively.

Reference is made to FIGS. 1 to 6 and FIG. 24, FIG. 1 is a schematic sectional view showing an electronic expansion valve according to a first embodiment of the present application, FIG. 2 is a partially enlarged view of a portion I₁ in FIG. 1, FIG. 3 is a partially enlarged view of the portion I₁ in a case that the electronic expansion valve in FIG. 1 is in a first valve closed state, FIG. 4 is a partially enlarged view of the portion $I_1$ in a case that the electronic expansion valve in FIG. 1 is in a second valve closed state, FIG. 5 is a partially enlarged view of the portion $I_1$ in a case that the electronic expansion valve in FIG. 1 is in a third valve closed state, FIG. 6 is a sectional view showing a movable connecting component of the electronic expansion valve in FIG. 1, and FIG. 24 is a schematic view showing operational characteristics of an electronic expansion valve according to the present application.

In the following description of the present embodiment, a state shown in FIG. 2 in which the valve is fully opened is defined as a "valve opened state", and in this case, a screw rod component 4A and a movable connecting component 6A are able to move with respect to each other in an axial direction by a distance denoted as $t_1$, that is, a predetermined displacement amount in the present embodiment. A state that a valve needle component 5A closes a valve port portion 21A is defined as the "first valve closed state", as shown in FIG. 3, and in this case, the screw rod component 4A and the movable connecting component 6A are still able to move with respect to each other in the axial direction by the distance $t_1$. A state during a period from the "first valve closed state" shown in FIG. 3 to when an axial displacement amount of the screw rod component 4A moving in the valve closing direction is less than or equal to the predetermined displacement amount $t_1$ is defined as the "second valve closed state", and FIG. 4 is a schematic structural view when a screw rod moves from the first valve closed state by the axial displacement amount equal to $t_1$. And a state that the axial displacement amount of the screw rod component 4A moving from the "first valve closed state" in the valve closing direction is greater than the predetermined displacement amount $t_1$ is defined as the "third valve closed state", as shown in FIG. 5.

As shown in FIGS. 1 and 2, the electronic expansion valve includes a valve body component 1A having a valve chamber 11A, a valve core sleeve 2A, a rotor component 3A, a screw rod component 4A, a valve needle component 5A, and a nut component 8A. Specifically, the valve body component 1A includes an upper valve body 12A and a lower valve body 13A, a first connecting tube is connected to the lower valve body 13A, and the upper valve body 12A is fixedly connected to the lower valve body 13A to form the valve chamber 11A. The rotor component 3A, the screw rod component 4A, and the valve needle component 5A are arranged in the valve chamber 11A. The valve core sleeve 2A is provided with a valve port portion 21A and is fixed to the lower valve body 13A by welding. A lower end portion of the valve core sleeve 2A extends from the valve chamber 11A and is connected to a second connecting tube. That is, in the present embodiment, the valve core sleeve 2A is partially arranged in the valve chamber 11A. The valve needle component 5A is arranged in the valve core sleeve 2A, and the valve needle component 5A may be in contact with or separated from the valve port portion 21A. The rotor component 3A includes a rotor 31A, a connecting seat 32A fixedly connected to the rotor 31A, and a stop rod 33A fixedly connected to the connecting seat 32A. The nut component 8A includes a nut 81A having an internally threaded hole and fixedly connected to the lower valve body 13A through a connecting piece 84A, a spring guide rail 82A fixed to a periphery portion of the nut 81A, and a slip ring 83A. The slip ring 83A is able to slip axially along the spring guide rail 82A. The nut component 8A further includes an upper stop portion and a lower stop portion.

The screw rod component 4A arranged in the valve chamber 11A is fixedly connected to an upper end portion of the rotor component 3A, and external threads of the screw rod component 4A are engaged with the internally threaded hole of the nut component 8A which is fixed to the valve body component 1A.

The screw rod component 4A includes a first support portion. The movable connecting component 6A is suspendingly supported by the screw rod component 4A. Specifically, the movable connecting component 6A includes a second support portion and a first suspension portion which may be supported by the first support portion. The valve needle component 5A is suspendingly supported by the movable connecting component 6A. Specifically, the valve needle component 5A includes a second suspension portion supported by the second support portion of the movable connecting component 6A. An elastic member 7A is arranged outside the movable connecting component 6A, one end of the elastic member abuts against the movable connecting component 6A, and the other end of the elastic member abuts against the valve needle component 5A. In a case that the rotor component 3A drives the screw rod component 4A to reciprocate in an axial direction of the valve body component 1A, the valve needle component 5A responds to movement of the screw rod component 4A under an action of the movable connecting component 6A, to get away from or approach the valve port portion 21A, so as to adjust an opening degree of the electronic expansion valve.

Specifically, when the screw rod component 4A moves to a position where the first support portion suspendingly supports the first suspension portion and the second support portion suspendingly supports the second suspension portion, the screw rod component 4A can drive the movable connecting component 6A to move in the axial direction, and the movable connecting component 6A can drive the valve needle component 5A to move in the axial direction.

During a time period from when the valve needle component 5A closes the valve port portion 21A to when the screw rod component 4A moves in the valve closing direction by the predetermined displacement amount $t_1$, that is, from the state shown in FIG. 3 to the state shown in FIG. 4, the elastic member 7A does not generate an elastic force for pushing the valve needle component 5A toward the valve port portion 21A. In a case that a displacement amount of the screw rod component 4A moving in the valve closing direction from the state that the valve needle component 5A closes the valve port portion is greater than the predetermined displacement amount $t_1$, the elastic member 7A generates the elastic force for pushing the valve needle component 5A toward the valve port portion 21A.

In the present embodiment, the movable connecting component 6A has a first connecting chamber 61A, the screw rod component 4A has a screw rod component connecting portion extending into the first connecting chamber 61A, and the screw rod component connecting portion is provided with the first support portion. The movable connecting component 6A has the first suspension portion facing toward the first connecting chamber 61A and cooperating with the first support portion, and when the screw rod component 4A moves in an valve opening direction to allow the first support portion to abut against the first suspension portion, the screw rod component 4A suspendingly supports the movable connecting component 6A and is able to drive the movable connecting component 6A to move in the axial direction. The valve needle component 5A has a valve needle component connecting portion extending into the first connecting chamber 61A, the valve needle component connecting portion includes the second suspension portion, the movable connecting component 6A includes the second support portion facing toward the first connecting chamber 61A, and when the screw rod component 4A moves in the valve opening direction to allow the second suspension portion to abut against the second support portion, the movable connecting component 6A is able to suspendingly support the valve needle component 5A and drive the valve needle component 5A to move in the axial direction.

The movable connecting component 6A further includes a stop portion arranged below the first support portion. As the screw rod component 4A moves in the valve closing direction until the first support portion abuts against the stop portion, the screw rod component 4A is able to drive the movable connecting component 6A to move in the valve closing direction, so that the elastic member 7A generates the elastic force for pushing the valve needle component 5A toward the valve port portion 21A.

With the above structural design, during a process that the screw rod component 4A moves in the valve closing direction from the valve opened state shown in FIG. 2 to a state that the valve needle component closes the valve port portion 21A, that is, the first valve closed state shown in FIG. 3, the movable connecting component 6A and the valve needle component 5A move synchronously with the screw rod component 4A under the action of their own gravities, which means, during the process, there is no relative displacement among the screw rod component 4A, the movable connecting component 6A, the elastic member 7A, and the valve needle component 5A, and the above four parts may be seen as an integral body during moving. Then, during the second valve closed state, that is, during a process that the valve changes from the state shown in FIG. 3 to the state shown in FIG. 4, the screw rod component 4A moves downward, that is, the screw rod component 4A moves axially, with respect to the movable connecting component 6A, in the valve closing direction within the predetermined displacement amount $t_1$. During the downward movement of the screw rod component 4A, a position of the movable connecting component 6A is kept unchanged by the elastic force of the elastic member 7A, and the elastic member 7A does not generate the elastic force for pushing the valve needle component 5A toward the valve port portion 21A. During a process that the screw rod component 4A continues to move in the valve closing direction from the state shown in FIG. 4 to the state shown in FIG. 5, that is, during the third valve closed state, the screw rod component 4A pushes the movable connecting component 6A, and the movable connecting component 6A pushes the elastic member 7A, to move together in the valve closing direction. During this process, the elastic member 7A is deformed under pressure, to generate the elastic force for pushing the valve needle component 5A toward the valve port portion 21A.

In the present embodiment, the valve needle component 5A is entirely arranged in the valve core sleeve 2A, and in order to better ensure coaxiality of the valve needle component 5A during the above moving process, when the valve needle component 5A reciprocates in the axial direction, an inner wall of the valve core sleeve 2A serves as a guide portion for guiding the valve needle component 5A. As a specific embodiment, the movable connecting component 6A is substantially arranged in the valve core sleeve 2A, and when the movable connecting component 6A reciprocates in the axial direction, the inner wall of the valve core sleeve 2A may also serve as a guide portion for guiding the movable connecting component 6A. The above "substantially" means that in the present embodiment, a small portion of an upper end of the movable connecting component 6A extends out of the valve core sleeve 2A, that is, the movable connecting component 6A is partially arranged in the valve core sleeve 2A. Therefore, to avoid ambiguity, the word "substantially" is used for illustration. It should be understood by those skilled in the art that, the movable connecting component 6A in the present embodiment may also be entirely arranged in the valve core sleeve 2A, that is, the movable connecting component 6A does not extend out of the valve core sleeve 2A. It should be understood that, a lower end portion of the valve needle component 5A may extend out of the valve core sleeve 2A as well, as long as the object of the present application can be achieved. In the present embodiment, the situation that the movable connecting component 6A is substantially arranged in the valve core sleeve 2A is taken as an example for illustration.

In order to better understand the present solution, specific structural designs of the components such as the screw rod component 4A, the valve needle component 5A and the movable connecting component 6A in the present embodiment are described in detail hereinafter.

As shown in FIGS. 2 and 6, the movable connecting component 6A includes a substantially cylinder-like connecting body 62A, an upper end portion of the connecting body 62A has an upper opening portion, a lower end portion of the connecting body 62A has a lower opening portion, and the upper opening portion is in communication with the lower opening portion. The movable connecting component 6A further includes an upper member 63A fixed to the upper opening portion and a lower member 64A fixed to the lower opening portion. The end of the elastic member 7A for abutting against the movable connecting component 6A abuts against the lower member 64A. The upper member 63A is provided with the first suspension portion, the lower member 64A is provided with the second support portion, and specifically the elastic member 7A abuts against the second support portion. The first connecting chamber 61A in the present embodiment is substantially defined by the connecting body 62A, the upper member 63A and the lower member 64A.

The connecting body 62A is provided with the stop portion located below the upper member 63A. Specifically, as shown in FIG. 6, the connecting body 62A is specifically designed as an "H"-shaped structure including a cylinder portion 621A and a first annular boss 622A, and the "H"-shaped structure has a central through hole. The cylinder portion 621A refers to a cylinder portion from an upper end surface portion to a lower end surface portion of the connecting body 62A, and the first annular boss 622A is an annular boss integrated with the cylinder portion 621A and extending radially toward the first connecting chamber 61A from an inner wall of the cylinder portion 621A. The first annular boss 622A forms the stop portion in the present embodiment, and specifically, an upper end surface of the stop portion abuts against the first support portion of the screw rod component 4A.

The upper member 63A is specifically a first annular member having an axial through hole, and the upper member 63A is sleeved on a periphery of the screw rod component 4A and is fixed to the upper opening portion of the connecting body 62A by welding. The first annular member is provided with the first suspension portion facing toward a lower end surface portion of the first connecting chamber 61A, and a certain distance is provided between the first suspension portion and an upper end surface portion of the first annular boss 622A of the connecting body 62A in the axial direction. In this way, an accommodating space 611A located in the first connecting chamber 61A is defined by the upper member 63A, the cylinder portion 621A of the connecting body 62A, and the first annular boss 622A (the stop portion) of the connecting body 62A.

The lower member 64A is fixed to the lower opening portion of the connecting body 62A by welding, and the lower member 64A is provided with the second support portion. In the present embodiment, the lower member 64A is specifically a base member having an axial through hole, and the base member is sleeved on a periphery portion of the valve needle component 5A. More specifically, the base member has an "H"-shaped structure having an axial through hole, and the "H"-shaped structure has a shape similar to that of the connecting body 62A. A part of an inner wall of the base member extends radially to form a second annular boss 641A having an upper end surface portion 6411A and a lower end surface portion 6412A. The second annular boss 641A serves as the second support portion in the present embodiment, and the upper end surface portion 6411A of the second annular boss 641A is configured to abut against a second clamping member described hereinafter. An accommodating groove is defined by the lower end surface portion 6412A and a side wall of the cylinder portion 621A of the connecting body 62A, and a gasket 53A is arranged in the accommodating groove. An upper end of the elastic member 7A directly abuts against a lower end surface portion of the gasket 53A, and the gasket 53A functions to reduce a frictional force between the elastic member 7A and the base member, so as to reduce a frictional force between a valve needle 51A (see hereinafter) and the screw rod component 4A, to prevent the valve needle 51A from rotating with the screw rod component 4A, and thereby reducing abrasion at the valve port portion 21A.

As shown in FIGS. 3 and 4, the screw rod component 4A includes a screw rod 41A and a first clamping member 42A sleeved on and fixed to a lower end portion of the screw rod 41A, and the first clamping member 42A is provided with the first support portion. The screw rod component connecting portion in the present embodiment includes the first clamping member 42A and a portion of the screw rod 41A located in the first connecting chamber 61A. Specifically, the first clamping member 42A is a sleeve member having a central through hole cooperating with the screw rod 41A. The sleeve member includes a large-diameter ring 421A located between the upper member 63A and the first annular boss 622A, and further includes a small-diameter ring 422A extending downward from a lower end surface portion of the large-diameter ring 421A and has a diameter smaller than that of the large-diameter ring 421A. The large-diameter ring 421A serves as the first support portion in the present embodiment. In the present embodiment, the first clamping member 42A is fixed to a lower end portion of the screw rod 41A by welding, and the small-diameter ring 422A is arranged to facilitate welding between the first clamping member 42A and the screw rod 41A. It should be understood that, the first clamping member 42A may not be provided with the small-diameter ring 422A.

The large-diameter ring 421A of the screw rod component 4A is able to move axially within the accommodating space 611A. In a case that the electronic expansion valve is in the valve opened state or the first valve closed state, a lower end surface portion of the upper member 63A abuts against an upper end surface portion of the large-diameter ring 421A of the screw rod component 4A, and the screw rod component 4A suspendingly supports the movable connecting component 6A. In this case, an axial distance between a lower end surface of the large-diameter ring 421A of the screw rod component 4A and an upper end surface of the first annular boss 622A is the predetermined displacement amount $t_1$ described in the present embodiment, and the predetermined displacement amount $t_1$ may be determined according to actual needs.

Figure 7:
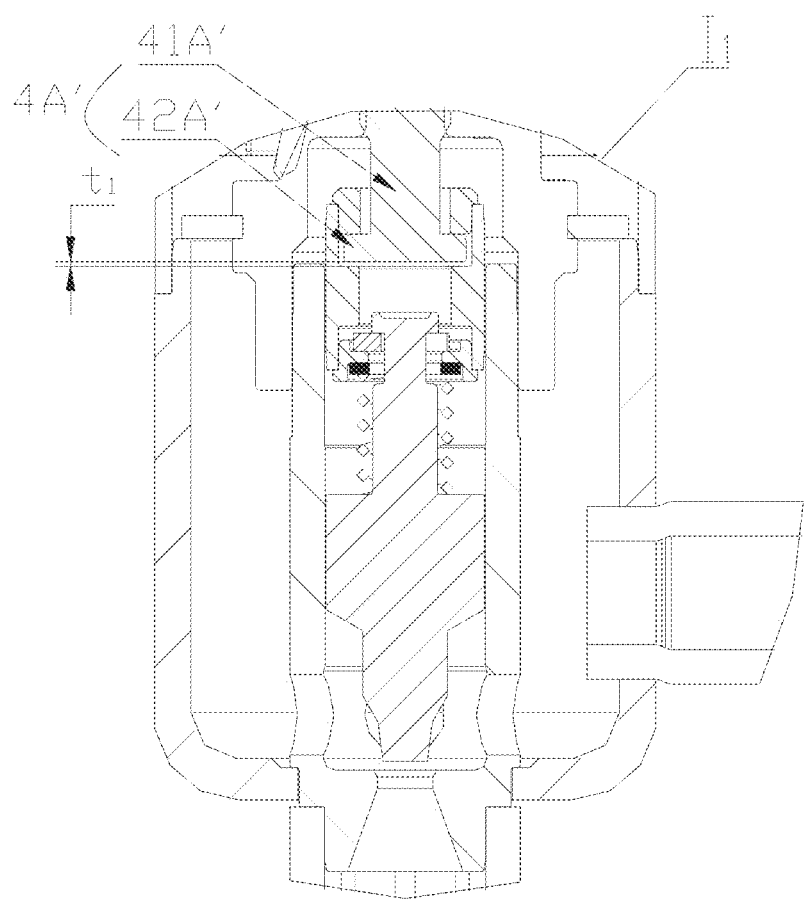
FIG. 7 is a partial sectional view showing a modified embodiment of the electronic expansion valve based on the first embodiment of the present application.

As described above, in the present embodiment, the first clamping member 42A and the screw rod 41A are two independent members, and the above two members are fixed to each other by welding. It should be noted that, the above two members may be integrally formed without affecting the assembling, as shown in FIG. 7, which is a partial sectional view showing a modified embodiment of the electronic expansion valve based on the first embodiment of the present application. In the modified embodiment, a screw rod component 4A' is an integral structure which is integrally machined. The screw rod component 4A' includes a screw rod 41A', and a lower end portion of the screw rod 41A' extends radially to form an annular boss 42A' serving as the second support portion. The above configuration is equivalent to that the screw rod and the first clamping member of the screw rod component shown in FIG. 1 are integrally machined from one component for one time, which saves a process for assembling the screw rod and the first clamping member.

As shown in FIGS. 1 and 5, the valve needle component 5A includes a valve needle 51A, and the valve needle 51A specifically includes a main body portion 511A, a flow regulating portion 512A arranged below the main body portion 511A and can be in contact with or separated from the valve port portion 21A, and a rod portion 513A arranged above the main body portion 511A. When the valve needle 51A reciprocates in the axial direction, the inner wall of the valve core sleeve 2A may serve as a guide portion to guide the main body portion 511A, and the main body portion 511A and the rod portion 513A together form a first stepped portion 514A. The elastic member 7A is sleeved on a periphery of the rod portion 513A, the end of the elastic member 7A for abutting against the movable connecting component 6A directly abuts against the gasket 53A and indirectly abuts against the lower member 64A (the base member) of the movable connecting component 6A, and the end of the elastic member 7A for abutting against the valve needle component 5A abuts against the first stepped portion 514A. It should be understood herein that, the gasket 53A may also be arranged on a stepped surface of the first stepped portion 514A, in this case, a lower end of the elastic member 7A directly abuts against the gasket 53A, and indirectly abuts against the first stepped portion 514A; or, gaskets 53A may be provided both between the elastic member 7A and the lower member 64A and between the elastic member 7A and the first stepped portion 514A, and the function of the gaskets 53A is the same as that described above, which will not be repeated herein.

The valve needle component 5A further includes a second clamping member 52A arranged in the first connecting chamber 61A and sleeved on the periphery of the rod portion 513A of the valve needle 51A. The second clamping member 52A is provided with the second suspension portion. The valve needle component connecting portion in the present embodiment includes the second clamping member 52A and a portion of the rod portion 513A extending into the first connecting chamber 61A in the state shown in FIG. 2. Specifically, the second clamping member 52A is a C-shaped insert piece, which has a function similar to allowing a radial protruding ring having a notch to be formed at the periphery of the rod portion 513A, and the second clamping member 52A abuts against the second support portion to enable the movable connecting component 6A to suspendingly support the valve needle component 5A.

As described above, the second clamping member 52A and the valve needle 51A are two independent members. Of course, the above two members may be integrally formed without affecting the assembly.

It should be noted herein that, in a case that the second clamping member 52A and the valve needle 51A are two independent members, the second clamping member 52A may be fixedly or movably connected to the valve needle 51A. In a case that the second clamping member 52A is movably connected to the valve needle 51A, the second clamping member 52A is merely required to be sleeved on the periphery of the rod portion 513A, and the second clamping member 52A is able to move with respect to the rod portion 513A in the axial direction, as shown in the present embodiment.

In practical arrangement, the first clamping member 42A and the second clamping member 52A may not be arranged in the above structure, as long as the first clamping member 42A and the second clamping member 52A are arranged to cooperate with corresponding structures to achieve the above connection requirements.

In addition, a predetermined radial displacement amount is specifically provided between the second clamping member 52A and the lower member 64A, that is, a certain displacement space in the radial direction is provided between the second clamping member 52A and the lower member 64A. In this way, center alignment of the valve needle component 5A can be automatically performed, so as to enable the flow regulating portion 512A of the valve needle component 5A to cooperate with the valve port portion 21A more easily.

Similarly, in practical arrangement, a predetermined radial displacement amount may also be provided between the screw rod 41A and the connecting body 62A, and between the first clamping member 42A and the connecting body 62A respectively, so that center alignment of the screw rod 41A and the first clamping member 42A can be performed self-adaptively.

Specific structures of the screw rod component 4A, the valve needle component 5A and the movable connecting component 6A in the present embodiment have been described in detail hereinbefore. Operations of the electronic expansion valve in the present embodiment from the valve opened state shown in FIG. 2 to the tightly valve closed state shown in FIG. 5 will be described in detail hereinafter. Reference is made to FIGS. 1 to 6 and FIG. 24, FIG. 24 is a schematic view showing the operational characteristics of an electronic expansion valve according to the present application, including a relationship between the number of pulses of a motor and a displacement of the valve needle, a relationship between the number of pulses of the motor and an acting force of a spring, and a relationship between the number of pulses of the motor and a flow rate through the valve.

An operating process of the valve from the valve opened state shown in FIG. 2 to the first valve closed state shown in FIG. 3 is as follows.

As shown in FIGS. 1 and 2, the electronic expansion valve is in the valve opened state in which the valve needle component 5A is separated from the valve port portion 21A. In the valve opened state, the large-diameter ring 421A of the first clamping member 42A of the screw rod component 4A abuts against the lower end surface portion of the upper member 63A of the movable connecting component 6A, such that the screw rod component 4A suspendingly supports the movable connecting component 6A. The radial predetermined displacement amount $t_1$ is provided between the lower end surface portion of the large-diameter ring 421A and the first annular boss 622A (that is, the stop portion) of the connection body 62A. A lower end surface portion of the second clamping member 52A of the valve needle component 5A abuts against the upper end surface portion 6411A of the second annular boss 641A of the lower member 64A, such that the movable connecting component 6A suspendingly supports the valve needle component 5A.

Starting from the valve opened state, the rotor component 3A of the electronic expansion valve drives the screw rod component 4A to move in the valve closing direction until the flow regulating portion 512A of the valve needle 51A comes into contact with the valve port portion 21A to close the valve port portion 21A, that is, until reaching the first valve closed state shown in FIG. 3. In the above process, the screw rod component 4A, the movable connecting component 6A, the elastic member 7A and the valve needle component 5A together may be seen as an integral body moving axially in the valve closing direction, and a relationship among relative positions of the screw rod component 4A, the movable connecting component 6A, the valve needle component 5A, and the elastic member 7A is the same as that in the valve opened state shown in FIG. 2. The axial predetermined displacement amount $t_1$ is still provided between the lower end surface portion of the large-diameter ring 421A of the first clamping member 42A and the stop portion of the movable connecting component 6A, the elastic member 7A is not compressed and does not generate the elastic force for pushing the valve needle component 5A toward the valve port portion 21A, the valve needle component 5A closes the valve port portion 21A under the action of its own gravity, the valve needle component 5A and the valve port portion 21A are not affected by the elastic force of the elastic member 7A, and even if the valve needle 51A rotates, the valve port portion 21A is only subjected to a frictional force caused by self-weights of the valve needle component 5A and the movable connecting component 6A, which brings very little abrasion to a contact surface between the valve needle 51A and the valve port portion 21A.

An operating process of the valve from the first valve closed state shown in FIG. 3 to the second valve closed state shown in FIG. 4 is as follows.

Starting from the first valve closed state shown in FIG. 3 in which the valve needle 51A closes the valve port portion 21A, the rotor component 3A further drives the screw rod component 4A to move axially in the valve closing direction, and due to the predetermined displacement amount $t_1$ between the large-diameter ring 421A of the first clamping member 42A and the first annular boss 622A, a relationship among positions of the movable connecting component 6A, the valve needle component 5A and the valve port portion 21A does no change, which means, the valve needle component 5A and the movable connecting component 6A do not move downward in the axial direction, and only the screw rod component 4A moves axially downward in the valve closing direction, that is, the screw rod component 4A moves axially with respect to the movable connecting component 6A and the valve needle component 5A. An end point of the second valve closed state is reached when the screw rod component 4A moves downward to a position where the large-diameter ring 421A of the first clamping member 42A abuts against the first annular boss 622A of the connecting body 62A. That is, the second valve closed state is a process in which the displacement amount of the screw rod component 4A moving in the valve closing direction from the first closed valve state is less than or equal to the predetermined displacement amount $t_1$. FIG. 4 is a view showing the state that the displacement amount of the screw rod component 4A is equal to the predetermined displacement amount $t_1$, which is a very moment when the large-diameter ring 421A of the first clamping member 42A just comes into contact with the first annular boss 622A of the movable connecting component 6A but does not apply a force to the first annular boss 622A.

During the process, the elastic member 7A does not generate the elastic force for pushing the valve needle component 5A toward the valve port portion 21A, which means, the contact surface between the valve needle 51A and the valve port portion 21A is not affected by the elastic force of the elastic member 7A. It can be seen that, during the entire process of the second valve closed state, even if the valve needle 51A rotates, the valve port portion 21A is only subjected to the frictional force caused by the self-weights of the valve needle component 5A and the movable connecting component 6A, which brings very little abrasion to the contact surface between the valve needle 51A and the valve port portion 21A.

An operating process of the valve from the second valve closed state shown in FIG. 4 to the third valve closed state shown in FIG. 5 is as follows.

Starting from the second valve closed state shown in FIG. 4, the rotor component 3A further drives the screw rod component 4A to move axially in the valve closing direction. Since the large-diameter ring 421A of the first clamping member 42A of the screw rod component 4A abuts against the first annular boss 622A of the connecting body 62A, the movable connecting component 6A is pressed by the screw rod component 4A to move downward during the downward movement of the screw rod component 4A, such that the elastic member 7A is compressed and deformed to generate the elastic force for pushing the valve needle 51A toward the valve port portion 21A, the elastic force enables the valve needle 51A to seal the valve port portion 21A more reliably, to tightly close the valve port portion 21A, and thereby ensuring the shut-off performance of the valve.

In the process, since the elastic member 7A is compressed, in a case that the frictional force between the valve needle 51A and the screw rod component 4A is greater than the frictional force between the valve needle 51A and the valve port portion 21A, the valve needle 51A rotates together with the screw rod component 4A with respect to the valve port portion 21A, and there is abrasion at a portion where the valve port portion 21A is in contact with the valve needle 51A. In a case that the frictional force between the valve needle 51A and the screw rod component 4A is smaller than the frictional force between the valve needle 51A and the valve port portion 21A, the valve needle 51A does not rotate together with the screw rod component 4A, then there is very little abrasion at the portion where the valve port portion 21A is in contact with the valve needle 51A. Therefore, in order to reduce the frictional force between the valve needle 51A and the screw rod component 4A, the gasket 53A described hereinbefore is provided.

In the process, since the second clamping member 52A is movably sleeved on the periphery of the rod portion 513A of the valve needle 51A, the second clamping member 52A moves downward with respect to the valve needle 51A under the action of its own gravity, and the second clamping member 52A is in contact with the lower member 64A of the movable connecting component 6A, which is equivalent to saying that the second clamping member 52A is supported by the second support portion of the movable connecting component 6A, and the movable connecting component 6A is separated from the valve needle 51A. This state is the third valve closed state, as shown in FIG. 5. In practical arrangement, the second clamping member 52A may be fixed to the valve needle 51A, which is equivalent to saying that the second clamping member 52A and the valve needle 51A are integrally formed. In the process of the third valve closed state, the second clamping member 52A is separated from the second support portion of the movable connecting component 6A.

The valve closing process of the electronic expansion valve is described hereinbefore. During the valve opening process, a similar situation occurs when the valve needle 51A is separated from the valve port portion 21A. At the very moment when the valve needle 51A and the valve port portion 21A are being separated from each other, the frictional force between the valve needle 51A and the valve port portion 21A is caused only by the self-weights of the valve needle component 5A and the movable connecting component 6A, and even if the electronic expansion valve is repeatedly operated, there is very little abrasion at the portion where the valve needle 51A is in contact with the valve port portion 21A.

In summary, according to the electronic expansion valve in the present embodiment, at the very moment when the valve needle 51A closes the valve port portion 21A and the very moment when the valve needle 51A is separated from the valve port portion 21A, and during the process of the second valve closed state, the frictional force between the valve needle 51A and the valve port portion 21A is caused only by the self-weights of the valve needle component 5A and the movable connecting component 6A. In this way, even if the electronic expansion valve is repeatedly operated, there is very little abrasion at the portion where the valve needle 51A is in contact with the valve port portion 21A, and thereby reducing internal leakage of the electronic expansion valve in the valve closed state.

An assembly method for the electronic expansion valve in the present embodiment is described by taking a case that the first clamping member 42A and the screw rod 41A are independent members as shown in FIG. 1.

The assembly method includes the following steps.

S01, processing parts or components required for the electronic expansion valve in the present embodiment, such as processing the valve needle 51A, the second clamping member 52A, the gasket 53A, the elastic member 7A, the connecting body 62A, the upper member 63A, the lower member 64A, the screw rod 41A, the first clamping member 42A, the nut component 8A, the rotor component 3A, the upper valve body 12A, the lower valve body 13A, the valve core sleeve 2A, the second connecting tube, the first connecting tube, etc. of the structure shown in FIGS. 1 to 6. The processed valve needle 51A includes the main body portion 511A, the flow regulating portion 512A and the rod portion 513A, and the main body portion 511A and the rod portion 513A together form the first stepped portion 514A.

S1, assembling the elastic member 7A, the screw rod component 4A, the movable connecting component 6A and the valve needle component 5A to form a first assembly, wherein in the first assembly, one end of the elastic member 7A abuts against the movable connecting component 6A, and the other end of the elastic member 7A abuts against the first stepped portion 514A of the valve needle 51A.

The step S1 specifically includes the following steps.

SA11, allowing the lower end of the elastic member 7A to abut against the first stepped portion 514A of the valve needle 51A, and sleeving the gasket 53A and the lower member 64A on the periphery portion of the valve needle 51A and allow the gasket 53A and the lower member 64A to be located above the elastic member 7A, such that the upper end of the elastic member 7A directly abuts against the gasket 53A and indirectly abuts against the lower member 64A. Then, clamping the second clamping member 52A at the periphery portion of valve needle 51A and allow the second clamping member 52A to be located between the lower member 64A and an upper end portion of the valve needle 51A. That is, in this step, the valve needle 51A, the elastic member 7A, the gasket 53A, the lower member 64A, and the second clamping member 52A are assembled to form a first sub-assembly, and the assembly order among the parts is not limited, as long as the first sub-assembly can be assembled.

SA12, sleeving the first clamping member 42A on the lower end portion of the screw rod 41A and fixing the first clamping member to the lower end portion of the screw rod 41A by welding, and then sleeving the upper member 63A on a periphery portion of the screw rod 41A, to form a second sub-assembly. In this step, the upper member 63A may also be sleeved on the periphery portion of the screw rod 41A first, and then the first clamping member 42A is sleeved on the lower end portion of the screw rod 41A and fixed to the lower end portion of the screw rod 41A by welding.

SA13, fixing the upper member 63A to the upper opening portion of the connecting body 62A by welding, and fixing the lower member 64A to the lower opening portion of the connecting body 62A by welding, to form the first assembly. That is, in this step, after the first sub-assembly and the second sub-assembly are respectively fixed to the connecting body 62A, the assembling of the first assembly is completed.

S2, fixing the lower valve body 13A with the valve core sleeve 2A, the first connecting tube and the second connecting tube by furnace brazing, to form a second assembly. Of course, it should be understood that, the above parts may be connected by other welding methods in this step. In the present embodiment, the valve core sleeve 2A is arranged in the lower valve body 13A and the lower end portion of the valve core sleeve 2A extends out of the lower valve body 13A, the second connecting tube is welded to a periphery of the lower end portion of the valve core sleeve 2A, and the first connecting tube is welded to a side wall of the lower valve body 13A.

S3, inserting a lower end of the valve needle 51A of the first assembly into the valve core sleeve 2A, to allow the valve needle 51A to have a clearance fit with the valve core sleeve 2A, and the connecting body 62A to have a clearance fit with the valve core sleeve 2A as well, in this way, when the valve needle 51A and the connecting body 62A moves axially, the inner wall of the valve core sleeve 2A can serve as a guide portion for guiding the valve needle 51A and the connecting body 62A; sleeving the nut component 8A on the periphery portion of the screw rod 41A, to form a threaded connection between the nut component 8A and the screw rod 41A; and fixing the nut component 8A to the lower valve body 13A by welding.

S4, fixing an upper end portion of the screw rod 41A to the rotor component 3A by welding.

S5, fixing the upper valve body 12A to the lower valve body 13A by welding, to complete the assembling of the electronic expansion valve in the present embodiment.

A difference between the assembling of the electronic expansion valve shown in FIG. 7 and that of the first embodiment lies in that, in the assembling of the electronic expansion valve shown in FIG. 7, there is no assembling step in which the first clamping member is sleeved on the lower end portion of the screw rod and fixed to the lower end portion of the screw rod by welding like the first embodiment, and the rest is the same as that of the first embodiment, which will not be repeated herein.

Second Embodiment

Figure 8:
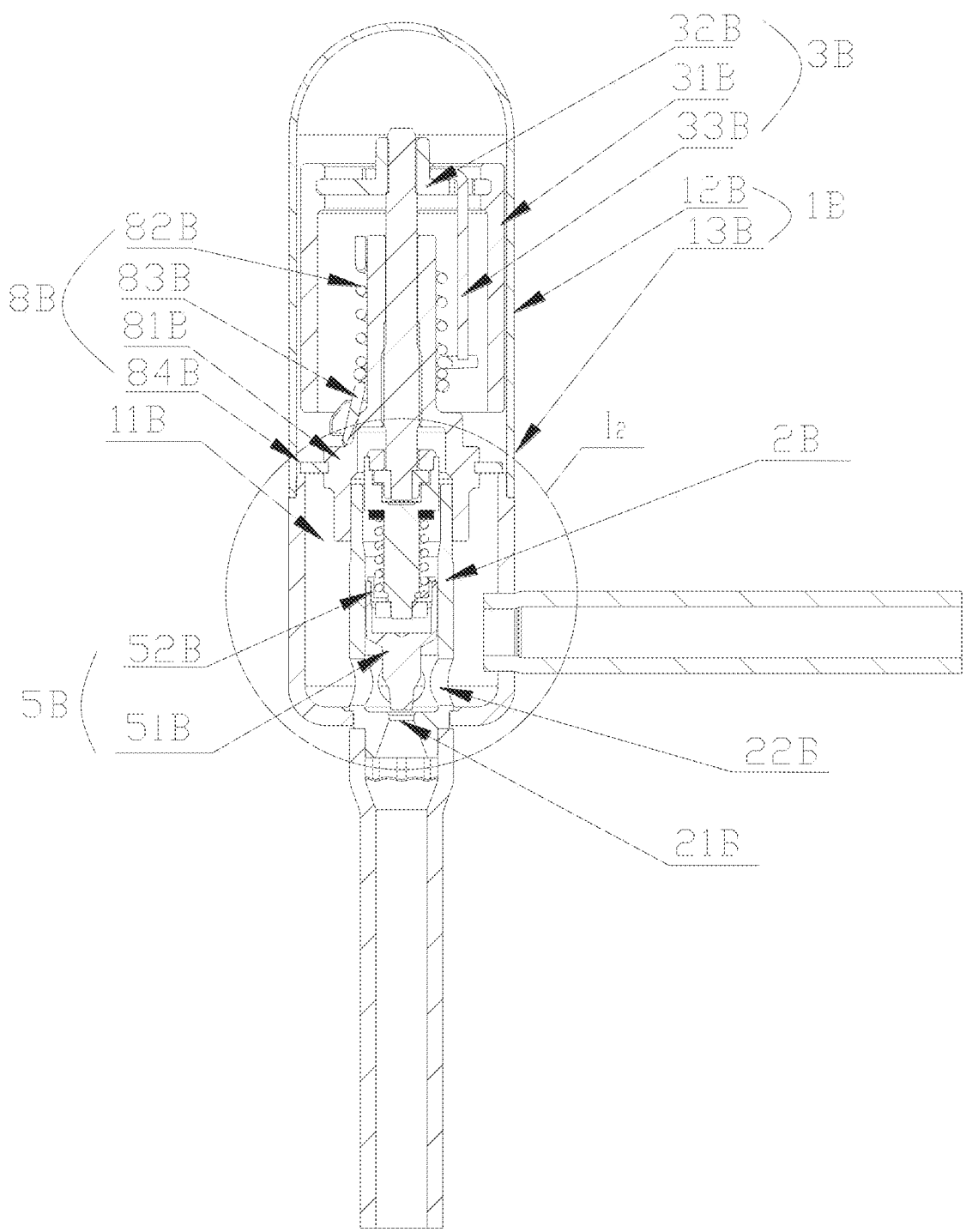
FIG. 8 is a schematic sectional view showing an electronic expansion valve according to a second embodiment of the present application, in which the valve is in a fully valve opened state.
Figure 9:
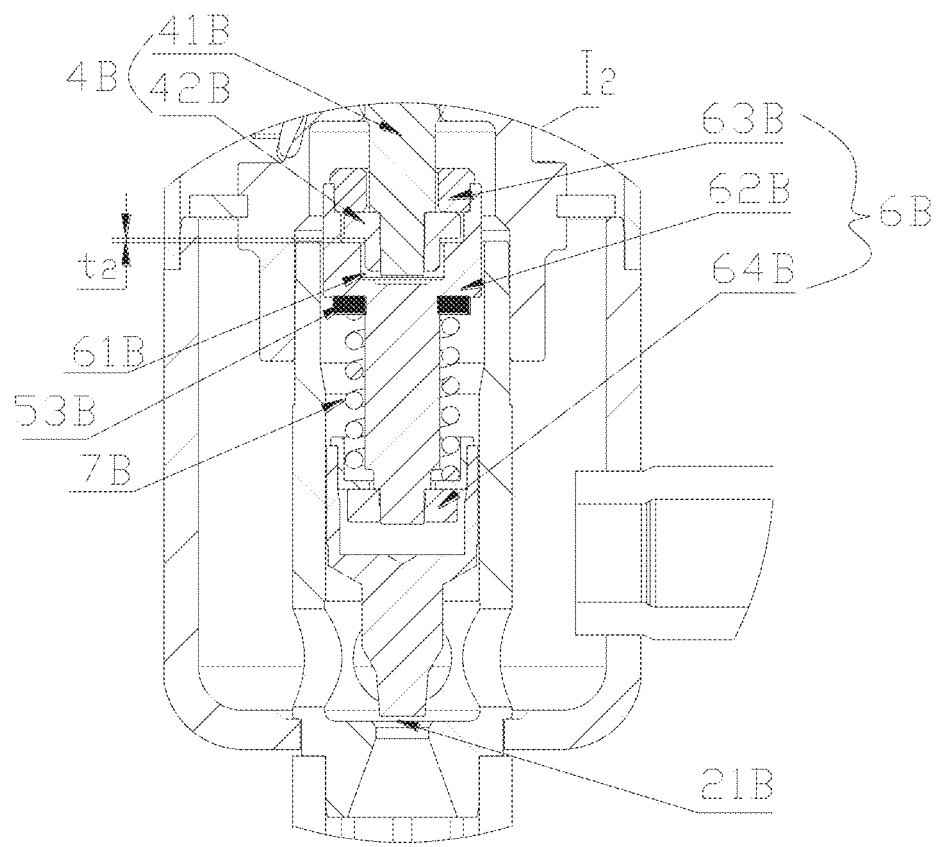
FIG. 9 is a partially enlarged view of a portion I₂ in FIG. 8.
Figure 10:
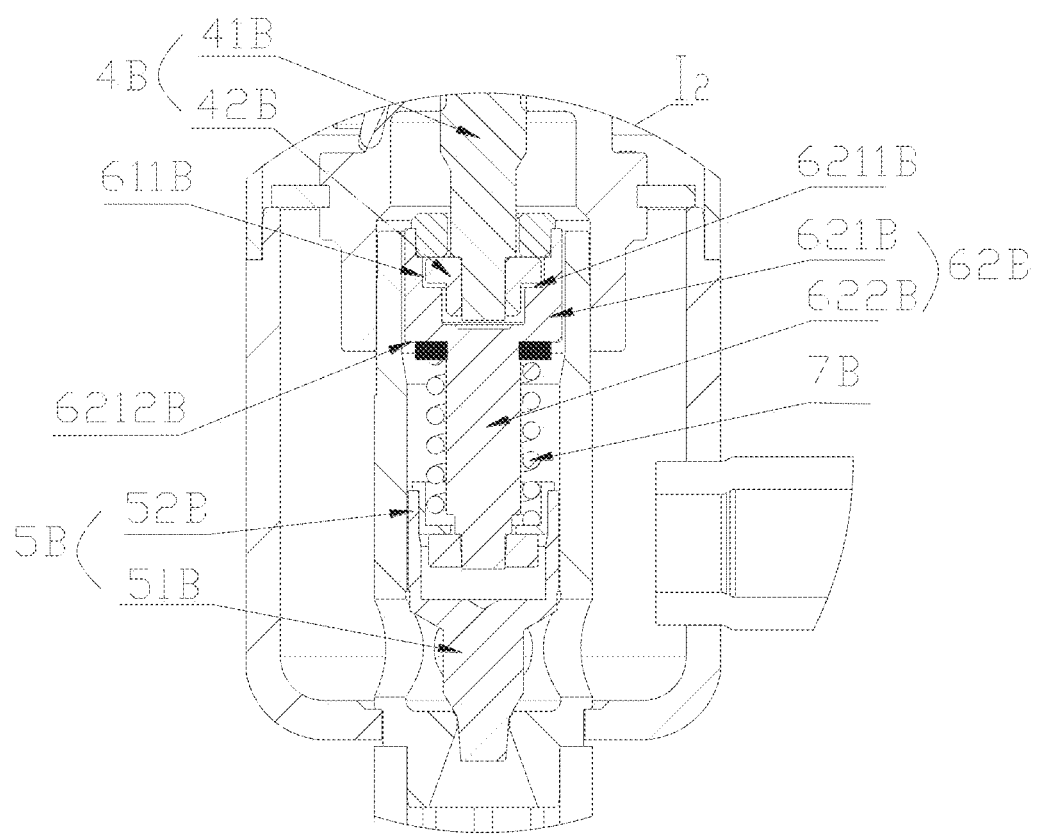
FIG. 10 is a partially enlarged view of the portion I₂ in a case that the electronic expansion valve in FIG. 8 is in a first valve closed state.
Figure 11:
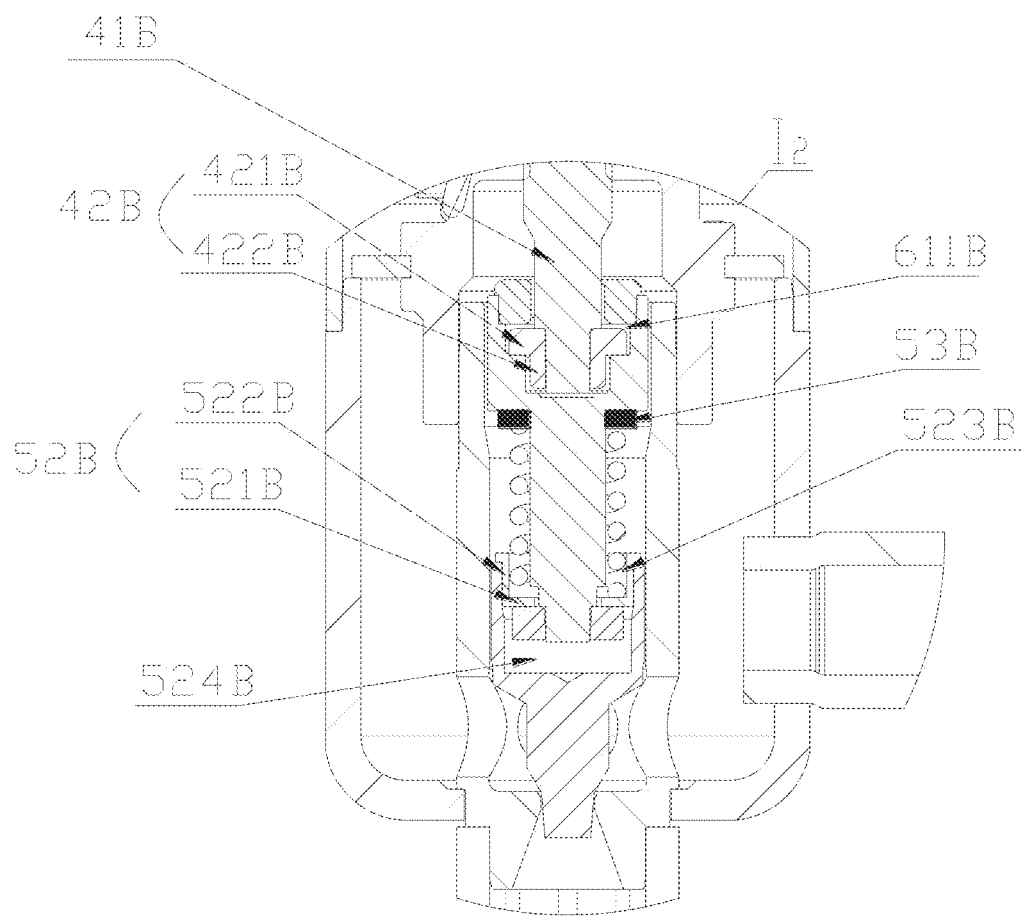
FIG. 11 is a partially enlarged view of the portion I₂ in a case that the electronic expansion valve in FIG. 8 is in a second valve closed state.
Figure 12:
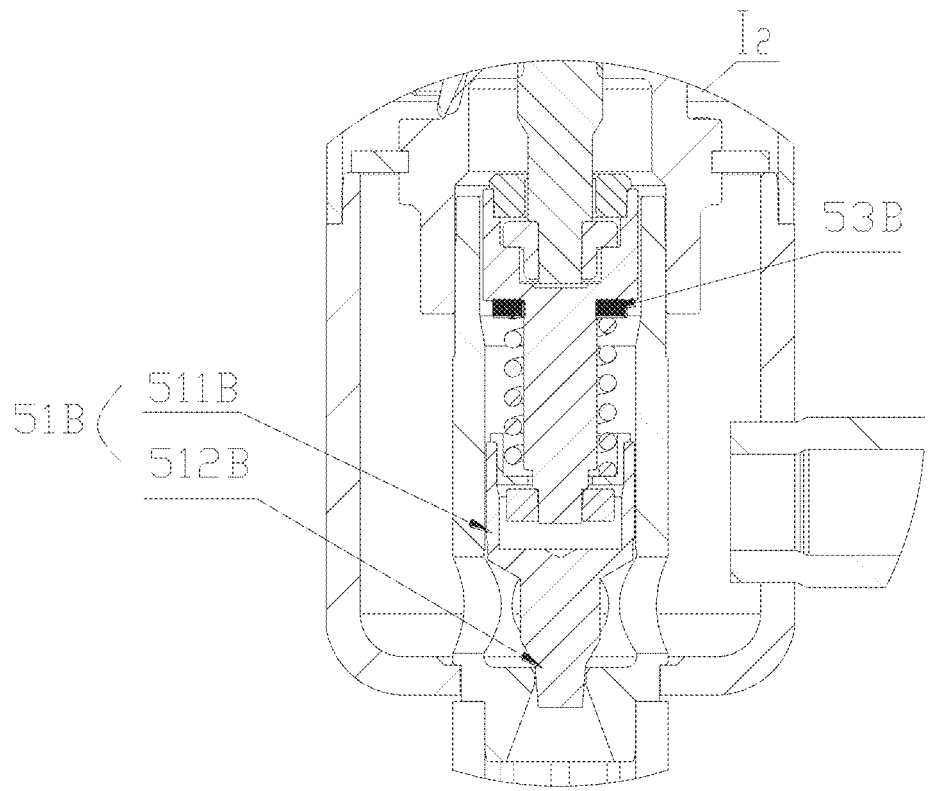
FIG. 12 is a partially enlarged view of the portion I₂ in a case that the electronic expansion valve in FIG. 8 is in a third valve closed state.
Figure 13:
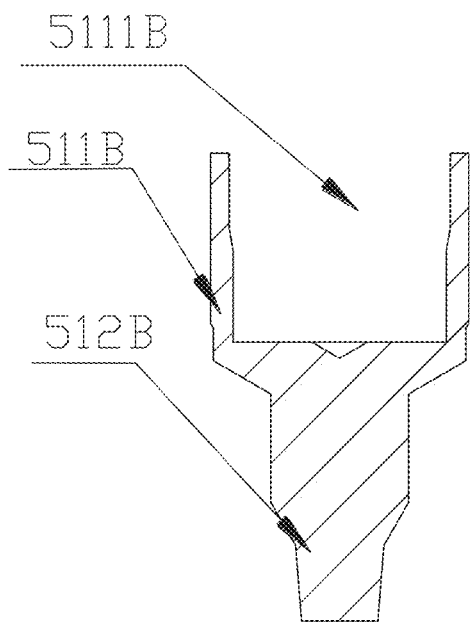
FIG. 13 is a schematic view showing the structure of a valve needle of the electronic expansion valve in FIG. 8.

FIG. 8 is a schematic sectional view showing an electronic expansion valve according a second embodiment of the present application, FIG. 9 is a partially enlarged view of a portion $I_2$ in FIG. 8, FIG. 10 is a partially enlarged view of the portion $I_2$ in a case that the electronic expansion valve in FIG. 8 is in a first valve closed state, FIG. 11 is a partially enlarged view of the portion $I_2$ in a case that the electronic expansion valve in FIG. 8 is in a second valve closed state, FIG. 12 is a partially enlarged view of the portion $I_2$ in a case that the electronic expansion valve in FIG. 8 is in a third valve closed state, and FIG. 13 is a schematic view showing the structure of a valve needle of the electronic expansion valve in FIG. 8.

In the following description of the present embodiment, a state shown in FIG. 9 in which the valve is fully opened is defined as a "valve opened state", and in this case, a screw rod component 4B and a movable connecting component 6B are able to move with respect to each other in an axial direction by a distance denoted as $t_2$, that is, a predetermined displacement amount in the present embodiment. A state that a valve needle component 5B closes a valve port portion 21B is defined as the "first valve closed state", as shown in FIG. 10, and in this case, the screw rod component 4B and the movable connecting component 6B are still able to move with respect to each other in the axial direction by the distance $t_2$. A state during a period from the "first valve closed state" shown in FIG. 3 to when an axial displacement amount of the screw rod component 4B moving in a valve closing direction is less than or equal to the predetermined displacement amount $t_2$ is defined as the "second valve closed state", and FIG. 11 is a schematic structural view showing a state when a screw rod moves from the first valve closed state by the axial displacement amount equal to $t_2$. And a state that the axial displacement amount of the screw rod component 4B moving from the "first valve closed state" in the valve closing direction is greater than the predetermined displacement amount $t_2$ is defined as the "third valve closed state", as shown in FIG. 12.

As shown in FIGS. 8 and 9, the electronic expansion valve includes a valve body component 1B having a valve chamber 11B, a valve core sleeve 2B, a rotor component 3B, a screw rod component 4B, a valve needle component 5B, and a nut component 8B. Specifically, the valve body component 1B includes an upper valve body 12B and a lower valve body 13B, a first connecting tube is connected to the lower valve body 13B, and the upper valve body 12B is fixedly connected to the lower valve body 13B to form the valve chamber 11B. The rotor component 3B, the screw rod component 4B, and the valve needle component 5B are arranged in the valve chamber 11B. The valve core sleeve 2B is provided with a valve port portion 21B and is fixed to the lower valve body 13B by welding. A lower end portion of the valve core sleeve 2B extends from the valve chamber 11B and is connected to a second connecting tube. That is, in the present embodiment, the valve core sleeve 2B is partially arranged in the valve chamber 11B. The valve needle component 5B is arranged in the valve core sleeve 2B, and the valve needle component 5B may be in contact with or separated from the valve port portion 21B. The rotor component 3B includes a rotor 31B, a connecting seat 32B fixedly connected to the rotor 31B, and a stop rod 33B fixedly connected to the connecting seat 32B. The nut component 8B includes a nut 81B having an internally threaded hole and fixedly connected to the lower valve body 13B through a connecting piece 84B, a spring guide rail 82B fixed to a periphery portion of the nut 81B, and a slip ring 83B. The slip ring 83B is able to slip axially along the spring guide rail 82B. The nut component 8B further includes an upper stop portion and a lower stop portion.

The screw rod component 4B arranged in the valve chamber 11B is fixedly connected to an upper end portion of the rotor component 3B, and external threads of the screw rod component 4B are engaged with the internally threaded hole of the nut component 8B which is fixed to the valve body component 1B.

The screw rod component 4B includes a first support portion. The movable connecting component 6B is suspendingly supported by the screw rod component 4B. Specifically, the movable connecting component 6B includes a second support portion and a first suspension portion which may be supported by the first support portion. The valve needle component 5B is suspendingly supported by the movable connecting component 6B. Specifically, the valve needle component 5B includes a second suspension portion supported by the second support portion of the movable connecting component 6B. An elastic member 7B is arranged outside the movable connecting component 6B, one end of the elastic member abuts against the movable connecting component 6B, and the other end of the elastic member abuts against the valve needle component 5B. In a case that the rotor component 3B drives the screw rod component 4B to reciprocate in an axial direction of the valve body component 1B, the valve needle component 5B responds to movement of the screw rod component 4A under an action of the movable connecting component 6B, to get away from or approach the valve port portion 21B, so as to adjust an opening degree of the electronic expansion valve.

Specifically, when the screw rod component 4B moves to a position where the first support portion suspendingly supports the first suspension portion and the second support portion suspendingly supports the second suspension portion, the screw rod component 4B can drive the movable connecting component 6B to move in the axial direction, and the movable connecting component 6B can drive the valve needle component 5B to move in the axial direction.

During a time period from when the valve needle component 5B closes the valve port portion 21B to when the screw rod component 4B moves in the valve closing direction by the predetermined displacement amount $t_2$, that is, from the state shown in FIG. 3 to the state shown in FIG. 4, the elastic member 7B does not generate an elastic force for pushing the valve needle component 5B toward the valve port portion 21B. In a case that a displacement amount of the screw rod component 4B moving in the valve closing direction from the state that the valve needle component 5B closes the valve port portion 21B is greater than the predetermined displacement amount $t_2$, the elastic member 7B generates the elastic force for pushing the valve needle component 5B toward the valve port portion 21B.

In the present solution, the movable connecting component 6B has a first connecting chamber 61B, the screw rod component 4B has a screw rod component connecting portion extending into the first connecting chamber 61B, and the screw rod component connecting portion is provided with the first support portion. The movable connecting component 6B has the first suspension portion facing toward the first connecting chamber 61B and cooperating with the first support portion, and when the screw rod component 4B moves in an valve opening direction to allow the first support portion to abut against the first suspension portion, the screw rod component 4B suspendingly supports the movable connecting component 6B and is able to drive the movable connecting component 6B to move in the axial direction. The valve needle component 5B has a valve needle component connecting portion extending into the first connecting chamber 61B, the valve needle component connecting portion includes the second suspension portion, the movable connecting component 6B is provided with the second support portion facing toward the first connecting chamber 61B, and when the screw rod component 4A moves in the valve opening direction to allow the second suspension portion to abut against the second support portion, the movable connecting component 6B is able to suspendingly support the valve needle component 5B and drive the valve needle component 5B to move in the axial direction.

The movable connecting component 6B further includes a stop portion arranged below the first support portion. As the screw rod component 4B moves in the valve closing direction until the first support portion abuts against the stop portion, the screw rod component 4B is able to drive the movable connecting component 6B to move in the valve closing direction, so that the elastic member 7B generates the elastic force for pushing the valve needle component 5B toward the valve port portion 21B.

With the above structural design, during a process that the screw rod component 4B moves in the valve closing direction from the valve opened state shown in FIG. 9 to a state that valve needle component closes the valve port portion 21B, that is, the first valve closed state shown in FIG. 10, the movable connecting component 6B and the valve needle component 5B moves synchronously with the screw rod component 4B under the action of their own gravities, which means, during the process, there is no relative displacement among the screw rod component 4B, the movable connecting component 6B, the elastic member 7B, and the valve needle component 5B, and the above four parts may be seen as an integral body during moving. Then, during the second valve closed state, that is, during a process from the state shown in FIG. 10 to the state shown in FIG. 11, the screw rod component 4B moves downward, that is, the screw rod component 4B moves axially, with respect to the movable connecting component 6B, in the valve closing direction within the predetermined displacement amount $t_2$. During the downward movement of the screw rod component 4B, a position of the movable connecting component 6B is kept unchanged by the elastic force of the elastic member 7B, and the elastic member 7B does not generate the elastic force for pushing the valve needle component 5B toward the valve port portion 21B. During a process that the screw rod component 4B continues to move in the valve closing direction from the state shown in FIG. 11 to the state shown in FIG. 12, that is, during the third valve closed state, the screw rod component 4B pushes the movable connecting component 6B, and the movable connecting component 6B pushes the elastic member 7B, to move together in the valve closing direction. During the process, the elastic member 7B is deformed under pressure, to generate the elastic force for pushing the valve needle component 5B toward the valve port portion 21B.

In the present embodiment, the valve needle component 5B is entirely arranged in the valve core sleeve 2B, and in order to better ensure coaxiality of the valve needle component 5B during the above moving process, when the valve needle component 5B reciprocates in the axial direction, an inner wall of the valve core sleeve 2B serves as a guide portion for guiding the valve needle component 5B. As a specific embodiment, the movable connecting component 6B is substantially arranged in the valve core sleeve 2B, and when the movable connecting component 6B reciprocates in the axial direction, the inner wall of the valve core sleeve 2B may also serve as a guide portion for guiding the movable connecting component 6B. The above "substantially" means that in the present embodiment, a small portion of an upper end of the movable connecting component 6B extends out of the valve core sleeve 2B, that is, the movable connecting component 6B is partially arranged in the valve core sleeve 2B. Therefore, to avoid ambiguity, the word "substantially" is used for illustration. It should be understood by those skilled in the art that, the movable connecting component 6B in the present embodiment may also be entirely arranged in the valve core sleeve 2B, that is, the movable connecting component 6B does not extend out of the valve core sleeve 2B. It should be understood that, a lower end portion of the valve needle component 5B may extend out of the valve core sleeve 2B as well, as long as the object of the present application can be achieved. In the present embodiment, the situation that the movable connecting component 6B is substantially arranged in the valve core sleeve 2B is taken as an example for illustration.

In order to better understand the present solution, specific structural designs of the components such as the screw rod component 4B, the valve needle component 5B and the movable connecting component 6B in the present embodiment are described in detail hereinafter.

As shown in FIGS. 9 and 10, the movable connecting component 6B includes a connecting body 62B having an upper opening portion, an upper member 63B fixed to the upper opening portion of the connecting body 62B, and a lower member 64B fixed to a lower end portion of the connecting body 62B. The upper member 63B and the connecting body 62B are fixed to form a first connecting chamber 61B. The upper member 63B is provided with the first suspension portion, and the lower member 64B is provided with the second support portion. The elastic member 7B is arranged at a periphery portion of the connecting body 62B, and the end of the elastic member 7B for abutting against the movable connecting component 6B abuts against the connecting body 62B. In addition, the connecting body 62B further includes a stop portion located below the upper member 63B.

Specifically, as shown in FIG. 10, the connecting body 62B is specifically designed to include a large-diameter section 621B, and a small-diameter section 622B extending axially from a lower end surface portion of the large-diameter section 621B toward the valve port portion 21B. The large-diameter section 621B is provided with a stepped hole having a stepped surface facing upward and in communication with the upper opening portion, and a hole wall of the stepped hole is provided with a first stepped portion 6211B. The first stepped portion 6211B is arranged opposite to a lower end surface portion of the upper member 64B, and the first stepped portion 6211B forms the stop portion in the present embodiment. Specifically, the stepped surface of the first stepped portion 6211B may abut against or be separated from the first support portion. The large-diameter section 621B and the small-diameter section 622B together form a second stepped portion 6212B having a stepped surface facing downward, and the end of the elastic member 7B for abutting against the movable connecting component 6B abuts against the second stepped portion 6212B.

The upper member 63B is specifically a first annular member having an axial through hole, and the upper member 63B is sleeved on a periphery of the screw rod component 4B and is fixed to the upper opening portion of the connecting body 62B by welding. The first annular member is provided with the first suspension portion facing toward a lower end surface portion of the first connecting chamber 61B, and a certain distance is provided between a lower end portion of the first annular member and the stepped surface of the first stepped portion 6211B of the connecting body 62B in the axial direction, such that an accommodating space 611B located in the first connecting chamber 61B is formed between the upper member 63B and the first stepped portion 6211B.

The lower member 64B specifically includes a second annular member having a through hole, the lower member 64B is sleeved on a lower end portion of the small-diameter section 622B of the connecting body 62B and fixedly connected thereto by welding, and the second annular member is provided with the second support portion abutting against a second clamping member in the present embodiment.

As shown in FIG. 11, the screw rod component 4B includes a screw rod 41B and a first clamping member 42B sleeved on and fixed to a lower end portion of the screw rod 41B, and the first clamping member 42B is provided with the first support portion. The screw rod component connecting portion in the present embodiment includes the first clamping member 42B and a portion of the screw rod 41B located in the first connecting chamber 61B. Specifically, the first clamping member 42B is a sleeve member having a central through hole cooperating with the screw rod 41B. The sleeve member includes a large-diameter ring 421B located between the upper member 63B and the first stepped portion 6211B, and further includes a small-diameter ring 422B extending downward in the axial direction from the large-diameter ring 421B and has a diameter smaller than that of the large-diameter ring 421B. The large-diameter ring 421B serves as the first support portion in the present embodiment, and the arrangement of the small-diameter section 422B facilitates welding between the screw rod 41B and the first clamping member 42B. It should be understood that, the first clamping member 42B may not be provided with the small-diameter ring 422B.

The large-diameter ring 421B of the screw rod component 4B is able to move axially within the accommodating space 611B. As shown in FIGS. 9 and 11, in a case that the electronic expansion valve is in the valve opened state or the first valve closed state, a lower end surface portion of the upper member 64B abuts against an upper end surface portion of the large-diameter ring 421B of the screw rod component 4B, and the screw rod component 4B suspendingly supports the movable connecting component 6B, moreover, an axial distance between a lower end surface portion of the large-diameter ring 421B and the stepped surface of the first stepped portion 6211B is the predetermined displacement amount $t_2$ described in the present embodiment, and the predetermined displacement amount $t_2$ may be determined according to actual needs.

As described above, in the present embodiment, the first clamping member 42B and the screw rod 41B are two independent members, and the above two members are fixed to each other by welding. It should be noted that, the above two members may be integrally formed without affecting the assembling, which can be understood with reference to FIG. 7 and will not be repeated herein.

As shown in FIGS. 11 to 13, the valve needle component 5B includes a valve needle 51B and a second clamping member 52B, and the valve needle 51B specifically includes a main body portion 511B having an opened chamber 5111B, a flow regulating portion 512B arranged below the main body portion 511B and may be in contact with or separated from the valve port portion 21B. Moreover, when the valve needle 51B reciprocates in the axial direction, the inner wall of the valve core sleeve 2B may serve as a guide portion for guiding the main body portion 511B. An upper end portion of the second clamping member 52B is fixed to an opening portion of the opened chamber 5111B, and a lower end portion of the second clamping member 52B extends into the opened chamber 5111B and is fixedly connected to the main body portion 511B of the valve needle 51B to form a second connecting chamber 524B. The second support portion of the movable connecting component 6B is arranged in the second connecting chamber 524B.

More specifically, the second clamping member 52B specifically includes a bottom plate portion 521B sleeved on a periphery portion of the small-diameter section 622B of the connecting body 62B and is able to abut against the lower member 64B, and a cylinder portion 522B extending axially upward from a peripheral edge of the bottom plate portion 521B to the opening portion of the opened chamber 5111B. An upper end portion of the cylinder portion 522B has an outward flange, and the outward flange is overlapped on an upper end surface of the main body portion 511B and is fixed thereto by welding. The bottom plate portion 521B forms the second suspension portion, and a lower end surface portion of the bottom plate portion 521B abuts against an upper end surface portion of the second clamping member 52B. An accommodating chamber 523B is defined by the bottom plate portion 521B and the cylinder portion 522B. The elastic member 7B is sleeved on a periphery of the small-diameter section 622B of the connecting body 62B, and the other end of the elastic member 7B is arranged in the accommodating chamber 523B to abut against an inner bottom wall of the accommodating chamber 523B, that is, to abut against an upper end surface portion of the bottom plate portion 521B of the second clamping member 52B. Further, in order to reduce a frictional force between the elastic member 7B and the connecting body 62B, so as to reduce a frictional force between the valve needle 51B and the screw rod component 4B, to prevent the valve needle 51B from rotating with the screw rod component 4B, a gasket 53B is arranged between an upper end of the elastic member 7B and the large-diameter section 621B of the connecting body 62B, that is, the gasket 53B is arranged between the second stepped portion 6212B and the elastic member 7B. It can be understood that, the gasket 53B may also be arranged between a lower end of the elastic member 7B and the inner bottom wall of the accommodating chamber 523B, or, gaskets 53B may be provided both between the upper end of the elastic member 7B and the second stepped portion 6212B and between the lower end of the elastic member 7B and the inner bottom wall of the accommodating chamber 523B.

It should be noted herein that, the second clamping member 52B may be fixedly or movably connected to the valve needle 51B. In a case that the second clamping member 52B is movably connected to the valve needle 51B, the second clamping member 52B is overlapped on an upper end surface portion of the main body portion 511B only by the flange of the upper end portion of the second clamping member 52B, and the valve needle 51B and the second clamping member 52B are prevented from being separated from each other under an action of the elastic member 7B.

In practical arrangement, the first clamping member 42B and the second clamping member 52B may also be arranged unlike the above structure, as long as the above two members are arranged to be able to cooperate with corresponding structures to achieve the above connection requirements.

In addition, a predetermined radial displacement amount is specifically provided between the second clamping member 52B and the small-diameter section of the connecting body 62B, that is, a certain displacement space in the radial direction is provided between the second clamping member 52B and the small-diameter section 622B. In this way, center alignment of the valve needle component 5B can be automatically performed, which enables the flow regulating portion 512B of the valve needle component 5B to perfectly cooperate with the valve port portion 21B.

Similarly, in practical arrangement, a predetermined radial displacement amount may also be provided between the screw rod 41B and the first clamping member 42B, and between the first clamping member 42B and the large-diameter section 621B of the connecting body 62B as well, so that center alignment of the screw rod 41B and the first clamping member 42B can be performed self-adaptively.

Specific structures of the screw rod component 4B, the valve needle component 5B and the movable connecting component 6B in the present embodiment have been described in detail hereinbefore. Operations of the electronic expansion valve in the present embodiment from the valve opened state shown in FIG. 9 to the tightly valve closed state shown in FIG. 12 will be described in detail hereinafter in conjunction with FIG. 24.

An operating process of the valve from the valve opened state shown in FIG. 9 to the first valve closed state shown in FIG. 10 is as follows.

As shown in FIGS. 9 and 10, the electronic expansion valve is in the valve opened state in which the valve needle 51B is separated from the valve port portion 21B. In the valve opened state, the large-diameter ring 421B of the first clamping member 42B of the screw rod component 4B abuts against the lower end surface portion of the upper member 63B of the movable connecting component 6B, so that the screw rod component 4B suspendingly supports the movable connecting component 6B. The axial predetermined displacement amount $t_2$ is provided between the lower end surface portion of the large-diameter ring 421B and the first stepped portion 6211B (that is, the stop portion) of the movable connecting component 6B. A lower end surface portion of the second clamping member 52B abuts against an upper end surface portion of the lower member 64B, so that the movable connecting component 6B suspendingly supports the valve needle component 5B.

Starting from the valve opened state, the rotor component 3B of the electronic expansion valve drives the screw rod component 4B to move in the valve closing direction until the flow regulating portion 512B of the valve needle 51B comes into contact with the valve port portion 21B to close the valve port portion 21B, that is, until reaching the first valve closed state shown in FIG. 10. In the above process, the screw rod component 4B, the movable connecting component 6B, the elastic member 7B and the valve needle component 5B together may be seen as an integral body moving axially in the valve closing direction, and a relationship among relative positions of the screw rod component 4B, the movable connecting component 6B, the valve needle component 5B, and the elastic member 7B is the same as that in the valve opened state shown in FIG. 9. The axial predetermined displacement amount t2 is still provided between the lower end surface portion of the large-diameter ring 421B of the first clamping member 42B and the first stepped portion 6211B of the movable connecting component 6B, the elastic member 7B is not compressed and does not generate the elastic force for pushing the valve needle component 5B toward the valve port portion 21B, the valve needle component 5B closes the valve port portion 21B under the action of its own gravity, the valve needle component 5B and the valve port portion 21B are not affected by the elastic force of the elastic member 7B, and even if the valve needle 51B rotates, the valve port portion 21B is only subjected to a frictional force caused by self-weights of the valve needle component 5B and the movable connecting component 6B, which brings very little abrasion to a contact surface between the valve needle 51B and the valve port portion 21B.

An operating process of the valve from the first valve closed state shown in FIG. 10 to the second valve closed state shown in FIG. 11 is as follows.

Starting from when the valve needle 51B closes the valve port portion 21B, the rotor component 3B further drives the screw rod component 4B to move axially in the valve closing direction, and due to the predetermined displacement amount $t_2$ between the large-diameter ring 421B of the first clamping member 42B and the first stepped portion 6211B, a relationship among positions of the movable connecting component 6B, the valve needle component 5B and the valve port portion 21B does no change, which means, the valve needle component 5B and the movable connecting component 6B do not move downward, and only the screw rod component 4B moves downward in the valve closing direction, that is, the screw rod component 4B moves axially with respect to the movable connecting component 6B and the valve needle component 5B. An end point of the second valve closed state is reached when the screw rod component 4B moves downward to a position where the large-diameter ring 421B of the first clamping member 42B abuts against the first stepped portion 6211B (that is, the stop portion) of the connecting body 62B. That is, the second valve closed state is a process in which the displacement amount of the screw rod component 4B moving in the valve closing direction from the first closed valve state is less than or equal to the predetermined displacement amount $t_2$. FIG. 11 is a view showing the state that the displacement amount of the screw rod component 4B is equal to the predetermined displacement amount $t_2$, which is a very moment when the large-diameter ring 421B of the first clamping member 42B just comes into contact with the first stepped portion 6211B of the movable connecting component 6B, but does not apply a force to the first stepped portion 6211B.

During the process, the elastic member 7B does not generate the elastic force for pushing the valve needle component 5B toward the valve port portion 21B, which means, the contact surface between the valve needle 51B and the valve port portion 21B is not affected by the elastic force of the elastic member 7B. It can be seen that, during the entire process of the second valve closed state, even if the valve needle 51B rotates, the valve port portion 21B is only subjected to the frictional force caused by the self-weights of the valve needle component 5B and the movable connecting component 6B, which brings very little abrasion to the contact surface between the valve needle MB and the valve port portion 21B.

An operating process of the valve from the second valve closed state shown in FIG. 11 to the third valve closed state shown in FIG. 12 is as follows.

Starting from the second valve closed state shown in FIG. 11, the rotor component 3B further drives the screw rod component 4B to move in the valve closing direction, in this case, since the large-diameter ring 421B of the first clamping member 42B of the screw rod component 4B abuts against the first stepped portion 6211B of the connecting body 62B, the movable connecting component 6B is pressed by the screw rod component 4B to move downward during the downward movement of the screw rod component 4B. During this process, relative movement in the axial direction is performed between the lower member 64B the second clamping member 52B, that is, the lower member 64B moves downward with respect to the second clamping member 52B, such that the elastic member 7B is compressed and deformed to generate the elastic force for pushing the valve needle MB toward the valve port portion 21B, and the elastic force enables the valve needle MB to seal the valve port portion 21B more reliably, to tightly close the valve port portion 21B, and thereby ensuring the shut-off performance of the valve.

In the process, since the elastic member 7B is compressed, in a case that the frictional force between the valve needle 51B and the screw rod component 4B is greater than the frictional force between the valve needle 51B and the valve port portion 21B, the valve needle 51B rotates together with the screw rod component 4B with respect to the valve port portion 21B, and there is abrasion at a portion where the valve port portion 21B is in contact with the valve needle 51B. In a case that the frictional force between the valve needle 51B and the screw rod component 4B is smaller than the frictional force between the valve needle 51B and the valve port portion 21B, the valve needle 51B does not rotate together with the screw rod component 4B, then there is very little abrasion at the portion where the valve port portion 21B is in contact with the valve needle 51B. Therefore, in order to reduce the frictional force between the valve needle 51B and the screw rod component 4B, the gasket 53B described hereinbefore is provided.

The valve closing process of the electronic expansion valve is described hereinbefore. During the valve opening process, a similar situation occurs when the valve needle 51B is separated from the valve port portion 21B. At the very moment when the valve needle 51B and the valve port portion 21B are being separated from each other, the frictional force between the valve needle 51B and the valve port portion 21B is caused only by the self-weights of the valve needle component 5B and the movable connecting component 6B, and even if the electronic expansion valve is repeatedly operated, there is very little abrasion at the contact surface between the valve needle 51B and the valve port portion 21B.

In summary, according to the electronic expansion valve in the present embodiment, at the very moment when the valve needle 51B closes the valve port portion 21B and the very moment when the valve needle 51B is separated from the valve port portion 21B, and during the process of the second valve closed state, the frictional force between the valve needle 51B and the valve port portion 21B is caused only by the self-weights of the valve needle component 5B and the movable connecting component 6B. In this way, even if the electronic expansion valve is repeatedly operated, there is very little abrasion at the contact surface between the valve needle 51B and the valve port portion 21B, and thereby reducing internal leakage of the electronic expansion valve in the valve closed state.

An assembly method for the electronic expansion valve in the present embodiment is described hereinafter.

The assembly method includes the following steps.

S01, processing parts or components required for the electronic expansion valve in the present embodiment, such as processing the valve needle 51B, the second clamping member 52B, the gasket 53B, the elastic member 7B, the connecting body 62B, the upper member 63B, the lower member 64B, the screw rod 41B, the first clamping member 42B, the nut component 8B, the rotor component 3B, the upper valve body 12B, the lower valve body 13B, the valve core sleeve 2B, the second connecting tube, the first connecting tube, etc. of the structure shown in FIG. 8.

S1, assembling the elastic member 7B, the screw rod component 4B, the movable connecting component 6B and the valve needle component 5B to form a first assembly, wherein in the first assembly, one end of the elastic member 7B abuts against the movable connecting component 6B, and the other end of the elastic member 7B abuts against the valve needle component 5B.

The step S1 specifically includes the following steps.

SB11, sleeving the gasket 53B on the periphery portion of the small-diameter section 622B of the connecting body 62B, and then sleeving the elastic member 7B on the periphery portion of the small-diameter section 622B as well, to allow the end of the elastic member 7B for abutting against the movable connecting component 6B to face the gasket 53B. After the second clamping member 52B and the lower member 64B are sequentially sleeved on the periphery portion of the small-diameter section 622B, fixing the lower member 64B to the lower end portion of the small-diameter section 622B by welding, to complete the assembling of a first sub-assembly. In this way, the end of the elastic member 7B for abutting against the movable connecting component 6B abuts against the lower end surface portion of the large-diameter section 621B of the connecting body 62B, and the end of the elastic member 7B for abutting against the valve needle component 5B abuts against the inner bottom wall of the accommodating chamber 523B of the second clamping member 52B.

SB12, fixing the first clamping member 42B to the lower end portion of the screw rod 41B by welding, and sleeving the upper member 63B on the periphery portion of the screw rod 41B, to form a second sub-assembly.

SB13, fixing the upper member 63B to the upper opening portion of the connecting body 62B by welding, and fixedly connecting the valve needle 51B to the second clamping member 52B by welding, that is, in this step, after the first sub-assembly and the second sub-assembly are respectively fixed to the connecting body 62B, the assembling of the first assembly is completed.

S2, fixing the lower valve body 13B with the valve core sleeve 2B, the first connecting tube and the second connecting tube by furnace brazing, to form a second assembly. Of course, it can be understood that, the above parts may be connected by other welding methods. In the present embodiment, the valve core sleeve 2B is arranged in the lower valve body 13B and the lower end portion of the valve core sleeve 2B extends out of the lower valve body 13B, the second connecting tube is welded to a periphery of the lower end portion of the valve core sleeve 2B, and the first connecting tube is welded to a side wall of the lower valve body 13B.

S3, inserting a lower end of the valve needle 51B of the first assembly into the valve core sleeve 2B, to allow the valve needle 51B and the connecting body 62B to have a clearance fit with the valve core sleeve 2B respectively, so that when the valve needle 51B and the connecting body 62B moves axially, the inner wall of the valve core sleeve 2B can serve as a guide portion for guiding the valve needle 51B and the connecting body 62B; sleeving the nut component 8B on the periphery portion of the screw rod 41B, to form a threaded connection between the nut component 8B and the screw rod 41B; and fixing the nut component 8B to the lower valve body 13B by welding.

S4, fixing an upper end portion of the screw rod 41B to the rotor component 3B by welding.

S5, fixing the upper valve body 12B to the lower valve body 13B by welding, to complete the assembling of the electronic expansion valve.

Third Embodiment

Figure 14:
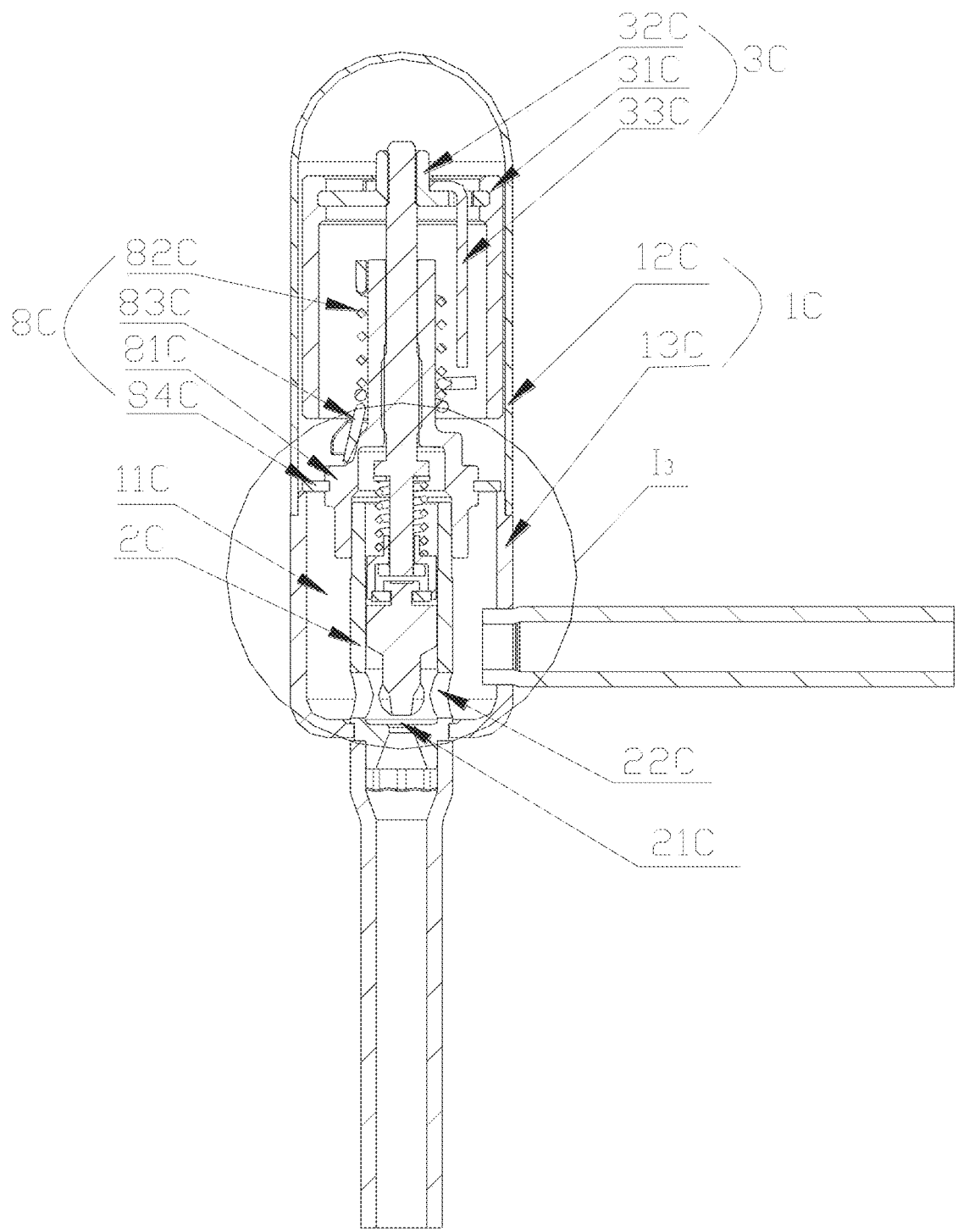
FIG. 14 is a schematic sectional view showing an electronic expansion valve according to a third embodiment of the present application, in which the valve is in a fully valve opened state.
Figure 15:
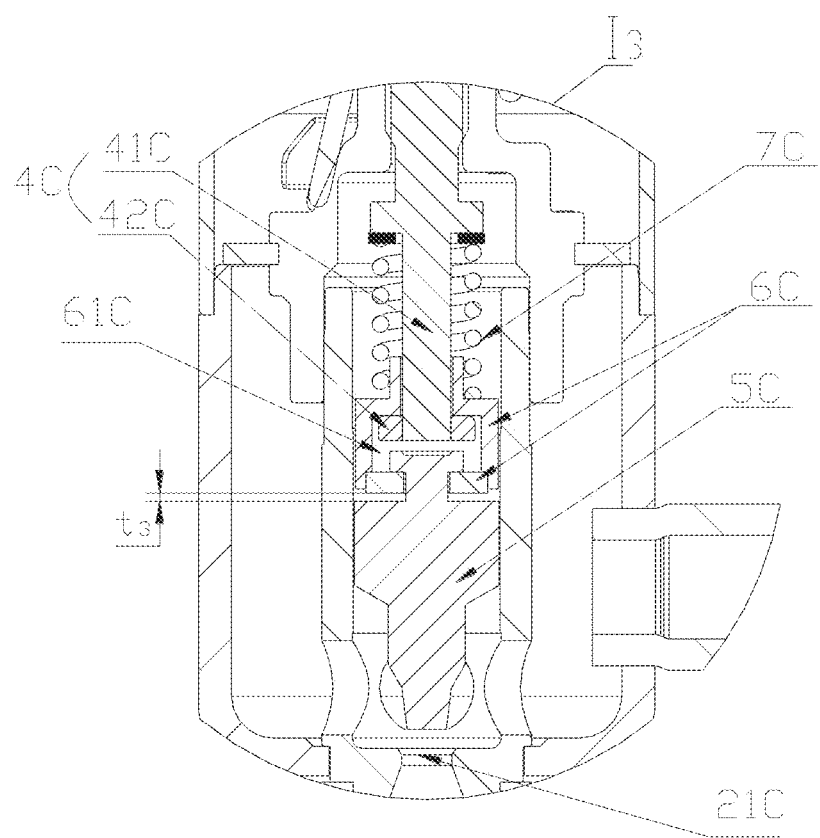
FIG. 15 is a partially enlarged view of a portion I₃ in FIG. 14.
Figure 16:
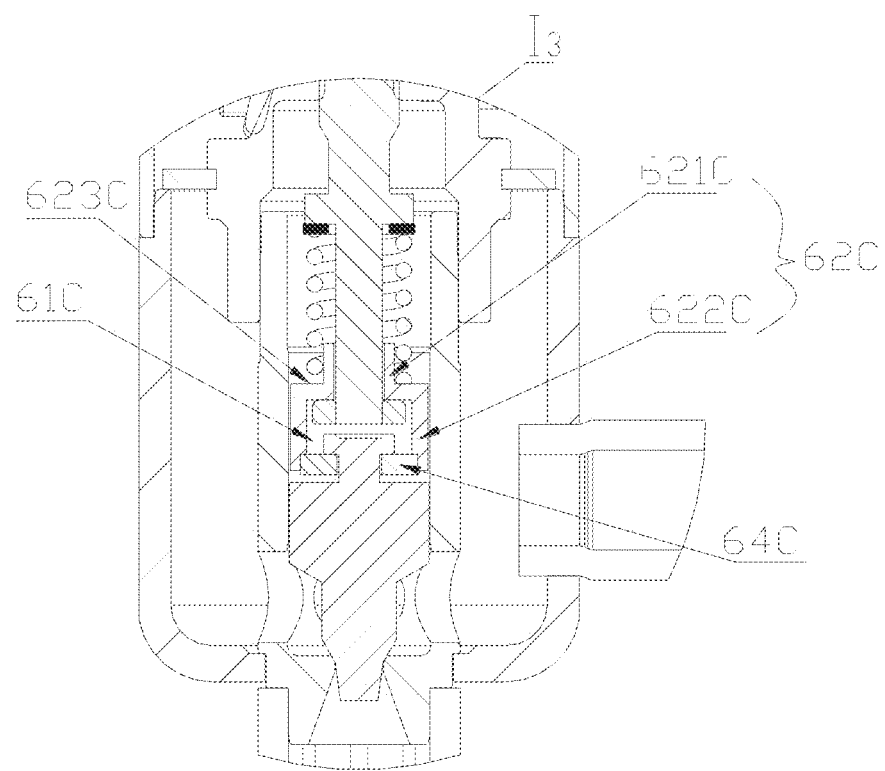
FIG. 16 is a partially enlarged view of the portion I₃ in a case that the electronic expansion valve in FIG. 14 is in a first valve closed state.
Figure 17:
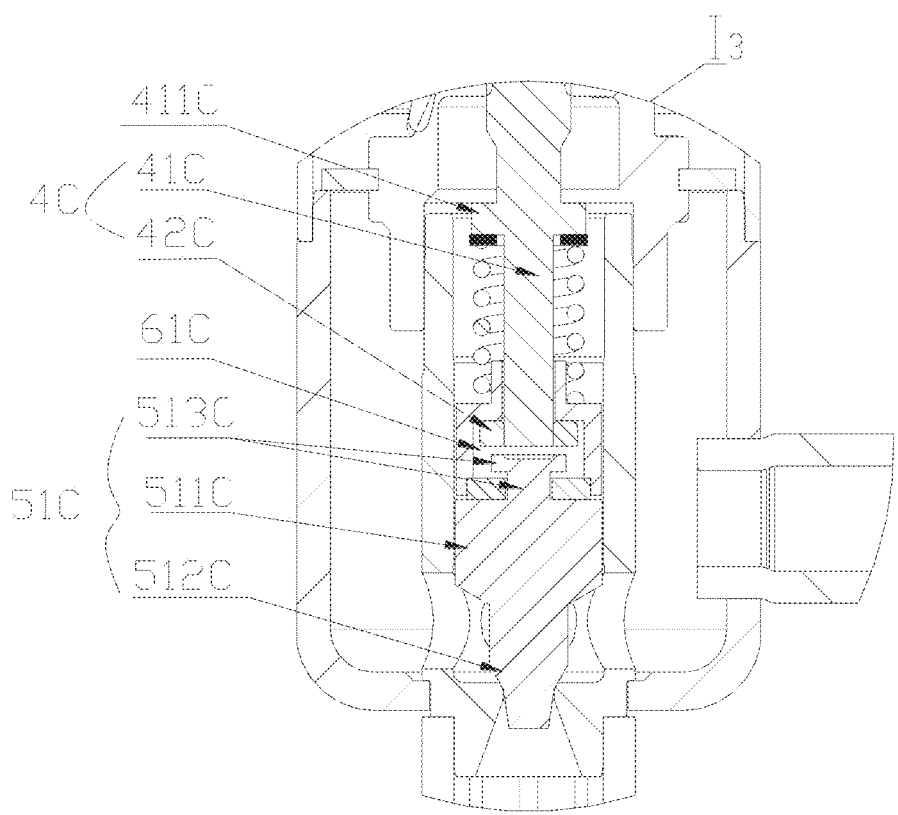
FIG. 17 is a partially enlarged view of the portion I₃ in a case that the electronic expansion valve in FIG. 14 is in a second valve closed state.
Figure 18:
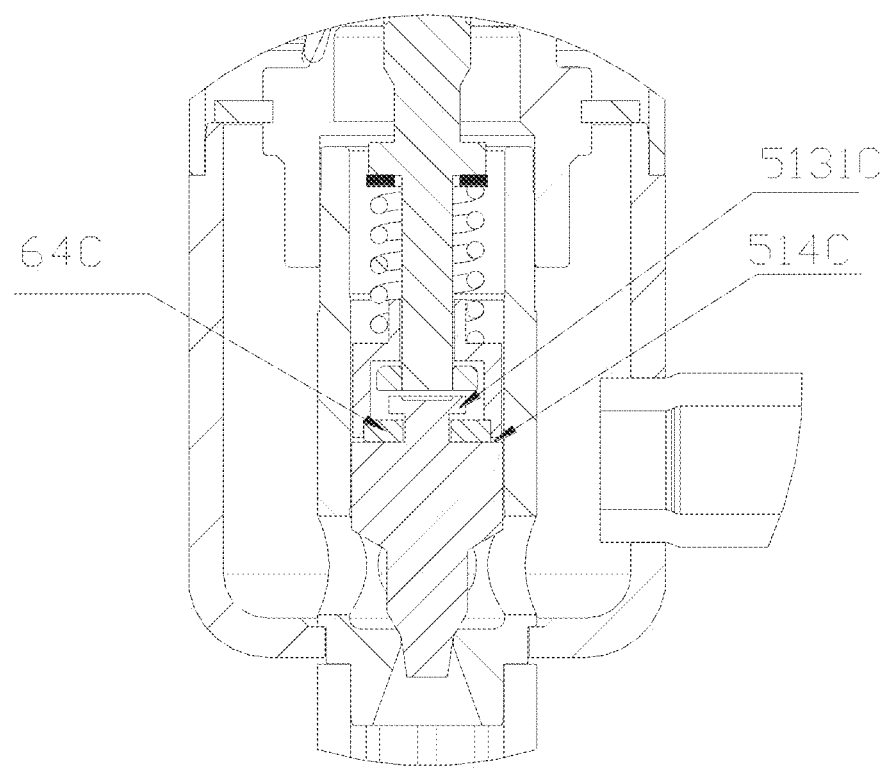
FIG. 18 is a partially enlarged view of the portion I₃ the electronic expansion valve in FIG. 14 is in a third valve closed state.

Referring to FIG. 14, FIG. 14 is a schematic sectional view showing an electronic expansion valve according to a third embodiment of the present application, FIG. 15 is a partially enlarged view of a portion $I_3$ in FIG. 14, FIG. 16 is a partially enlarged view of the portion $I_3$ in a case that the electronic expansion valve in FIG. 14 is in a first valve closed state, FIG. 17 is a partially enlarged view of the portion $I_3$ in a case that the electronic expansion valve in FIG. 14 is in a second valve closed state, and FIG. 18 is a partially enlarged view of the portion $I_3$ in a case that the electronic expansion valve in FIG. 14 is in a third valve closed state.

In the following description of the present embodiment, a state in which the valve is fully opened is defined as a "valve opened state", and in this case, a valve needle component 5C and a movable connecting component 6C are able to move with respect to each other in an axial direction by a distance denoted as $t_3$, that is, a predetermined displacement amount described in the present embodiment, as shown in FIG. 15. A state that the valve needle component 5C closes a valve port portion 21C is defined as the "first valve closed state", as shown in FIG. 16, and in this case, the valve needle component 5C and the movable connecting component 6C are still able to move with respect to each other in the axial direction by the distance $t_3$. A state during a period from the "first valve closed state" shown in FIG. 16 to when an axial displacement amount of the screw rod component 4C moving in a valve closing direction is less than or equal to the predetermined displacement amount $t_3$ is defined as the "second valve closed state", and FIG. 17 is a schematic structural view showing a state when the axial displacement amount equals to $t_3$. And a state that the axial displacement amount of the screw rod component 4C moving from the "first valve closed state" in the valve closing direction is greater than the predetermined displacement amount $t_3$ is defined as the "third valve closed state", as shown in FIG. 18.

As shown in FIGS. 14 and 15, the electronic expansion valve includes a valve body component 1C having a valve chamber 11C, a valve core sleeve 2C, a rotor component 3C, a screw rod component 4C, a valve needle component 5C, and a nut component 8C.

Specifically, the valve body component 1C includes an upper valve body 12C and a lower valve body 13C, a first connecting tube is connected to the lower valve body 13C, and the upper valve body 12C is fixedly connected to the lower valve body 13C to form the valve chamber 11C. The rotor component 3C, the screw rod component 4C, and the valve needle component 5C are arranged in the valve chamber 11C. The valve core sleeve 2C is provided with a valve port portion 21C and is fixed to the lower valve body 13C by welding. A lower end portion of the valve core sleeve 2C extends from the valve chamber 11C and is connected to a second connecting tube. That is, in the present embodiment, the valve core sleeve 2C is partially arranged in the valve chamber 11C. The valve needle component 5C is arranged in the valve core sleeve 2C, and the valve needle component 5C may be in contact with or separated from the valve port portion 21C. The rotor component 3C includes a rotor 31C, a connecting seat 32C fixedly connected to the rotor 31C and a stop rod 33C fixedly connected to the connecting seat 32C. The nut component 8C includes a nut 81C having an internally threaded hole and fixedly connected to the lower valve body 13C through a connecting piece 84C, a spring guide rail 82C fixed to a periphery portion of the nut 81C, and a slip ring 83C. The slip ring 83C is able to slip axially along the spring guide rail 82C. The nut component 8C further includes an upper stop portion and a lower stop portion.

The screw rod component 4C arranged in the valve chamber 11C is fixedly connected to an upper end portion of the rotor component 3C, external threads of the screw rod component 4C are engaged with the internally threaded hole of the nut component 8C which is fixed to the valve body component 1C, and the screw rod component 4C includes a first support portion. The movable connecting component 6C is suspendingly supported by the screw rod component 4C, and specifically, the movable connecting component 6C includes a second support portion, and a first suspension portion which can be supported by the first support portion. The valve needle component 5C is suspendingly supported by the movable connecting component 6C. Specifically, the valve needle component 5C includes a second suspension portion supported by the second support portion of the movable connecting component 6C. An elastic member 7C is arranged outside the movable connecting component 6C, one end of the elastic member abuts against the movable connecting component 6C, and the other end of the elastic member abuts against the screw rod component 4C. When the rotor component 3C drives the screw rod component 4C to reciprocate in the axial direction of the valve body component 1C, the valve needle component 5C responds to movement of the screw rod component 4C under an action of the movable connecting component 6C, to get away from or approach the valve port portion 21C, so as to adjust an opening degree of the electronic expansion valve.

Specifically, when the screw rod component 4C moves to a position where the first support portion suspendingly supports the first suspension portion and the second support portion suspendingly supports the second suspension portion, the screw rod component 4C can drive the movable connecting component 6C to move in the axial direction, and the movable connecting component 6C can drive the valve needle component 5C to move in the axial direction.

During a time period from when the valve needle component 5C closes the valve port portion 21C to when the screw rod component 4C moves in the valve closing direction by the predetermined displacement amount $t_3$, that is, from the state shown in FIG. 16 to the state shown in FIG. 17, the elastic member 7C does not generate an elastic force for pushing the valve needle component 5C toward the valve port portion 21C. In a case that a displacement amount of the screw rod component 4C moving in the valve closing direction from the state that the valve needle component 5C closes the valve port portion 21C is greater than the predetermined displacement amount $t_3$, the elastic member 7C generates the elastic force for pushing the valve needle component 5C toward the valve port portion 21C.

Specifically, the electronic expansion valve includes the movable connecting component 6C having a first connecting chamber 61C, an upper end portion of the valve needle component 5C is arranged in the first connecting chamber 61C, and the movable connecting component 6C suspendingly supports the valve needle component 5C. A lower end portion of the screw rod component 4C is arranged in the first connecting chamber 61C, and can suspendingly support the movable connecting component 6C. A portion of the screw rod component 4C located outside the first connecting chamber 61C is provided with external threads for cooperating with the internally threaded hole of the nut component 8C which is fixed to the valve body component 1C. The rotor component 3C arranged in the valve chamber 11C is fixedly connected to an upper end portion of the screw rod component 4C, and the rotor component 3C can drive the screw rod component 4C to reciprocate in an axial direction of the valve core sleeve 2C. The elastic member 7C is arranged outside the movable connecting component 6C, one end of the elastic member abuts against the movable connecting component 6C, and the other end of the elastic member abuts against the screw rod component 4C. The external threads of the screw rod component 4C are engaged with the internally threaded hole of the nut component 8C which is fixed to the valve body component 1C, and the rotor component 3C arranged in the valve chamber 11C can drive the screw rod component 4C to reciprocate in the axial direction of the valve core sleeve 2C.

During the time period from when the valve needle component 5C closes the valve port portion 21C to when the screw rod component 4C moves in the valve closing direction by the predetermined displacement amount, the elastic member 7C does not generate the elastic force for pushing the valve needle component 5C toward the valve port portion 21C. In a case that the displacement amount of the screw rod component 4C moving in the valve closing direction from the state that the valve needle component 5C closes the valve port portion 21C is greater than the predetermined displacement amount, the elastic member 7C generates the elastic force for pushing the valve needle component 5C toward the valve port portion 21C.

In the present solution, the screw rod component 4C has a screw rod component connecting portion extending into the first connecting chamber 61C, and the screw rod component connecting portion is provided with the first support portion. The movable connecting component 6C has the first suspension portion facing toward the first connecting chamber 61C and cooperating with the first support portion, and when the screw rod component 4C moves in an valve opening direction to allow the first support portion to abut against the first suspension portion, the screw rod component 4C is able to suspendingly support the movable connecting component 6C and drive the movable connecting component 6C to move in the valve opening direction.

The valve needle component 5C has a valve needle component connecting portion extending into the first connecting chamber 61C, the valve needle component connecting portion is provided with the second suspension portion, the movable connecting component 6C is provided with the second support portion facing toward the first connecting chamber 61C, and when the screw rod component 4C moves in the valve opening direction to allow the second suspension portion to abut against the second support portion, the movable connecting component 6C is able to suspendingly support the valve needle component 5C and drive the valve needle component 5C to move in the valve opening direction.

During a process that the screw rod component 4C moves in the valve closing direction from the valve opened state shown in FIG. 15 to the first valve closed state shown in FIG. 16, the movable connecting component 6C and the valve needle component 5C moves synchronously with the screw rod component 4C, which means, during the process, there is no relative displacement among the screw rod component 4C, the movable connecting component 6C, the valve needle component 5C, and the elastic member 7C, and the above four parts may be seen as an integral body during moving. During the second valve closed state, that is, during a process from the state shown in FIG. 16 to the state shown in FIG. 17, since the screw rod component 4C moves downward in the valve closing direction, the movable connecting component 6C moves synchronously with the screw rod component 4C in the valve closing direction under an action of the elastic member 7C, that is, the screw rod component 4C, the elastic member 7C, and the movable connecting component 6C may be seen as an integral body moving with respect to the valve needle component 5C in the valve closing direction, until the displacement amount of the screw rod component 4C is equal to the predetermined displacement amount $t_3$, and the movable connecting component 6C just abuts against a stop portion of the valve needle component 5C. During the process, the elastic member 7C does not generate the elastic force for pushing the valve needle component 5C toward the valve port portion 21C. During a process that the screw rod component 4C continues to move in the valve closing direction, that is, during the third valve closed state, since the movable connecting component 6C abuts against the stop portion of the valve needle component 5C, there is no relative movement between the movable connecting component 6C and the valve needle component 5C in the axial direction, as the screw rod component 4C moves downward, the first support portion of the screw rod component 4C no longer abuts against the first suspension portion of the movable connecting component 6C, the screw rod component 4C pushes the elastic member 7C downward, to allow the elastic member 7C to be deformed under pressure to generate the elastic force applying to the movable connecting component 6C and the valve needle component 5C, that is, the elastic member 7C generates the elastic force for pushing the valve needle component 5C toward the valve port portion 21C.

In the present embodiment, the valve needle component 5C is entirely arranged in the valve core sleeve 2C, and in order to better ensure coaxiality of the valve needle component 5C during the above moving process, when the valve needle component 5C moves in the axial direction, an inner wall of the valve core sleeve 2C serves as a guide portion for guiding the valve needle component 5C. As a specific embodiment, the movable connecting component 6C is entirely arranged in the valve core sleeve 2C, and when the movable connecting component 6C moves in the axial direction, the inner wall of the valve core sleeve 2C may also serve as a guide portion for guiding the movable connecting component. According to the structural arrangement of the valve core sleeve 2C, the movable connecting component 6C may not be arranged in the valve core sleeve 2C.

In order to better understand the present solution, specific structural designs of the components such as the screw rod component 4C, the valve needle component 5C and the movable connecting component 6C in the present embodiment are described in detail hereinafter.

As shown in FIGS. 14 to 16, the movable connecting component 6C includes a connecting body 62C having an upper opening portion and a lower opening portion, and a lower member 64C fixed to the lower opening portion, and the first connecting chamber 61C of the present embodiment is defined by the connecting body 62C and the lower member 64C.

The connecting body 62C is specifically designed to be a cylinder-like structure having a stepped through hole, and the connecting body 62C includes a small-diameter cylinder portion 612C arranged on the screw rod component 4C, and a large-diameter cylinder portion 622C which is bent outward from the small-diameter cylinder portion 621C and then bent downward. The first connecting chamber 61C of the present embodiment is defined by the large-diameter cylinder portion 622C and the lower member 64C. The large-diameter cylinder portion 622C and the small-diameter cylinder portion 621C together form a first stepped portion 623C, and the first stepped portion 623C is the first suspension portion in the present embodiment. Specifically, a lower end surface portion of the first stepped portion 623C is configured to abut against the first support portion of the screw rod component 4C. A lower end of the elastic member 7C is sleeved on a periphery of the small-diameter cylinder portion 621C and abuts against the first stepped portion 623C. In a case that the electronic expansion valve is in the valve opened state or the first valve closed state, the first stepped portion 623C abuts against the first support portion of the screw rod component 4C, and the screw rod component 4C suspendingly supports the movable connecting component 6C.

It should be noted that, in the present embodiment, the connecting body 62C may also not be provided with the small-diameter cylinder portion 621C. However, as an option, the arrangement of the small-diameter cylinder portion 621C has a certain guiding function for the elastic member 7C.

As shown in FIG. 16, the lower member 64C is fixed to the lower opening portion of the connecting body 62C by welding. As a specific design, the lower member 64C includes a first annular sleeve member having a through hole, and the first annular sleeve member is provided with the second support portion in the present embodiment. Specifically, in a case that the electronic expansion valve is in the valve opened state or the first valve closed state, an upper end surface portion of the first annular sleeve member abuts against the second suspension portion of the valve needle component 5C, and in a case that the electronic expansion valve is in the second valve closed state or the third valve closed state, a lower end surface portion of the first annular sleeve member abuts against the stop portion of the valve needle component 5C.

As shown in FIG. 17, the screw rod component 4C includes a screw rod 41C and a first clamping member 42C sleeved on and fixed to a lower end portion of the screw rod 41C, and the screw rod component connecting portion in the present embodiment includes the first clamping member 42C and a portion of the screw rod 41C located in the first connecting chamber 61C. In practical arrangement, the first clamping member 42C is a second annular sleeve member sleeved on and fixed to the lower end portion of the screw rod component, and the second annular sleeve member is provided with the first support portion in the present embodiment. Specifically, as shown in FIG. 17, an upper end surface portion of the second annular sleeve member abuts against the lower end surface portion of the first stepped portion 623C. In addition, unlike the first embodiment, the screw rod 41C is further provided with a spring support portion 411C in the present embodiment. Specifically, the spring support portion 411C is arranged outside the movable connecting component 6C and is located above the movable connecting component 6C, which is specifically a second radially protruding portion formed by the screw rod 41C extending in a radial direction. The end of the elastic member 7C for abutting against the screw rod component 4C abuts against a lower end surface portion of the second radially protruding portion. Moreover, a gasket 53C is arranged to be fitted to the lower end surface portion of the second radially protruding portion. An upper end of the elastic member 7C directly abuts against a lower end surface portion of the gasket 53C, and further indirectly abuts against the second radially protruding portion. The gasket 53C functions to reduce a frictional force between the screw rod 41C and the elastic member 7C, so as to reduce a frictional force between the valve needle 51C and the screw rod 41C, and thereby preventing the valve needle 51C from rotating with the screw rod 41C. It can be understood that, the above gasket 53C may also be arranged at the first stepped portion 623C, and the lower end of the elastic member 7C directly abuts against the gasket 53C, which can realize the function of the gasket 53C as well. Or, gaskets 53C are provided both at a lower end surface portion of second radially protruding portion and at the first stepped portion 623C.

As shown in FIGS. 17 and 18, the valve needle component 5C includes the valve needle 51C, and the valve needle 51C specifically includes a main body portion 511C, a flow regulating portion 512C arranged below the main body portion 511C and is able to be in contact with or separated from the valve port portion 21C, and a rod portion 513C arranged above the main body portion 511C. The inner wall of the valve core sleeve 2C may serve as a guide portion for guiding the main body portion 511C, and the main body portion 511C and the rod portion 513C together form a second stepped portion 514C. The second stepped portion 514C forms the stop portion in the present embodiment. In a case that the electronic expansion valve is in the valve opened state or the first valve closed state, an axial distance between the second stepped portion 514C and the lower end surface portion of the lower member 64C is the predetermined displacement amount $t_3$ in the present embodiment.

The valve needle component connecting portion in the present embodiment includes a portion of the rod portion 513C extending into the first connecting chamber 61C in the state shown in FIG. 17. An upper end portion of the rod portion 513C extends in the radial direction to form a first radially protruding portion 5131C, the first radially protruding portion 5131C is the second suspension portion in the present embodiment, and a lower end surface portion of first radially protruding portion 5131C can abut against the upper end surface portion of the lower member 64C of the movable connecting component 6C, so that the movable connecting component 6C is able to suspendingly support the valve needle component 5C.

It should be noted that, the second suspension portion in the present embodiment is integrally formed with the valve needle 51C directly, and the second suspension portion may also be formed in a way in which the second suspension portion in the first embodiment is formed, that is, a second clamping member having the same structure as that of the first embodiment is provided at a periphery of the rod portion 513C portion of the valve needle 51C.

In practical arrangement, the first support portion and the second suspension portion may also be provided unlike the above structure, as long as the above two members are arranged to be able to cooperate with corresponding structures to achieve the above connection requirements, for example, structures such as a C-shaped insert piece may be employed.

Further, in specific arrangement, a predetermined radial displacement amount is provided between the lower member 64C and the rod portion 513C cooperating with the lower member 64C, that is, there is the predetermined radial displacement amount between a portion of the rod portion 513C, located between the first radially protruding portion 5131C and the main body portion 511C, and the lower member 64C. In this way, a certain displacement space in the radial direction is provided between the lower member 64C and the rod portion 513C, and center alignment of the valve needle component 5C can be performed automatically, so that the flow regulating portion 512C of the valve needle 51C can better cooperate with the valve port portion 21C.

Similarly, in practical arrangement, a predetermined radial displacement amount may also be provided between the screw rod 41C and the small-diameter cylinder portion 611C of the connecting body 61C cooperating with the screw rod 41C, so that center alignment of the above two members can be performed self-adaptively.

Specific structures of the screw rod component 4C, the valve needle component 5C and the movable connecting component 6C in the present embodiment have been described in detail hereinbefore. Operations of the electronic expansion valve in the present embodiment from the valve opened state shown in FIG. 15 to the tightly valve closed state shown in FIG. 18 will be described in detail hereinafter in conjunction with FIG. 24.

An operating process of the valve from the valve opened state shown in FIG. 15 to the first valve closed state shown in FIG. 16 is as follows.

As shown in FIG. 15, the electronic expansion valve is in the valve opened state in which the valve needle 51C is separated from the valve port portion 21C. In the valve opened state, the first clamping member 42C of the screw rod component 4C abuts against the first stepped portion 623C of the connecting body 62C of the movable connecting component 6C, so that the screw rod component 4C suspendingly supports the movable connecting component 6C. The lower end surface portion of the first radially protruding portion 5131C of the rod portion 513C of the valve needle 51C abuts against the upper end surface portion of the lower member 64C of the movable connecting component 6C, so that the movable connecting component 6C suspendingly supports the valve needle component 5C. Starting from the valve opened state, the rotor component 3C of the electronic expansion valve drives the screw rod component 4C to move in the valve closing direction until the flow regulating portion 512C of the valve needle 51C just comes into contact with the valve port portion 21C to close the valve port portion 21C (that is, until reaching the first valve closed state shown in FIG. 16). In the above process, the screw rod component 4C, the movable connecting component 6C, the elastic member 7C and the valve needle component 5C together may be seen as an integral body moving axially in the valve closing direction, and a relationship among relative positions of the above four parts remains unchanged. The predetermined displacement amount $t_3$ in the axial direction between a lower end surface portion of the movable connecting component 6C and the second stepped portion 514C is kept unchanged. The elastic member 7C does not generate the elastic force for pushing the valve needle 51C toward the valve port portion 21C, and the valve needle 51C closes the valve port portion 21C under an action of its own gravity. In this case, even if the valve needle 51C rotates, the valve port portion 21C is only subjected to a frictional force caused by a self-weight of the valve needle component 5C, which brings very little abrasion to a contact surface between the valve needle 51C and the valve port portion 21C.

An operating process of the valve from the first valve closed state shown in FIG. 16 to the second valve closed state shown in FIG. 17 is as follows.

The second valve closed state is a process in which the displacement amount of the screw rod component 4C moving in the valve closing direction from the first closed valve state shown in FIG. 16 is less than or equal to the predetermined displacement amount $t_3$. Specifically, starting from the first valve closed state shown in FIG. 16, the rotor component 3C further drives the screw rod component 4C to move axially in the valve closing direction. In the above process, since the valve needle 51C is supported by the valve port portion 21C, the screw rod component 4C, the elastic member 7C, and the movable connecting component 6C may be seen as an integral body moving downward in the valve closing direction, and axial displacement with respect to the valve needle component 5C is performed. An end point of the second valve closed state is reached when the axial displacement amount of the screw rod component 4C is equal to the predetermined displacement amount $t_3$, at this time, the lower end surface portion of the lower member 64C of the movable connecting component 6C is in contact with the second stepped portion 514C (that is, the stop portion) of the valve needle component 5C, which is a very moment when the lower member 64C of the movable connecting component 6C does not apply a force to the second stepped portion 514C of the valve needle 51C.

During the process, the elastic member 7C does not generate the elastic force for pushing the valve needle 51C toward the valve port portion 21C, and the valve needle 51C and the valve port portion 21C are not affected by the elastic force of the elastic member 7C. The abrasion between the valve needle 51C and the valve port portion 21C is caused by the gravity of the valve needle component 5C, and a degree of the abrasion is extremely small.

An operating process of the valve from the second valve closed state shown in FIG. 17 to the third valve closed state shown in FIG. 18 is as follows.

Starting from the second valve closed state shown in FIG. 17, the rotor component 3C further drives the screw rod component 4C to move downward in the valve closing direction, in this case, the valve needle 51C is supported by the valve port portion 21C, and the lower end surface portion of the lower member 64C of the movable connecting component 6C abuts against the second stepped portion 514C of the valve needle 51C, therefore, when the screw rod component 4C moves axially in the valve closing direction, the spring support portion 411C (the second radially protruding portion) of the screw rod component 4C further pushes the elastic member 7C to move axially in the valve closing direction, relative displacement is generated between the screw rod component 4C and the movable connecting component 6C in the axial direction, and the screw rod component 4C does not suspendingly support the movable connecting component 6C. The elastic member 7C is elastically deformed due to downward pressing of the screw rod component 4C, and the elastic force thereof is transmitted to the valve needle 51C through the movable connecting component 6C, that is, the elastic member 7C generates the elastic force for pushing the valve needle 51C toward the valve port portion 21C, and the elastic force enables the valve needle 51C to seal the valve port portion 21C more reliably, thereby ensuring the shut-off performance of the valve.

In the process, since the elastic member 7C is compressed, in a case that the frictional force between the valve needle 51C and the screw rod component 4C is greater than the frictional force between the valve needle 51C and the valve port portion 21C, the valve needle 51C rotates together with the screw rod component 4C with respect the valve port portion 21C, and there is abrasion at a portion where the valve port portion 21C is in contact with the valve needle 51C. In a case that the frictional force between the valve needle 51C and the screw rod component 4C is smaller than the frictional force between the valve needle 51C and the valve port portion 21C, the valve needle 51C does not rotate together with the screw rod component 4C, then there is very little abrasion at the portion where the valve port portion 21C is in contact with the valve needle 51C. Therefore, in order to reduce the frictional force between the valve needle 51C and the screw rod component 4C, the gasket 53C described hereinbefore is provided.

The valve closing process of the electronic expansion valve is described hereinbefore. During the valve opening process, a similar situation occurs when the valve needle 51C is separated from the valve port portion 21C. At the very moment when the valve needle 51C and the valve port portion 21C are being separated from each other, the frictional force between the valve needle 51C and the valve port portion 21C is caused only by the self-weight of the valve needle component 5C, and even if the electronic expansion valve is repeatedly operated, there is very little abrasion at the contact surface between the valve needle 51C and the valve port portion 21C.

In summary, according to the electronic expansion valve in the present embodiment, at the very moment when the valve needle 51C closes the valve port portion 21C and the very moment when the valve needle 51C is separated from the valve port portion 21C, and during the process of the second valve closed state, the frictional force between the valve needle 51C and the valve port portion 21C is caused only by the self-weight of the valve needle component 5C. In this way, even if the electronic expansion valve is repeatedly operated, there is very little abrasion at the contact surface between the valve needle 51C and the valve port portion 21C, and thereby reducing internal leakage of the electronic expansion valve in the valve closed state.

An assembly method for the electronic expansion valve in the present embodiment is described hereinafter. The assembly method includes the following steps.

S01, processing parts or components required for the electronic expansion valve in the present embodiment, such as processing the valve needle 51C, the second clamping member 52C, the gasket 53C, the elastic member 7C, the connecting body 62C, the lower member 64C, the screw rod 41C, the first clamping member 42C, the nut component 8C, the rotor component 3C, the upper valve body 12C, the lower valve body 13C, the valve core sleeve 2C, the second connecting tube, the first connecting tube, etc. of the structure shown in FIGS. 14 to 18. The processed valve needle includes the main body portion 511C, the flow regulating portion 512C and the rod portion 513C, the main body portion and the rod portion together form the second stepped portion 514C, the second stepped portion 514C serves as the stop portion in the present embodiment, and the upper end portion of the rod portion 513C of the valve needle protrudes in the radial direction to form the second suspension portion in the present embodiment.

S1, assembling the elastic member 7C, the screw rod component 4C, the movable connecting component 6C and the valve needle component 5C to form a first assembly. In the first assembly, one end of the elastic member 7C abuts against the movable connecting component 6C, and the other end of the elastic member 7C abuts against the screw rod component 4C.

The step S1 specifically includes the following steps.

SC11, sleeving the lower member 64C on a periphery portion of the valve needle 51C, to form a first sub-assembly. Specifically, the lower member 64C is located between the second suspension portion and the stop portion of the valve needle.

SC12, sleeving the elastic member 7C on a periphery portion of the screw rod 41C, to allow the upper end of the elastic member 7C to abut against the second radially protruding portion (that is, the spring support portion) of the screw rod component. Inserting the lower end portion of the screw rod 41C into the connecting body 62C, allowing the lower end of the elastic member 7C to abut against the first stepped portion 623C of the connecting body 62C, and fixing the first clamping member 42C to the lower end portion of the screw rod 41C, to form a second sub-assembly.

SC13, fixedly connecting the lower member 64C with the lower opening portion of the connecting body 62C, to form the first assembly.

S2, fixing the lower valve body 13C with the valve core sleeve 2C, the first connecting tube and the second connecting tube by welding, to form a second assembly. In order to simplify the assembling process, in this step, the lower valve body 13C, the valve core sleeve 2C, the first connecting tube and the second connecting tube are fixed together by furnace brazing for one time. In the present embodiment, the valve core sleeve 2C is arranged in the lower valve body 13C and the lower end portion of the valve core sleeve 2C extends out of the lower valve body 13C, the second connecting tube is welded to a periphery of the lower end portion of the valve core sleeve 2C, and the first connecting tube is welded to a side wall of the lower valve body 13C.

S3, inserting a lower end of the valve needle 51C of the first assembly into the valve core sleeve 2C, to allow the valve needle 51C and the connecting body 62C to have a clearance fit with the valve core sleeve 2C respectively, so that when the valve needle 51C and the connecting body 62C moves axially, the valve core sleeve 2C can guide the valve needle 51C and the connecting body 62C; sleeving the nut component 8C on the periphery portion of the screw rod 41C, to form a threaded connection between the nut component 8C and the screw rod 41C; and fixing the nut component 8C to the lower valve body 13C by welding.

S4, fixing the screw rod 41C to the rotor component 3C by welding.

S5, fixing the upper valve body 12C to the lower valve body 13C by welding, to complete the assembling of the electronic expansion valve in the present embodiment.

Fourth Embodiment

Figure 19:
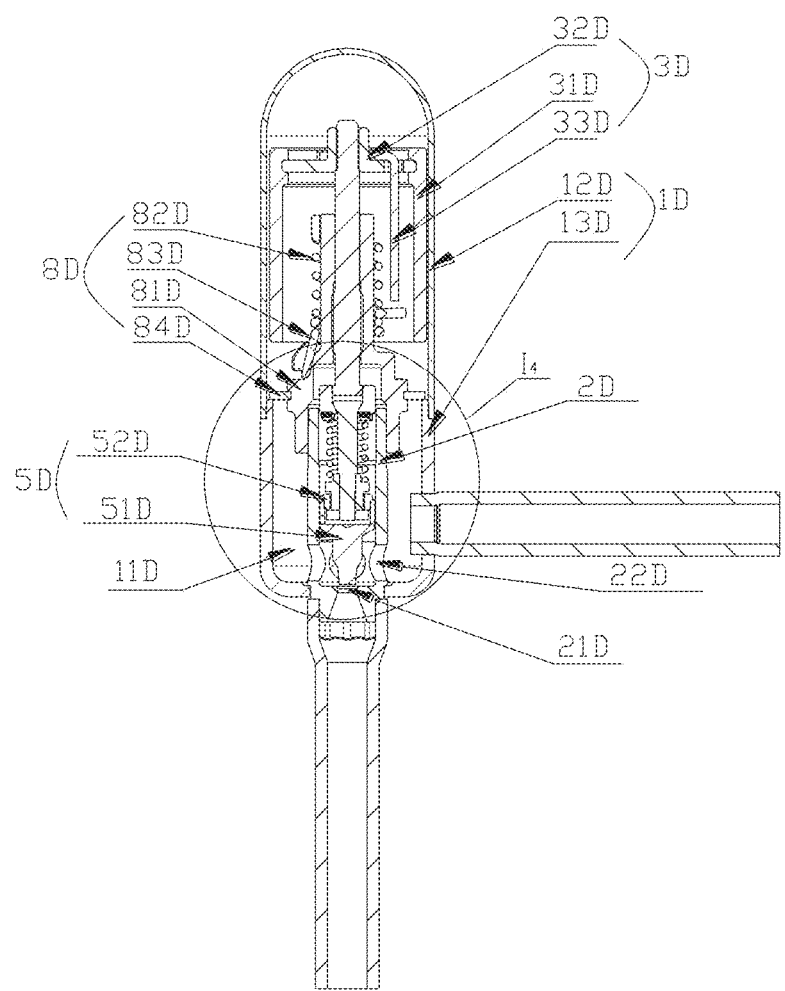
FIG. 19 is a schematic sectional view showing an electronic expansion valve according to a fourth embodiment of the present application, in which the valve is in a fully valve opened state.
Figure 20:
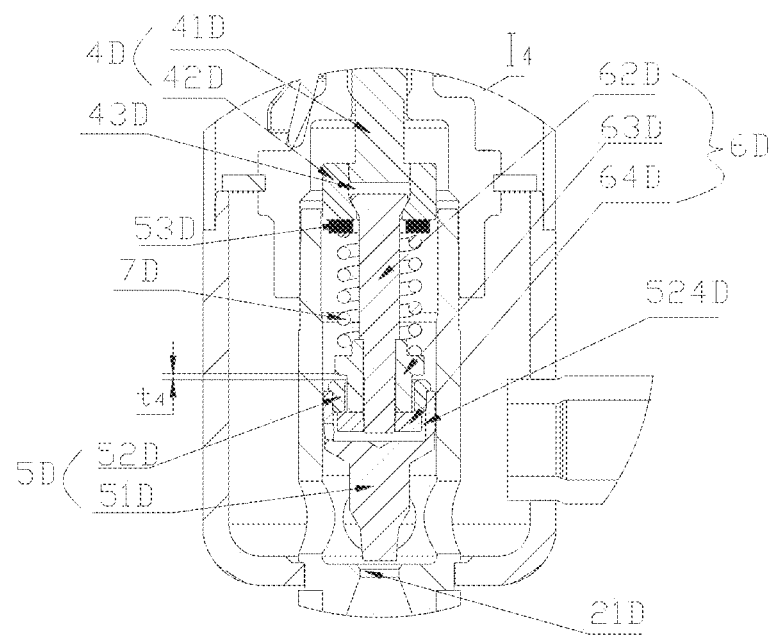
FIG. 20 is a partially enlarged view of a portion I₄ in FIG. 19.
Figure 21:
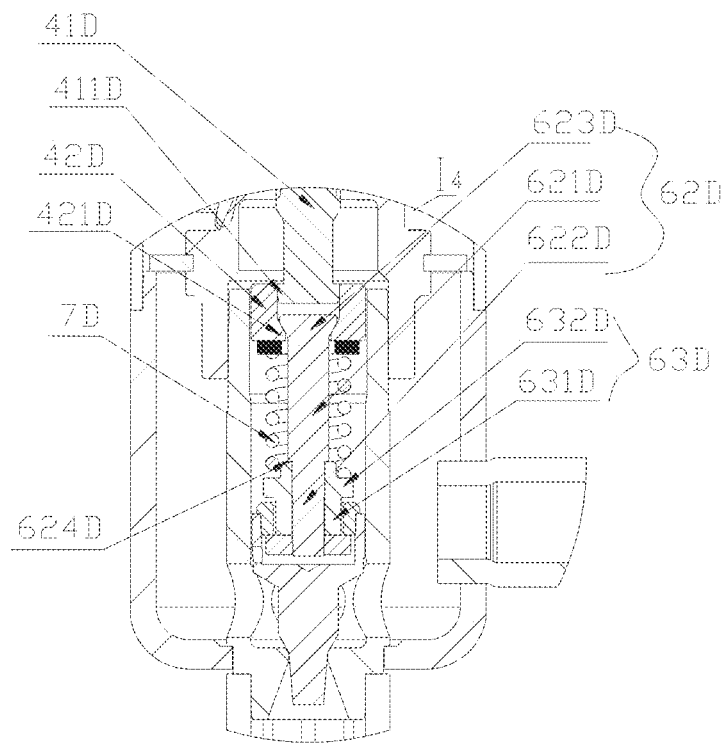
FIG. 21 is a partially enlarged view of the portion I₄ in a case that the electronic expansion valve in FIG. 19 is in a first valve closed state.
Figure 22:
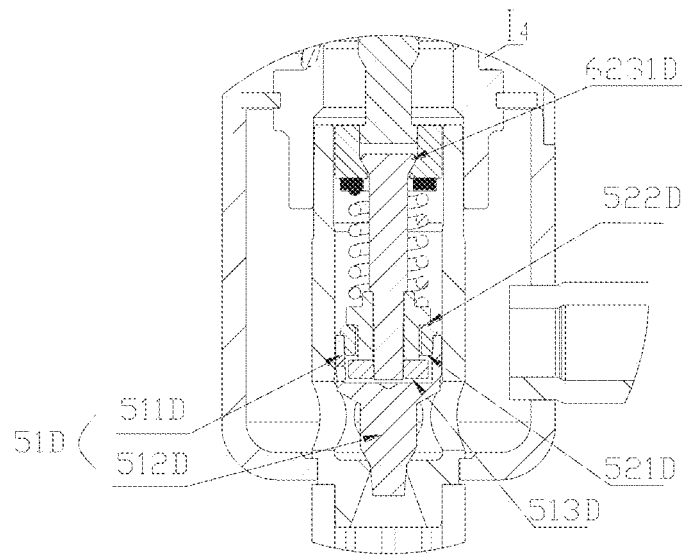
FIG. 22 is a partial enlarged view of the portion I₄ in a case that the electronic expansion valve in FIG. 19 is in a second valve closed state.
Figure 23:
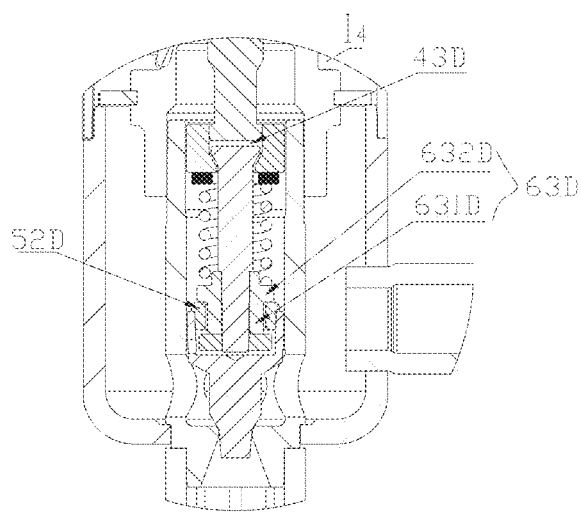
FIG. 23 is a partial enlarged view of the portion I₄ in a case that the electronic expansion valve in FIG. 19 is in a third valve closed state.

FIG. 19 is a schematic sectional view showing an electronic expansion valve according to a fourth embodiment of the present application, in which the valve is in a fully valve opened state, FIG. 20 is a partially enlarged view of a portion $I_4$ in FIG. 19, FIG. 21 is a partially enlarged view of the portion $I_4$ in a case that the electronic expansion valve in FIG. 19 is in a first valve closed state, FIG. 22 is a partially enlarged view of the portion $I_4$ in a case that the electronic expansion valve in FIG. 19 is in a second valve closed state, and FIG. 23 is a partially enlarged view of the portion $I_4$ in a case that the electronic expansion valve in FIG. 19 is in a third valve closed state.

In the following description of the present embodiment, a state shown in FIG. 19 in which the valve is fully opened is defined as a "valve opened state", and in this case, a screw rod component 4D and a movable connecting component 6D are able to move with respect to each other in an axial direction by a distance denoted as $t_4$, that is, a predetermined displacement amount in the present embodiment. A state that a valve needle component 5D closes a valve port portion 21D is defined as the "first valve closed state", as shown in FIG. 21, and in this case, the screw rod component 4D and the movable connecting component 6D are still able to move with respect to each other in the axial direction by the distance $t_4$. A state during a period from the "first valve closed state" shown in FIG. 21 to when an axial displacement amount of the screw rod component 4D moving in the valve closing direction is less than or equal to the predetermined displacement amount $t_4$ is defined as the "second valve closed state", and FIG. 22 is a schematic structural view showing a state that the axial displacement amount is equal to $t_4$. And a period in which the axial displacement amount of the screw rod component 4D moving in the valve closing direction from the "first valve closed state" is greater than the predetermined displacement amount $t_4$ is defined as the "third valve closed state", as shown in FIG. 23.

The electronic expansion valve includes a valve body component 1D having a valve chamber 11D, a valve core sleeve 2D, a rotor component 3D, a screw rod component 4D, a valve needle component 5D, and a nut component 8D. Specifically, the valve body component 1D includes an upper valve body 12D and a lower valve body 13D, a first connecting tube is connected to the lower valve body 13D, and the upper valve body 12D is fixedly connected to the lower valve body 13D to form the valve chamber 11D. The rotor component 3D, the screw rod component 4D, and the valve needle component 5D are arranged in the valve chamber 11D. The valve core sleeve 2D is provided with a valve port portion 21D and is fixed to the lower valve body 13D by welding. A lower end portion of the valve core sleeve 2D extends from the valve chamber 11D and is connected to a second connecting tube. That is, in the present embodiment, the valve core sleeve 2D is partially arranged in the valve chamber 11D. The valve needle component 5D is arranged in the valve core sleeve 2D, and the valve needle component 5D may be in contact with or separated from the valve port portion 21D. The rotor component 3D includes a rotor 31D, a connecting seat 32D fixedly connected to the rotor 31D and a stop rod 33D fixedly connected to the connecting seat 32D. The nut component 8D includes a nut 81D having an internally threaded hole and fixedly connected to the lower valve body 13D through a connecting piece 84D, a spring guide rail 82D fixed to a periphery portion of the nut 81D, and a slip ring 83D. The slip ring 83D is able to slip axially along the spring guide rail 82D. The nut component 8D further includes an upper stop portion and a lower stop portion.

The screw rod component 4D arranged in the valve chamber 11D is fixedly connected to an upper end portion of the rotor component 3D, and external threads of the screw rod component 4D are engaged with the internally threaded hole of the nut component 8D which is fixed to the valve body component 1D. The screw rod component 4D includes the first support portion. The movable connecting component 6D is suspendingly supported by the screw rod component 4D. Specifically, the movable connecting component 6D includes a second support portion and a first suspension portion which may be supported by the first support portion. The valve needle component 5D is suspendingly supported by the movable connecting component 6D. Specifically, the valve needle component 5D includes a second suspension portion supported by the second support portion of the movable connecting component 6D. An elastic member 7D is arranged outside the movable connecting component 6D, one end of the elastic member abuts against the movable connecting component 6D, and the other end of the elastic member abuts against the screw rod component 4D. In a case that the rotor component 3D drives the screw rod component 4D to reciprocate in the axial direction of the valve body component 1D, the valve needle component 5D responds to movement of the screw rod component 4D under an action of the movable connecting component 6D, to get away from or approach the valve port portion 21D, so as to adjust an opening degree of the electronic expansion valve. Specifically, when the screw rod component 4D moves to a position where the first support portion supports the first suspension portion and the second support portion supports the second suspension portion, the screw rod component 4D suspendingly supports the movable connecting component 6D and can drive the movable connecting component 6D to move in the axial direction, and the movable connecting component 6D suspendingly supports the valve needle component 5D and can drive the valve needle component 5D to move in the axial direction. During a time period from when the valve needle component 5D closes the valve port portion 21D to when the screw rod component 4D moves in the valve closing direction by the predetermined displacement amount, the elastic member 7D does not generate an elastic force for pushing the valve needle component 5D toward the valve port portion 21D. In a case that a displacement amount of the screw rod component 4D moving in the valve closing direction from the state that the valve needle component 5D closes the valve port portion 21D is greater than the predetermined displacement amount, the elastic member 7D generates the elastic force for pushing the valve needle component 5D toward the valve port portion 21D.

Thus, during a process that the screw rod component 4D moves in the valve closing direction from the valve opened state shown in FIG. 20 to a state that the valve needle component 5D closes the valve port portion, that is, the first valve closed state shown in FIG. 21, the movable connecting component 6D and the valve needle component 5D move synchronously with the screw rod component 4D under the action of their own gravities, which means, during the process, there is no relative displacement among the screw rod component 4D, the movable connecting component 6D, the elastic member 7D, and the valve needle component 5D, and above four parts may be seen as an integral body during moving. Then, during the second valve closed state, that is, during a process that the valve changes from the state shown in FIG. 21 to the state shown in FIG. 22, the screw rod component 4D moves downward, the elastic member 7D and the movable connecting component 6D move axially along with screw rod component 4D in the valve closing direction within the predetermined displacement amount $t_4$ with respect to the valve needle component 5D. During the process, the elastic member 7D does not generate the elastic force for pushing the valve needle component 5D in the valve closing direction. When the screw rod component 4D continues to move in the valve closing direction, that is, during a process that the valve changes from the state shown in FIG. 22 to the third valve closed state shown in FIG. 23, since there is no relative movement between the movable connecting component 6D and the valve needle component 5D, as the screw rod component 4D moves downward, the elastic member 7D is deformed under pressure, the elastic force thereof is transmitted to the valve needle component 5D through the movable connecting component 6D, that is, the elastic member 7D generates the elastic force for pushing the valve needle component 5D toward the valve port portion 21D during the process.

In the present embodiment, in order to better ensure coaxiality of the valve needle component 5D during the above moving process, the valve needle component 5D is arranged in the valve core sleeve 2D, and when the valve needle component 5D reciprocates in the axial direction, an inner wall of the valve core sleeve 2D serves as a guide portion for guiding the valve needle component. As a specific embodiment, the movable connecting component 6D is substantially arranged in the valve core sleeve 2D, and when the movable connecting component 6D reciprocates in the axial direction, the inner wall of the valve core sleeve 2D may also serve as a guide portion for guiding the movable connecting component 6D. The above "substantially" means that in the present embodiment, a small portion of an upper end of the movable connecting component 6D extends out of the valve core sleeve. Therefore, to avoid ambiguity, the word "substantially" is used for illustration. It should be understood by those skilled in the art that, the movable connecting component 6D in the present embodiment may also be entirely arranged in the valve core sleeve 2D. It should be understood that, a lower end portion of the valve needle component 5D may extend out of the valve core sleeve 2D as well, as long as the object of the present application can be achieved.

In order to better understand the present solution, structural designs of the components such as the screw rod component 4D, the movable connecting component 6D and the valve needle component 5D in the present embodiment are described in detail hereinafter.

As shown in FIGS. 20 and 21, the screw rod component 4D includes a screw rod 41D and a first clamping member 42D sleeved on and fixed to a lower end portion of the screw rod 41D, and a first connecting chamber 43D is defined by the screw rod 41D and the first clamping member 42D. The first clamping member 42D is provided with the first support portion. In specific arrangement, the lower end portion of the screw rod 41D extends in a radial direction of the screw rod 41D to form a first annular boss 411D, the first clamping member 42D is a cylinder-like member having a middle through hole cooperating with the first annular boss 411D, and an upper end portion of the cylinder-like member is sleeved on and welded to a periphery portion of the first annular boss. A lower end portion of the cylinder-like member is like a contracted opening, which forms a first flange portion 421D protruding inwardly, and the first flange portion 421D is embodied as the first support portion in the present embodiment. The end of the elastic member 7D for abutting against the screw rod component 4D abuts against a lower end surface portion of the first clamping member 42D. Further, in order to reduce a frictional force between the elastic member 7D and the first clamping member 42D, further to reduce a frictional force between the valve needle 51D and the screw rod component 4D, and to prevent the valve needle 51D from rotating with the screw rod component 4D, a gasket 53D is arranged between an upper end of the elastic member 7D and the first clamping member 42D.

As shown in FIG. 20, the movable connecting component 6D includes a connecting body 62D and a lower member, the connecting body 62D is substantially rod-shaped, the lower member includes a first member 64D fixed to a lower end portion of the connecting body 62D and a second member 63D arranged between the elastic member 7D and the first member 64D. The first member 64D is provided with the second support portion, and the second member 63D is provided with a pushing portion. A lower end of the elastic member 7D abuts against the pushing portion, and a lower end surface of the second member 63D abuts against an upper end surface of the first member 64D. It can be understood that, the first member 64D and the second member 63D may be fixedly connected by welding or the like, or the first member 64D and the second member 63D may be two independent components separated from each other in a non-assembled state.

Specifically, as shown in FIG. 21, the connecting body 62D is specifically designed to include a large-diameter section 621D, a small-diameter section 622D extending axially from a lower end surface portion of the large-diameter section 621D toward the valve port portion 21D, and a suspension section 623D extending into the first connecting chamber 43D. The large-diameter section 621D and the small-diameter section 622D together form the first stepped portion 624D. An upper end of the suspension section 623D protrudes radially to form a second flange portion 6231D, that is, the suspension section 623D is in an inverted tapered structure which is large at top and small at bottom, and the second flange portion 6231D, serving as the first suspension portion in the present embodiment, can cooperate with the first flange portion 421D.

The first member 64D of the lower member is specifically designed to be a first annular member having an axial through hole, and the first annular member is sleeved on a periphery of a lower end portion of the small-diameter section 622D of the connecting body 62D and is fixed thereto by welding. The first annular member is provided with the first support portion in the present embodiment, and specifically, an upper end surface portion of the first annular member directly abuts against the second suspension portion of the valve needle component 5D to realize supporting.

The second member 63D of the lower member is sleeved on a periphery portion of the connecting body 62D, and specifically includes a straight cylinder portion 631D cooperating with the small-diameter section 622D of the connecting body 62D and a first radially protruding portion 632D extending radially from an outer wall of the straight cylinder portion 631D. The first radially protruding portion 632D forms the pushing portion in the present embodiment. An upper end surface portion of the second member 63D abuts against the first stepped portion 624D, the elastic member 7D is sleeved on a periphery portion of the large-diameter section 621D, the end of the elastic member 7D for abutting against the movable connecting component 6D abuts against an upper end surface portion of the first radially protruding portion 632D, and a lower end surface of the first radially protruding portion 632D is able to abut against or be separated from a stop portion of the valve needle component 5D. As shown in FIG. 20, in a case that the electronic expansion valve is in the fully valve opened state, the screw rod component 4D suspendingly supports the movable connecting component 6D, and the movable connecting component 6D suspendingly supports the valve needle component 5D. In this case, a distance between the lower end surface of the first radially protruding portion 632D and an upper end surface of the stop portion is the "predetermined displacement amount t4" described in the present embodiment. It can be understood that, the gasket 53D may also be arranged between the lower end of the elastic member 7D and an upper end surface of the first radially protruding portion 632D. Or, gaskets 53D may be provided both between the upper end of the elastic member 7D and a lower end surface of the first clamping member 42D, and between the lower end of the elastic member 7D and the upper end surface of the first radially protruding portion 632D. The function of the gaskets 53D is the same as that of the above embodiments, which will not be repeated herein.

As shown in FIGS. 20 and 22, the valve needle component 5D includes the valve needle 51D and a second clamping member 52D fixedly connected to the valve needle 51D. The valve needle 51D further includes a main body portion 511D having an opened chamber, a flow regulating portion 512D arranged below the main body portion 511D and is able to be in contact with or separated from the valve port portion 21D. When the valve needle 51D reciprocates in the axial direction, the inner wall of the valve core sleeve 2D may serve as a guide portion for guiding the main body portion 511D. The second clamping member 52D is provided with the stop portion of the present embodiment. Specifically, in the present embodiment, the second clamping member 52D is an annular sleeve member arranged between the first radially protruding portion 632D (the pushing portion) of the second member 63D and the first member 64D, the second clamping member 52D is fixedly connected to an opening portion of the main body portion 511D, a lower end portion of the second clamping member 52D extends into the opened chamber 5111D, to form a second connecting chamber 524D together with the valve needle 51D. An upper end surface portion of the second clamping member 52D serves as the stop portion cooperating with the pushing portion of the second member 63D in the present embodiment. It can be understood that, the first member 64D of the movable connecting component 6D is arranged in the second connecting chamber 524D. The second clamping member 52D is provided with the second suspension portion in the present embodiment, and specifically, a lower end surface portion of the second clamping member 52D serves as the second suspension portion to cooperate with the second support portion. In addition, in specific arrangement, a predetermined radial displacement amount is provided between the second clamping member 52D and the small-diameter section 622D of the connecting body 62D, that is, a certain displacement space in the radial direction is provided between the second clamping member 52D and the small-diameter section 622D, such that center alignment of the valve needle component 5D can be performed automatically, which enables the flow regulating portion 512D of the valve needle component 5D to perfectly cooperate with the valve port portion 21D.

Specific structures of the screw rod component 4D, the valve needle component 5D and the movable connecting component 6D in the present embodiment have been described in detail hereinbefore. Operations of the electronic expansion valve in the present embodiment from the valve opened state shown in FIG. 20 to the tightly valve closed state shown in FIG. 23 will be described in detail hereinafter in conjunction with FIG. 24.

An operating process of the valve from the valve opened state shown in FIG. 20 to the first valve closed state shown in FIG. 21 is as follows.

As shown in FIG. 20, the electronic expansion valve is in the valve opened state in which the valve needle 51D is separated from the valve port portion 21D. In the valve opened state, the first flange portion 421D of the first clamping member 42D of the screw rod component 4D suspendingly supports the second flange portion 6231D of the suspension section 623D of the connecting body 62D, such that the screw rod component 4D suspendingly supports the movable connecting component 6D. An upper end surface portion of the first member 64D abuts against the lower end surface of the second clamping member 52D, that is, the second support portion supports the second suspension portion, such that the movable connecting component 6D suspendingly supports the valve needle component 5D. In this case, the predetermined displacement amount $t_4$ between the first radially protruding portion 632D (the pushing portion) of the second member 63D and the stop portion of the second clamping member 52D is kept unchanged.

Starting from the valve opened state, the rotor component 3D of the electronic expansion valve drives the screw rod component 4D to move in the valve closing direction until the flow regulating portion 512D of the valve needle 51D comes into contact with the valve port portion 21D to close the valve port portion 21D, that is, until reaching the first valve closed state shown in FIG. 21. In the above process, the screw rod component 4D, the movable connecting component 6D, the elastic member 7D and the valve needle component 5D together may be seen as an integral body moving axially in the valve closing direction, and a relationship among relative positions of the screw rod component 4D, the movable connecting component 6D, the valve needle component 5D, and the elastic member 7D is the same as that in the valve opened state shown in FIG. 20. The axial predetermined displacement amount t4 is still provided between the lower end surface of the first radially protruding portion 632D of the second member 63D and the upper end surface portion of the second clamping member 52D, namely, the stop portion, the elastic member 7D is not compressed, and does not generate the elastic force for pushing the valve needle component 5D toward the valve port portion 21D, the valve needle component 5D closes the valve port portion 21D under an action of its own gravity, the valve needle component 5D and the valve port portion 21D are not affected by the elastic force of the elastic member 7D, and even if the valve needle 51D rotates, the valve port portion 21D is only subjected to a frictional force caused by a self-weight of the valve needle component 5D, which brings very little abrasion to a contact surface between the valve needle 51D and the valve port portion 21D.

An operating process of the valve from the first valve closed state shown in FIG. 21 to the second valve closed state shown in FIG. 22 is as follows.

Starting from when the valve needle 51D closes the valve port portion 21D, the rotor component 3D further drives the screw rod component 4D to move axially in the valve closing direction, the screw rod component 4D pushes the elastic member 7D, and the elastic member 7D pushes the movable connecting component 6D to move downward until the first radially protruding portion 632D serving as the pushing portion of the second member 63D abuts against the upper end portion of the second clamping member 52D serving as the stop portion, that is, until reaching an end point of the second valve closed state shown in FIG. 22. That is, the second valve closed state is a process in which the displacement amount of the screw rod component 4D moving in the valve closing direction from the first closed valve state is less than or equal to the predetermined displacement amount t4. FIG. 22 is a view showing the state that the displacement amount of the screw rod component 4D is equal to the predetermined displacement amount t4, which is a very moment when the first radially protruding portion 632D just comes into contact with the upper end portion of the second clamping member 52D serving as the stop portion but does not apply a force to the upper end portion of the second clamping member 52D.

During the process, when the screw rod component 4D pushes the elastic member 7D, and the elastic member 7D pushes the movable connecting component 6D to move downward, relative axial displacement between the movable connecting component 6D and the valve needle component 5D is performed, that is, the valve needle component 5D remains at a position same as that of the first valve closed state under the action of its own gravity, the elastic member 7D does not apply an acting force to the valve needle component 5D, and does not generate the elastic force for pushing the valve needle component 5D toward the valve port portion 21D, which means, the contact surface between the valve needle 51D and the valve port portion 21D is not affected by the elastic force of the elastic member 7D. It can be seen that, during the entire second valve closed state, even if the valve needle 51D rotates, the valve port portion 21D is only subjected to the frictional force caused by the self-weight of the valve needle component 5D, which brings very little abrasion to the contact surface between the valve needle 51D and the valve port portion 21D.

An operating process of the valve from the second valve closed state shown in FIG. 22 to the third valve closed state shown in FIG. 23 is as follows.

Starting from the second valve closed state shown in FIG. 22, the rotor component 3D further drives the screw rod component 4D to move downward in the valve closing direction. Since the first radially protruding portion 632D (the pushing portion) of the second member 63D abuts against the upper end surface portion (the stop portion) of the second clamping member 52D, the screw rod component 4D and the elastic member 7D move axially with respect to the movable connecting component 6D during the downward movement of the screw rod component 4D, such that the elastic member 7D is compressed and deformed to generate the elastic force for pushing the valve needle 51D toward the valve port portion 21D, the elastic force enables the valve needle 51D to seal the valve port portion 21D more reliably, to tightly close the valve port portion 21D, and thereby ensuring the shut-off performance of the valve.

In the process, since the elastic member 7D is compressed, in a case that the frictional force between the valve needle 51D and the screw rod component 4D is greater than the frictional force between the valve needle 51D and the valve port portion 21D, the valve needle 51D rotates together with the screw rod component 4D with respect to the valve port portion 21D, and there is abrasion at a portion where the valve port portion 21D is in contact with the valve needle 51D. In a case that the frictional force between the valve needle 51D and the screw rod component 4D is smaller than the frictional force between the valve needle 51D and the valve port portion 21D, the valve needle 51D does not rotate together with the screw rod component 4D, then there is very little abrasion at the portion where the valve port portion 21D is in contact with the valve needle 51D. Therefore, in order to reduce the frictional force between the valve needle 51D and the screw rod component 4D, the gasket 53D described hereinbefore is provided.

The valve closing process of the electronic expansion valve is described hereinbefore. During the valve opening process, a similar situation occurs when the valve needle 51D is separated from the valve port portion 21D. At the very moment when the valve needle 51D and the valve port portion 21D are being separated from each other, the frictional force between the valve needle 51D and the valve port portion 21D is caused only by the self-weight of the valve needle component 5D, and even if the electronic expansion valve is repeatedly operated, there is very little abrasion at the contact surface between the valve needle 51D and the valve port portion 21D.

In summary, according to the electronic expansion valve of the present embodiment, at the very moment when the valve needle 51D closes the valve port portion 21D and the very moment when the valve needle 51D is separated from the valve port portion 21D, and during the process of the second valve closed state, the frictional force between the valve needle 51D and the valve port portion 21D is caused only by the self-weight of the valve needle component 5D. In this way, even if the electronic expansion valve is repeatedly operated, there is very little abrasion at the contact surface between the valve needle 51D and the valve port portion 21D, and thereby reducing internal leakage of the electronic expansion valve in the valve closed state.

An assembly method for the electronic expansion valve of the present embodiment is described hereinafter.

The assembly method includes the following steps.

S01, processing parts or components required for the electronic expansion valve in the present embodiment, such as processing the valve needle 51D, the second clamping member 52D, the gasket 53D, the elastic member 7D, the connecting body 62D, the second member 63D, the first member 64D, the screw rod 41D, the first clamping member 42D, the nut component 8D, the rotor component 3D, the upper valve body 12D, the lower valve body 13D, the valve core sleeve 2D, the second connecting tube, the first connecting tube, etc. of the structure shown in FIG. 8.

S1, assembling the elastic member 7D, the screw rod component 4D, the movable connecting component 6D and the valve needle component 5D to form a first assembly, wherein in the first assembly, one end of the elastic member 7D abuts against the movable connecting component 6D, and the other end of the elastic member 7D abuts against the screw rod component 4D.

The step S1 specifically includes the following steps.

SD11, allowing one end of the small-diameter section 622D of the connecting body 62D to pass through the first clamping member 42D, then sequentially sleeving the gasket 53D, the elastic member 7D, the second member 63D, the second clamping member 52D and the first member 64D on the large-diameter section 621D and the small-diameter section 622D of the connecting body, to form a first sub-assembly. It should be noted that, this step may also be as follows: allowing one end of the small-diameter section 622D of the connecting body 62D to pass through the first clamping member 42D, then sequentially sleeving the elastic member 7D, the gasket 53D, the second member 63D, the second clamping member 52D and the first member 64D on the large-diameter section 621D and the small diameter section 622D of the connecting body, to form the first sub-assembly; or, allowing one end of the small-diameter section 622D of the connecting body 62D to pass through the first clamping member 42D, then sequentially sleeving one gasket 53D, the elastic member 7D, another gasket 53D, the second member 63D, the second clamping member 52D and the first member 64D on the large-diameter section 621D and the small diameter section 622D of the connecting body, to form the first sub-assembly, that is, two gaskets 53D may be provided.

SD12, fixedly connecting the first clamping member 42D of the first sub-assembly with the screw rod 41D by welding, to form the first connecting chamber 43D, and fixedly connecting the second clamping member 52D of the first sub-assembly with the main body portion 511D of the valve needle 51D by welding, to form the second connecting chamber 524D. In this step, there is no specific order for forming the first connecting chamber 43D and the second connecting chamber 524D.

S2, fixing the lower valve body 13D with the valve core sleeve 2D, the first connecting tube and the second connecting tube by furnace brazing, to form a second assembly. Of course, it should be understood that, the above parts may be connected by other welding methods in this step. In the present embodiment, the valve core sleeve 2D is arranged in the lower valve body 13D and a lower end portion of the valve core sleeve 2D extends out of the lower valve body 13D, the second connecting tube is welded to a periphery of the lower end portion of the valve core sleeve 2D, and the first connecting tube is welded to a side wall of the lower valve body 13D.

S3, inserting a lower end of the valve needle 51D of the first assembly into the valve core sleeve 2D, to allow the main body portion 511D of the valve needle and the first clamping member 42D of the screw rod component 4D to have a clearance fit with the valve core sleeve 2D respectively, in this way, when the valve needle 51D and the screw rod component 4D moves axially, the inner wall of the valve core sleeve 2D can serve as a guide portion for guiding the valve needle 51D and the screw rod component 4D; sleeving the nut component 8D on the periphery portion of the screw rod 41D and fixing the nut component 8D to the screw rod 41D by welding; and fixing the nut component 8D to the lower valve body 13D by welding.

S4, fixing an upper end portion of the screw rod 41D to the rotor component 3D by welding.

S5, fixing the upper valve body 12D to the lower valve body 13D by welding, to complete the assembling of the electronic expansion valve.

It should be noted that, in each of the above embodiments, the valve port portion of the electronic expansion valve is arranged at the valve core sleeve. Specifically, the valve core sleeve is a cylinder-like structure having a core chamber, the valve core sleeve is fixed to the valve body component, and a peripheral wall of the valve core sleeve is further provided with communication ports (22A, 22B, 22C, 22D), to allow an inner chamber of the valve core sleeve to be in communication with an outer space of the valve core sleeve, so that when the valve port portion is in the valve opened state, a fluid inlet and a fluid outlet is in communication with each other through the valve port portion and the communication ports.

In addition, an upper end of the valve core sleeve may be fixed to the nut component, to improve the coaxiality between the nut component and the valve core sleeve, and thereby controlling the coaxiality between the screw rod component and the valve core sleeve.

Of course, in practical arrangement, the valve port portion may be directly arranged at the lower valve body or another component may be provided and the valve port portion may be arranged thereon, and a separate valve core sleeve may be arranged inside the valve body component for guiding the movable connecting component and the valve needle component. Similarly, the valve core sleeve in each of the embodiments may not be directly fixed to the valve body component, instead, the valve core sleeve may be fixed another component, and then the above component is fixedly connected to the valve body component.

On the premise that the object of the present application can be achieved, both the valve needle component and the movable connecting component may be arranged in the valve core sleeve, or the above two components may be partially arranged in the valve core sleeve respectively, or one of the above two components is arranged in the valve core sleeve and the other is not arranged in the valve core sleeve.

The elastic member in each of the above embodiments may specifically be a compression spring.

Furthermore, the assembly method for the electronic expansion valve according to the present application is exemplified hereinbefore, so that the technical solution of the present application can be understood. It should be understood that, the above steps are numbered only for clearly illustrating the assembly steps of the electronic expansion valve, and the order of the numbers does not represent the order of the steps. As long as the assembly of the electronic expansion valve can be realized, the order of the steps can be flexibly adjusted according to needs.

The electronic expansion valve and the assembly method therefor according to the present application are described above in detail. The principle and the embodiments of the present application are illustrated herein by specific examples. The above description of examples is only intended to facilitate the understanding of the method and spirit of the present application. It should be noted that, for those skilled in the art, a few of modifications and improvements may be made to the present application without departing from the principle of the present application, and these modifications and improvements are also deemed to fall into the protection scope of the present application defined by the claims.

The invention claimed is:

1. An electronic expansion valve, comprising:
a valve body component having a valve chamber;
a rotor component arranged in the valve chamber;
a screw rod component configured to be driven by the rotor component to move in an axial direction of the valve body component, wherein the screw rod component comprises a first support portion;
a movable connecting component comprising a second support portion and a first suspension portion;
a valve needle component configured to adjust an opening degree of the electronic expansion valve by moving away from or toward a valve port portion, wherein the valve needle component comprises a second suspension portion; and
a spring arranged outside the movable connecting component, wherein one end of the spring is configured to abut against the movable connecting component, and another end of the spring is configured to abut against the valve needle component; and
wherein the first support portion is configured to suspendingly support the first suspension portion, and the second support portion is configured to suspendingly support the second suspension portion;
a predetermined distance is provided between the screw rod component and the movable connecting component in the axial direction of the valve body component when the valve is fully opened, and the screw rod component is able to move with respect to the movable connecting component along said predetermined distance in the axial direction,
during a time period from when the valve needle component closes the valve port portion to when the screw rod component moves in a valve closing direction by the predetermined distance, no elastic force for pushing the valve needle component toward the valve port portion is generated by the spring; and
in a case that a displacement amount of the screw rod component moving in the valve closing direction from a state that the valve needle component closes the valve port portion is greater than the predetermined distance, an elastic force for pushing the valve needle component toward the valve port portion is generated by the spring.

2. The electronic expansion valve according to claim 1, further comprising a valve core sleeve, wherein
the valve core sleeve is at least partially arranged in the valve chamber, and the valve core sleeve is fixedly connected to the valve body component; and
both the valve needle component and the movable connecting component are at least partially arranged in the valve core sleeve, and an inner wall of the valve core sleeve is configured to form a guide portion for guiding the movable connecting component and/or the valve needle component.

3. The electronic expansion valve according to claim 1, wherein
the movable connecting component has a first connecting chamber, the screw rod component comprises a screw rod component connecting portion extending into the first connecting chamber, and the screw rod component connecting portion is provided with the first support portion; and
the movable connecting component further comprises a stop portion arranged below the first support portion, and as the screw rod component moves in the valve closing direction until the first support portion abuts against the stop portion, the screw rod component is allowed to push the movable connecting component to move in the valve closing direction, to allow the elastic member to generate the elastic force for pushing the valve needle component toward the valve port portion.

4. The electronic expansion valve according to claim 3, wherein the movable connecting component comprises a connecting body having an upper opening portion and a lower opening portion in communication with each other, an upper member fixed to the upper opening portion, and a lower member fixed to the lower opening portion; and the first connecting chamber is defined by the connecting body, the upper member and the lower member;
the upper member is provided with the first suspension portion, and the lower member is provided with the second support portion; and
one end of the elastic member abuts against the lower member.

5. The electronic expansion valve according to claim 4, wherein
the screw rod component comprises a screw rod and a first clamping member fixedly connected to the screw rod, and the screw rod component connecting portion comprises the first clamping member and a portion of the screw rod located in the first connecting chamber; and
the first clamping member comprises a large-diameter ring located between the upper member and the stop portion, and the large-diameter ring is configured to form the first support portion.

6. The electronic expansion valve according to claim 4, wherein
an inner wall of the connecting body is configured to extend radially, to form a first annular boss, and the stop portion is formed by the first annular boss;
the upper member comprises a first annular member having a through hole, the first annular member is arranged on a periphery of the screw rod component, and the first annular member is provided with the first suspension portion; and
the lower member comprises a base member having a through hole, the base member is arranged on a periphery of the valve needle component, an inner wall of the base member is configured to extend radially, to form a second annular boss, and the second support portion is formed by the second annular boss.

7. The electronic expansion valve according to claim 1, wherein
the valve needle component comprises a valve needle, the valve needle comprises a main body portion, a flow regulating portion and a rod portion, a first stepped portion is formed between the main body portion and the rod portion, and the end of the elastic member for abutting against the valve needle component is configured to abut against the first stepped portion; the valve needle component further comprises a second clamping member, the second clamping member is arranged on a periphery of the rod portion, and the second clamping member is provided with the second suspension portion.

8. The electronic expansion valve according to claim 3, wherein
the movable connecting component comprises a connecting body having an upper opening portion, an upper member fixed to the upper opening portion, and a lower member fixed to the connecting body;
the first connecting chamber is defined by the connecting body and the upper member, the upper member is provided with the first suspension portion, and the lower member is provided with the second support portion; and
the elastic member is arranged on a periphery portion of the connecting body, and the end of the elastic member for abutting against the movable connecting component is configured to abut against the connecting body.

9. The electronic expansion valve according to claim 8, wherein the connecting body comprises a large-diameter section and a small-diameter section, the large-diameter section is provided with a stepped hole having a stepped surface facing upward, a hole wall of the stepped hole is provided with a first stepped portion, and the stop portion is formed by the first stepped portion;
the large-diameter section and the small-diameter section are together configured to form a second stepped portion with a stepped surface facing downward, and the end of the elastic member for abutting against the connecting body is configured to abut against the second stepped portion;
the upper member comprises a first annular member having a through hole, the first annular member is arranged on a periphery of the screw rod component, and the first annular member is provided with the first suspension portion; and
the lower member comprises a second annular member having a through hole, the second annular member is fixedly connected to the connecting body, and the second annular member is provided with the second support portion.

10. The electronic expansion valve according to claim 8, wherein
the valve needle component comprises a valve needle and a second clamping member;
the valve needle comprises a main body portion having an open cavity, and a flow regulating portion;
the second clamping member is provided with the second suspension portion, and the end of the elastic member for abutting against the valve needle component is configured to abut against the second suspension portion; and
the second clamping member is fixedly connected to the main body portion to form a second connecting chamber, and the second support portion is arranged in the second connecting chamber.

11. The electronic expansion valve according to claim 10, wherein
the second clamping member comprises a bottom plate portion and a cylinder portion, the bottom plate portion has a through hole fitting with the small-diameter section of the connecting body, the bottom plate portion is configured to form the second suspension portion, an accommodating chamber is defined by the bottom plate portion and the cylinder portion, and the end of the elastic member for abutting against the second suspension portion is arranged in the accommodating chamber to abut against the bottom plate portion.

12. An assembly method for an electronic expansion valve, wherein the electronic expansion valve comprises:
a valve body component comprising an upper valve body and a lower valve body, wherein the valve body component is provided with a valve chamber;
a valve core sleeve at least partially arranged in the valve chamber;
a rotor component arranged in the valve chamber;
a screw rod component comprising a first support portion;
a nut component sleeved on a periphery of the screw rod component and threadedly connected to the screw rod component;
a valve needle component configured to adjust an opening degree of the electronic expansion valve by moving away from or toward a valve port portion, wherein the valve needle component comprises a second suspension portion; and
an elastic member and a movable connecting component, wherein the movable connecting component comprises a first suspension portion and a second support portion; and
the assembly method comprises the following steps:
S1, assembling the elastic member, the screw rod component, the movable connecting component and the valve needle component to form a first assembly, wherein in the first assembly, the screw rod component suspendingly supports the movable connecting component, the movable connecting component suspendingly supports the valve needle component, the elastic member is arranged outside the movable connecting component, one end of the elastic member abuts against the movable connecting component, and another end of the elastic member abuts against the valve needle component;
S2, fixedly connecting the lower valve body with the valve core sleeve to form a second assembly;

S3, extending a lower end of the first assembly into the valve core sleeve, sleeving the nut component on the periphery of the screw rod component to form a threaded connection between the nut component and the screw rod component, and then fixedly connecting the nut component with the lower valve body;

S4, fixedly connecting the screw rod component with the rotor component; and

S5, fixedly connecting the upper valve body with the lower valve body.

13. The assembly method for the electronic expansion valve according to claim 12, wherein
the movable connecting component comprises a connecting body having an upper opening portion and a lower opening portion in communication with each other, and an upper member and a lower member; the connecting body has a stop portion configured to fit with the screw rod component, the upper member is provided with the first suspension portion, and the lower member is provided with the second support portion;

the screw rod component comprises a screw rod and a first clamping member, and the first clamping member is provided with the first support portion;

the valve needle component comprises a valve needle and a second clamping member, and the second clamping member is provided with the second suspension portion; and the step S1 specifically comprises:

SA11, arranging the elastic member, the lower member and the second clamping member at a periphery portion of the valve needle, allowing the end of the elastic member for abutting against the movable connecting component to abut against the lower member, and allowing the end of the elastic member for abutting against the valve needle component to abut against the valve needle;

SA12, fixedly connecting the screw rod with the first clamping member, and arranging the upper member at a periphery portion of the screw rod; and SA13, fixedly connecting the upper member and the lower member to the upper opening portion and the lower opening portion of the connecting body, respectively.

14. The assembly method for the electronic expansion valve according to claim 12, wherein
the movable connecting component comprises a connecting body having an upper opening portion, an upper member and a lower member, the connecting body has a stop portion configured to fit with the screw rod component, the upper member is provided with the first suspension portion, and the lower member is provided with the second support portion;

the screw rod component comprises a screw rod and a first clamping member, and the first clamping member is provided with the first support portion;

the valve needle component comprises a valve needle and a second clamping member, and the second clamping member is provided with the second suspension portion; and the step S1 specifically comprises:

SB11, arranging the elastic member, the second clamping member, and the lower member at a periphery portion of the connecting body, then fixedly connecting the lower member with the connecting body, allowing the end of the elastic member for abutting against the movable connecting component to abut against the connecting body, and allowing the end of the elastic member for abutting against the valve needle component to abut against the second clamping member;

SB12, fixedly connecting the screw rod with the first clamping member, and arranging the upper member at a periphery portion of the screw rod; and SB13, fixedly connecting the upper member with the upper opening portion of the connecting body, and fixedly connecting the valve needle with the second clamping member.

15. An electronic expansion valve, comprising:
a valve body component having a valve chamber;
a rotor component arranged in the valve chamber;
a screw rod component configured to be driven by the rotor component to move in an axial direction of the valve body component, wherein the screw rod component comprises a first support portion;
a movable connecting component comprising a second support portion and a first suspension portion;
a valve needle component configured to adjust an opening degree of the electronic expansion valve by moving away from or toward a valve port portion, wherein the valve needle component comprises a second suspension portion; and
an elastic member arranged outside the movable connecting component, wherein one end of the elastic member is configured to abut against the movable connecting component, and another end of the elastic member is configured to abut against the screw rod component; and
wherein the first support portion is configured to suspendingly support the first suspension portion, and the second support portion is configured to suspendingly support the second suspension portion;
a predetermined distance is provided between the lead screw component and the movable connecting component in the axial direction of the valve body component when the valve is fully opened,
during a time period from when the valve needle component closes the valve port portion to when the screw rod component moves in a valve closing direction by the predetermined distance, no elastic force for pushing the valve needle component toward the valve port portion is generated by the elastic member; and
in a case that a displacement amount of the screw rod component moving in the valve closing direction from a state that valve needle component closes the valve port portion is greater than the predetermined distance, an elastic force for pushing the valve needle component toward the valve port portion is generated by the elastic member.

16. The electronic expansion valve according to claim 15, further comprising a valve core sleeve, wherein
the valve core sleeve is at least partially arranged in the valve chamber, and the valve core sleeve is fixedly connected to the valve body component; and
both the valve needle component and the movable connecting component are at least partially arranged in the valve core sleeve, and an inner wall of the valve core sleeve is configured to form a guide portion for guiding the movable connecting component and/or the valve needle component.

17. The electronic expansion valve according to claim 15, wherein
the movable connecting component has a first connecting chamber, the screw rod component comprises a screw rod component connecting portion extending into the first connecting chamber, and the screw rod component connecting portion is provided with the first support portion; and the valve needle component comprises a stop portion located below the movable connecting component, and as the screw rod component moves in the valve closing direction until the movable connecting component abuts against the stop portion, the elastic member is configured to generate the elastic force for pushing the valve needle component toward the valve port portion.

18. The electronic expansion valve according to claim 17, wherein the movable connecting component comprises a connecting body and a lower member;

the connecting body has an upper opening portion and a lower opening portion in communication with each other, the connecting body is provided with the first suspension portion, and the end of the elastic member for abutting against the movable connecting component is configured to abut against the first suspension portion; and the lower member is fixedly connected to the connecting body to form the first connecting chamber, the first support portion and the second suspension portion are arranged in the first connecting chamber, and the lower member is provided with the second support portion.

19. The electronic expansion valve according to claim 17, wherein the screw rod component comprises a screw rod and a first clamping member fixedly connected to the screw rod, and the screw rod component connecting portion comprises the first clamping member and a portion of the screw rod located in the first connecting chamber;

the first clamping member is provided with the first support portion; and a portion of the screw rod located above the movable connecting component is provided with a spring support portion, and the end of the elastic member for abutting against the screw rod component is configured to abut against the spring support portion.

20. The electronic expansion valve according to claim 15, wherein the valve needle component has a stop portion, and the movable connecting component has a pushing portion; as the screw rod component moves in the valve closing direction until the pushing portion abuts against the stop portion, the elastic force for pushing the valve needle component toward the valve port portion is generated by the elastic member.

21. The electronic expansion valve according to claim 20, wherein the movable connecting component comprises a connecting body and a lower member, and the connecting body is provided with the first suspension portion; and the lower member comprises a first member fixedly connected to the connecting body and a second member arranged between the first member and the elastic member, the first member is provided with the second support portion, the second member is provided with the pushing portion, and the end of the elastic member for abutting against the movable connecting component is configured to abut against the pushing portion.

22. The electronic expansion valve according to claim 20, wherein the valve needle component comprises a valve needle and a second clamping member fixedly connected to the valve needle, and the second clamping member is provided with the second suspension portion; the second suspension portion is arranged between the pushing portion and the second support portion, a second connecting chamber is defined by the valve needle and the second clamping member, and the second support portion is arranged in the second connecting chamber.

23. An assembly method for an electronic expansion valve, wherein the electronic expansion valve comprises:

a valve body component comprising an upper valve body and a lower valve body, wherein the valve body is provided with a valve chamber;

a valve core sleeve at least partially arranged in the valve chamber;

a rotor component arranged in the valve chamber;

a screw rod component comprising a first support portion;

a nut component sleeved on a periphery of the screw rod component and threadedly connected to the screw rod component;

a valve needle component configured to adjust an opening degree of the electronic expansion valve by moving away from or toward a valve port portion, wherein the valve needle component comprises a second suspension portion; and an elastic member and a movable connecting component, wherein the movable connecting component comprises a first suspension portion and a second support portion; and the assembly method comprises the following steps:

S1, assembling the elastic member, the screw rod component, the movable connecting component and the valve needle component to form a first assembly, wherein in the first assembly, the screw rod component suspendingly supports the movable connecting component the movable connecting component suspendingly supports the valve needle component, the elastic member is arranged outside the movable connecting component, one end of the elastic member abuts against the movable connecting component, and another end of the elastic member abuts against the screw rod component;

S2, fixedly connecting the lower valve body with the valve core sleeve to form a second assembly;

S3, extending a lower end of the first assembly into the valve core sleeve, sleeving the nut component to the periphery of the screw rod component to form a threaded connection between the nut component and the screw rod component, and then fixedly connecting the nut component with the lower valve body;

S4, fixedly connecting the screw rod component with the rotor component; and

S5, fixedly connecting the upper valve body with the lower valve body.

24. The assembly method for the electronic expansion valve according to claim 23, wherein the movable connecting component comprises a connecting body having an upper opening portion and a lower opening portion in communication with each other, and a lower member, the connecting body is provided with the first suspension portion, and the lower member is provided with the second support portion;

the screw rod component comprises a screw rod and a first clamping member, the screw rod comprises a spring support portion, and the first clamping member is provided with the first support portion;

the valve needle component comprises a valve needle, the valve needle is provided with a stop portion fitting with the lower member, and the valve needle component is provided with the second suspension portion;

the step S1 specifically comprises:

SC11, mounting the lower member to a periphery portion of the valve needle;

SC12, sleeving the elastic member on the periphery of the screw rod component, and allowing the elastic member to be located between the spring support portion and a lower end portion of the screw rod; allowing the lower end portion of the screw rod to pass through the upper opening portion of the connecting body to be fixedly connected with the first clamping member, allowing the end of the elastic member for abutting against the movable connecting component to abut against the connecting body, and allowing the end of the elastic member for abutting against the screw rod component to abut against the spring support portion; and SC13, fixedly connecting the lower member with the lower opening portion of the connecting body.

25. The assembly method for the electronic expansion valve according to claim 23, wherein the movable connecting component comprises a connecting body and a lower member, the connecting body is provided with the first suspension portion, and the lower member is provided with a pushing portion and the second support portion;

the screw rod component comprises a screw rod and a first clamping member, and the first clamping member is provided with the first support portion;

the valve needle component comprises a valve needle and a second clamping member, and the second clamping member is provided with a stop portion and the second suspension portion; and the step S1 specifically comprises:

SD11, assembling the first clamping member, the elastic member, the lower member, the second clamping member and the connecting body to form a first sub-assembly; and SD12, fixedly connecting the first clamping member of the first sub-assembly with the screw rod, and fixedly connecting the second clamping member of the first sub-assembly with the valve needle, to form the first assembly.

* * * * *